(12) United States Patent
Mueller et al.

(10) Patent No.: US 11,917,654 B2
(45) Date of Patent: *Feb. 27, 2024

(54) SYSTEM AND METHOD FOR INTELLIGENT WIRELESS CARRIER LINK MANAGEMENT SYSTEM AT USER EQUIPMENT DEVICES

(71) Applicant: Dell Products, LP, Round Rock, TX (US)

(72) Inventors: Julius Mueller, Santa Cruz, CA (US); Liam B. Quinn, Austin, TX (US); Suresh K. Ramasamy, Cedar Park, TX (US); Abeye Teshome, Austin, TX (US)

(73) Assignee: Dell Products, LP, Round Rock, TX (US)

(*) Notice: Subject to any disclaimer, the term of this patent is extended or adjusted under 35 U.S.C. 154(b) by 27 days.

This patent is subject to a terminal disclaimer.

(21) Appl. No.: 17/510,632

(22) Filed: Oct. 26, 2021

(65) Prior Publication Data

US 2023/0129344 A1 Apr. 27, 2023

(51) Int. Cl.
*H04W 8/18* (2009.01)
*H04W 28/20* (2009.01)
(Continued)

(52) U.S. Cl.
CPC .......... *H04W 72/51* (2023.01); *H04B 7/0608* (2013.01); *H04W 8/18* (2013.01); *H04W 28/20* (2013.01)

(58) Field of Classification Search
CPC ....... H04W 72/51; H04W 8/18; H04W 28/20; H04B 7/0608; H04B 7/0874; H04B 7/0691
See application file for complete search history.

(56) References Cited

U.S. PATENT DOCUMENTS

| | | | | |
|---|---|---|---|---|
| 11,026,095 | B2* | 6/2021 | Tofighbakhsh | H04W 16/18 |
| 11,582,647 | B2* | 2/2023 | Fiaschi | H04W 88/16 |

(Continued)

FOREIGN PATENT DOCUMENTS

| | | | |
|---|---|---|---|
| CA | 3040365 C | * | 9/2021 |
| CA | 3038713 C | * | 10/2021 |

(Continued)

OTHER PUBLICATIONS

Nguyen, Nam & Arifuzzaman, Mohammad & Sato, Takuro. (2015). A Novel WLAN Roaming Decision and Selection Scheme for Mobile Data Offloading. Journal of Electrical and Computer Engineering. 2015. 1-15. (Year: 2015).*

(Continued)

*Primary Examiner* — Yuwen Pan
*Assistant Examiner* — Swati Jain
(74) *Attorney, Agent, or Firm* — Prol Intellectual Property Law, PLLC; H. Kenneth Prol

(57) ABSTRACT

An information handling system of a management and orchestration module (MANO) may comprise a processor configured to determine user equipment device (UE) connectivity requirements from UE connectivity metrics received from a first UE, for a plurality of UEs managed by the MANO, enterprise profile requirements for the UEs, and detected network conditions of radio access networks (RANs) and cores of an enterprise mobile network. The MANO may also generate an optimal wireless link distribution across the UEs based on the UE connectivity requirements, enterprise profile requirements, and network conditions of the RANs and cores, and determine an antenna configuration adjustment for the first UE, instructing selection of a wireless link via an antenna, selected to meet the UE connectivity requirement relative to wireless links assigned to the other UEs according to the optimal wireless (Continued)

link distribution. A network interface device may transmit the antenna configuration adjustment to the first UE.

19 Claims, 8 Drawing Sheets

(51) Int. Cl.
   *H04W 72/51* (2023.01)
   *H04B 7/06* (2006.01)

(56) References Cited

U.S. PATENT DOCUMENTS

| | | | | |
|---|---|---|---|---|
| 11,641,579 | B1* | 5/2023 | Mukherjee | G06Q 30/08 370/329 |
| 2008/0298275 | A1* | 12/2008 | De Sousa | H04W 16/18 455/562.1 |
| 2011/0058479 | A1* | 3/2011 | Chowdhury | H04W 36/22 370/237 |
| 2011/0319073 | A1* | 12/2011 | Ekici | H04W 48/18 455/553.1 |
| 2014/0362700 | A1* | 12/2014 | Zhang | H04W 72/542 370/235 |
| 2015/0019746 | A1* | 1/2015 | Shatzkamer | H04W 76/10 709/228 |
| 2015/0065148 | A1* | 3/2015 | De Pasquale | H04W 48/16 455/445 |
| 2015/0289123 | A1* | 10/2015 | Shatzkamer | H04W 4/24 455/406 |
| 2016/0112821 | A1* | 4/2016 | Raleigh | G06F 15/177 455/552.1 |
| 2016/0204916 | A1* | 7/2016 | Dao | H04L 45/02 709/226 |
| 2016/0381594 | A1* | 12/2016 | Tomici | H04M 15/66 370/236 |
| 2017/0019811 | A1* | 1/2017 | Parulkar | H04W 8/04 |
| 2017/0041974 | A1* | 2/2017 | Liao | H04B 7/0452 |
| 2017/0150399 | A1* | 5/2017 | Kedalagudde | H04L 43/20 |
| 2017/0374695 | A1* | 12/2017 | Lau | H04W 8/02 |
| 2018/0131557 | A1* | 5/2018 | Chou | H04L 41/044 |
| 2020/0329398 | A1* | 10/2020 | Gunasekara | H04W 28/18 |
| 2021/0266762 | A1* | 8/2021 | Stawiarski | H04W 8/183 |
| 2021/0297456 | A1* | 9/2021 | Raleigh | G06Q 30/0241 |
| 2022/0029930 | A1* | 1/2022 | Yilma | H04L 41/122 |
| 2022/0070855 | A1* | 3/2022 | Zhang | H04W 72/51 |
| 2022/0086712 | A1* | 3/2022 | Teyeb | H04W 36/0058 |
| 2022/0167236 | A1* | 5/2022 | Melodia | H04W 28/0236 |
| 2022/0174551 | A1* | 6/2022 | Cui | H04L 47/2425 |
| 2022/0408445 | A1* | 12/2022 | Sun | H04W 72/54 |
| 2023/0068386 | A1* | 3/2023 | Akdeniz | G06N 3/063 |
| 2023/0090081 | A1* | 3/2023 | Balasubramanian | H04W 28/24 370/252 |
| 2023/0319616 | A1* | 10/2023 | Lunardi | H04W 24/10 370/329 |

FOREIGN PATENT DOCUMENTS

| | | | | |
|---|---|---|---|---|
| EP | 3267709 | A1 * | 1/2018 | G06F 21/51 |
| WO | WO-2011149532 | A1 * | 12/2011 | |
| WO | WO-2013052312 | A1 * | 4/2013 | |
| WO | WO-2017109577 | A1 * | 6/2017 | H04L 43/50 |
| WO | WO-2019204166 | A1 * | 10/2019 | |
| WO | WO-2022139879 | A1 * | 6/2022 | |
| WO | WO-2022197312 | A1 * | 9/2022 | |

OTHER PUBLICATIONS

M. A. Adedoyin and O. E. Falowo, "Combination of Ultra-Dense Networks and Other 5G Enabling Technologies: A Survey," in IEEE Access, vol. 8, pp. 22893-22932, 2020. (Year: 2020).*

* cited by examiner

SYSTEM AND METHOD FOR INTELLIGENT WIRELESS CARRIER LINK MANAGEMENT SYSTEM AT USER EQUIPMENT DEVICES

FIELD OF THE DISCLOSURE

The present disclosure generally relates to wireless communication for user equipment devices (UEs) such as mobile computers, embedded systems, vehicles, all-electric and hybrid-electric powered vertical takeoff and landing (eV-TOL), wearables, or smartphones within enterprise mobile networks. More particularly, the present disclosure relates to intelligently increasing or decreasing the number and routing of wireless links established between a UE and an enterprise mobile network comprising a plurality of cellular network Radio Access Networks (RANs), non-cellular Access Points (APs) and cores.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as retail, e-commerce, military, disaster management, education, e.g., campus networks, financial transaction processing, airline reservations, enterprise data storage, or global communications. In addition, information handling systems may include a variety of hardware and software components that may be configured to process, store, and communicate information and may include one or more computer systems, data storage systems, and networking systems remotely available at edge compute locations or elsewhere in a network to a user equipment (UE) device. The information handling system may include telecommunication, network communication, and video communication capabilities. Various components of the information handling system may be scaled up or down dynamically by adjusting resources dedicated to operation of such components over time.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
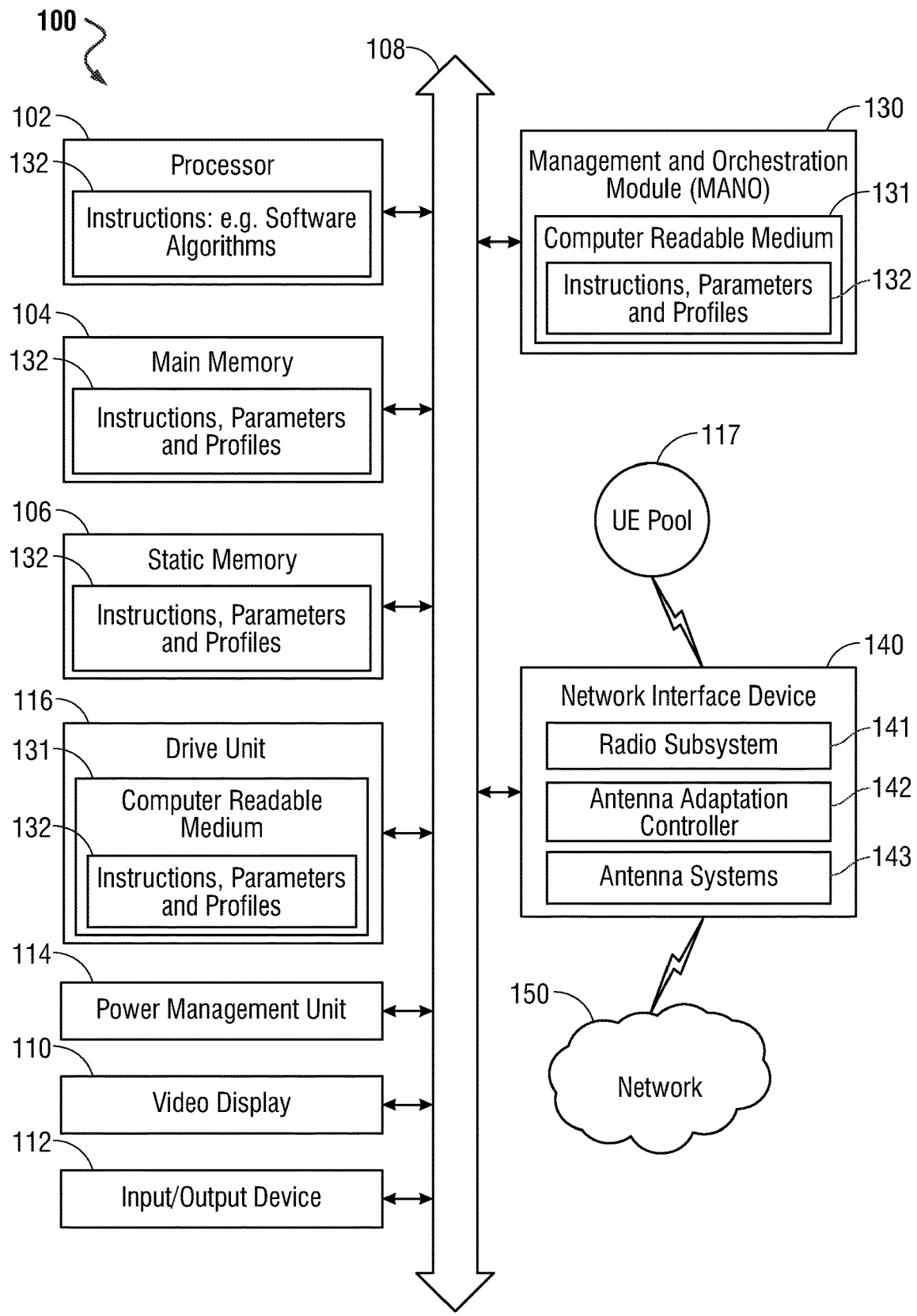
FIG. 1 is a block diagram illustrating an information handling system of an enterprise mobile network Management and Orchestration Module (MANO) according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems such as, for example, laptop/notebook computing devices, desktop computing devices, tablet computing devices, mobile phones, or other endpoint computing devices known in the art as user equipment devices (UEs), often utilize wireless networks in order to exchange data via a plurality of remote cloud networks forming the internet. Such UEs may communicate via one or more wireless links established between an antenna system of the UE and a cellular base station (BS) or non-cellular network access point (AP), for example. Large businesses or corporations may establish campuses in which employee UEs may establish wireless links to a remote cloud network via one or more business-operated enterprise mobile networks that include one or more of enterprise-managed UEs, antenna systems, radio access networks (RANs), and cellular network cores. Such an enterprise mobile network may incorporate infrastructure for establishing wireless links via a plurality of wireless communications standards, such as, for example, 4G cellular, 5G cellular, or non-cellular protocol such as Wi-Fi, or Bluetooth®. The mobile network in an embodiment may be managed by a Telco provider, or an enterprise other than a Telco provider. Although the phrase "enterprise mobile network" is used throughout the present application, embodiments described herein contemplate any mobile network in which a single entity directs, manages, maintains, or controls functionality of a plurality of UEs, one or more RANs, one or more APs, or one or more network cores.

A single enterprise mobile network may establish wireless links with a pool of UEs via one or more of a 4G Radio Access Network (RAN), a 5G RAN, or a non-cellular wireless communication AP. Further, communications received at each of the 4G RAN, 5G RAN, and non-cellular wireless communication AP may be routed to a remote cloud network via either a 4G Evolved Packet Core (EPC) or a 5G core. Routing non-cellular (e.g., Wi-Fi) traffic through such a 4G or 5G core may allow UEs that are not capable of direct communication with the 4G or 5G networks (e.g., not 4G or 5G compatible) to access the higher throughput and lower latency afforded by the 4G or 5G cellular network cores.

Performance of wireless links the UEs maintain within the enterprise mobile network may vary over time, dependent upon several variables. The accessibility demands of the UE, such as whether the UE is executing applications that require higher throughput, lower latency, traffic pattern (burst, linear, asynchronous), level and frequencies of user mobility events, network slice requirements, or heightened security measures may be included within these variables. Also included within these variables may be the types of cellular networks (4G or 5G) or non-cellular networks (e.g., varying Wi-Fi frequency ranges or Bluetooth®) supported by the UE. The location of the UE with respect to the remaining infrastructure of the enterprise mobile network may also be a variable, as the distance from the 5G RAN and line-of-sight between the UE and 5G RAN may significantly impact connectivity in the 5G mmWave frequency band, for example, or coverage maps may vary. Another variable may be the unique operational capabilities of certain infrastructure components, such as the ability to increase edge computing capacity at the 4G and 5G cores, and performance of network slicing at the 5G core. Finally, traffic or congestion at any one of the infrastructure components within the 4G RAN, 5G RAN, non-cellular AP, 4G EPC, or 5G core may impact throughput or latency of UE communications via the enterprise mobile network. The ways in which each of these variables impacts quality of wireless connections with the pool of UEs wirelessly linked within the enterprise mobile network may vary over time as the applications executed by these UEs changes, various UEs enter or leave the pool of linked UEs, the capabilities of the UEs within the pool changes (e.g., more 4G capable UEs enter and more 5G capable UEs exit), or the locations of various UEs within the pool changes.

The intelligent wireless carrier link management system in embodiments of the present disclosure addresses these changing conditions across a pool of enterprise-managed UEs by determining when each UE within the enterprise-managed pool would benefit from an increase, decrease, or rerouting of wireless links established between that UE and a remote cloud network via an enterprise mobile network. Such determinations may be made, in various embodiments described herein, as a result of changes in processing capacity at various enterprise mobile network infrastructure components, changes in security or power requirements for one or more UEs within the enterprise-managed pool, or on changing connectivity requirements for one or more UEs within the pool. For example, existing systems have addressed the variability of UE connectivity requirements in the past through a variety of means, including adaptively distributing UE wireless links across available wireless communications protocols (e.g., handover from cellular to Wi-Fi), permanently increasing the number of various types of infrastructure components of an enterprise mobile network (e.g., RAN components or cellular network core components) in a given area, permanently increasing the number of antennas at such base stations, or upgrading RANs to allow them to establish wireless links in a greater number of available bands (e.g., Wi-MAX or 5G mmWave).

The intelligent wireless carrier link management system operating at each UE within the enterprise mobile network in an embodiment may address these changing connectivity requirements by adaptively adjusting the wireless link antenna configuration at each UE to ensure the connectivity afforded by those wireless links meets the changing connectivity requirements of the UE over time. The intelligent wireless carrier link management system at individual UEs in embodiment described herein may routinely gather connectivity metrics and requirements describing currently executing software applications, security requirements, or power metrics for that UE. Connectivity metrics describing Quality of Service (QoS) measurements for available wireless links and connectivity requirements (e.g., throughput, latency, dropped packets, etc.) for performance of currently executing software applications may also be routinely monitored or gathered by the intelligent wireless carrier link management system in embodiments described herein. Location position, trajectory and speed may be monitored and gathered, too. The intelligent wireless carrier link management system may determine adjustments to wireless link antenna configurations may be necessary in order to ensure the connectivity requirements at the UE continue to be met, based upon changes to the connectivity metrics routinely gathered in such a way. Such wireless link antenna configuration adjustments in embodiments described herein may include activation or deactivation of antennas at the UE, routing or rerouting of wireless links from the UE to various RANs or non-cellular APs within the enterprise mobile network, or network slicing to route data transceived pursuant to execution of specific software applications at the UE through a specifically identified antenna at the UE, for example.

Wireless link antenna configuration adjustments in embodiments described herein may also be determined by a Management and Orchestration Module (MANO) operating remotely from each of the UEs within the enterprise mobile network. Such determinations may be made, in various embodiments described herein, in order to leverage changes in capacity at various infrastructure components of the RANs, non-cellular APs, and cores comprising the enterprise mobile network. The MANO may make such determinations and instruct adjustments at individual UEs to optimize performance across each of these infrastructure components and the pool of UEs communicating within the network. For example, the MANO may orchestrate functionality of the plurality of RANs and cellular network cores within an enterprise mobile network and assess the communication needs for a pool of enterprise-managed UEs wirelessly linked within such an enterprise mobile network. The MANO may then scale up or increase antenna systems or computing resources of various RANs or APs while scaling down or decreasing antenna systems or computing resources at other RANs or APs to increase the ability of the enterprise mobile network infrastructure to establish wireless links capable of satisfying connectivity requirements. Such scaling of the enterprise mobile network infrastructure components may prompt the MANO in embodiments of the present disclosure to increase, decrease, or reroute wireless links at one or more UEs communicating via the enterprise mobile network in order to take advantage of the optimized scaling of various enterprise mobile network infrastructure components.

The determination that a UE communicating within the enterprise mobile network requires fewer or greater wireless links, or rerouting of such links (e.g., as described directly above) may be made in various embodiments described herein at a computing node co-located with the MANO, or by the intelligent wireless carrier link management system operating at one of the UEs. Upon determination by the intelligent wireless carrier link management system or MANO in embodiments described herein that a UE communicating within the enterprise mobile network requires fewer or greater wireless links, or rerouting of such links, the intelligent wireless carrier link management system may operate, either alone or in tandem with the MANO, to accordingly adjust wireless links at one or more UEs. For example, the MANO in embodiments wherein additional wireless links are deemed necessary at an individual UE may activate an additional antenna at the individual enterprise-managed UE, and establish an additional wireless link via this additional antenna. The enterprise-managed UE in some embodiments described herein may be instructed by the MANO to establish such an additional wireless link with a specifically identified RAN, non-cellular AP, or cellular network core identified by the MANO as most likely to optimize distribution of processing resources and connectivity performance across a plurality of wireless links established within the enterprise mobile network by a plurality of enterprise-managed UEs.

The intelligent wireless carrier link management system in embodiments may also work alone or in tandem with the MANO to terminate wireless links at one or more UEs and deactivate antennas through which those wireless links are currently transceiving in various conditions. For example, wireless links established specifically for the purposes of secure data transmission may cease to be necessary when such transmission ends. As another example, wireless links established in order to optimize throughput or latency of communication for a given UE may be terminated when software applications requiring such throughput or latency metrics cease to execute at the UE. In such a way, and in various other embodiments described herein, the intelligent wireless carrier link management system may operate in tandem with a MANO of an enterprise mobile network to establish fewer or greater wireless links, or rerouting of such links by any one of a plurality of enterprise-managed UEs communicating via the enterprise mobile network in response to changing capabilities and demands of various UEs and infrastructure components across the enterprise mobile network.

FIG. 1 illustrates an information handling system 100 of a Management and Orchestration Module (MANO) 130 operating within an enterprise mobile network, or at edge computing for local management and orchestration or at a remote server for global management orchestration and testing according to embodiments described herein. As described herein, the enterprise mobile network may wireless couple to a pool 117 of enterprise-managed UEs in various embodiments described herein. The enterprise mobile network and multi-access edge computing (MEC) resources may be managed by enterprise IT professionals via the MANO 130. The MANO 130 in an embodiment may establish fewer or greater wireless links, or rerouting of such links by any one of a plurality of enterprise-managed UEs within pool 117 communicating via the enterprise mobile network. Such adjustments may be instructed at the UEs by the MANO in response to changing capabilities and demands of various UEs and infrastructure components across the enterprise mobile network.

The pool of UEs 117 may communicate via one or more wireless links established by an antenna system of one of the pool of UEs 117 for communication within the enterprise mobile network for example. Large businesses or corporations may establish campuses in which employee UEs (e.g., within the pool 117) may establish wireless links to the remote cloud network 150, or MEC resources via one or more business-operated enterprise wireless communication interface devices (e.g., 140). As described in greater detail with respect to FIG. 2, below, such enterprise mobile networks may incorporate infrastructure for establishing wireless links via a plurality of wireless communications standards, such as, for example, 4G cellular, 5G cellular, or non-cellular protocols such as Wi-Fi, or Bluetooth®. In such cases, a single enterprise mobile network executing a MANO 130 may establish wireless links with the pool of UEs 117 via one or more of the 4G Radio Access Network (RAN), the 5G RAN, a non-cellular wireless communication AP, or future wireless protocol RANs. Further, communications received at each of the 4G RAN, 5G RAN, and non-cellular wireless communication AP may be routed to a remote cloud network 150 via either a 4G Evolved Packet Core (EPC) or a 5G core. The MANO 130 in an embodiment may orchestrate performance at and between each of these non-cellular APs, RANs, and cores.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., smart phone, connected/autonomous vehicle, smart watches, wireless surveillance systems, wireless point of sale devices, drones), server (e.g., blade server or rack server), a consumer electronic information handling system, a network server or storage device, a network router, switch, or bridge, wireless router, or other network communication information handling system, a network connected device (cellular telephone, tablet information handling system, etc.), IoT computing device, wearable computing device, a set-top box (STB), a mobile device, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic information handling systems that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

More specifically, the information handling system 100 may orchestrate execution of a single node as well as a plurality of computing nodes, pods, clusters, or containers capable of performing computing tasks individually, or in combination with one another. In particular, several aspects of the 4G Radio Access Network (RAN), the 4G EPC, the 5G core, and the 5G RAN may function as containerized software applications executed by one or more runtime engines and orchestrated by the MANO 130. These runtime engines may be executed by one or more processors of a multi-access edge computing platform (MEC) described in greater detail with respect to FIG. 2 below. MEC system resources may be represented by the information handling system 100 of FIG. 1. MEC system resources may include the processor 102, which functions in an embodiment to execute code instructions of the MANO 130 or other applications requiring low-latency for one or more of the pool of UEs 112. The MEC processors may also operate to execute code instructions of various components of the 4G RAN, 5G RAN, 4G EPC, and 5G core for switching, network route selection, authentication, and other functions.

The 5G core, for example, processes data packets received from or en route to a UE (e.g., within pool 117) by executing containerized code instructions of an access and mobility management function (AMF), using MEC processor resources, to make application programming interface (API) calls to other 5G core network functions that each perform one or more data packet preparation steps. Thus, as described in greater detail with respect to FIG. 5 below, the AMF orchestrates execution of a plurality of other containerized 5G core network functions on each data packet received. The MANO 130 in an embodiment may assign specific processors of the MEC system represented by information handling system 100 to the execution of specifically identified 5G core network functions, or to other processing functions of the 4G RAN, 5G RAN, or 4G EPC, for example. The processor 102 in some embodiments may be a server system either in a remote cloud or locally at a MEC information handling system that execute code instructions of the MANO 130 to perform such an assignment. The MANO 130 may also limit the number of calls that each of these RANs or core functions may make to each of those assigned processors, or limit the number of nodes or pods hosting such functions.

The use of containerized software applications facilitates an abstraction or separation between the user of a software application (e.g., the AMF making API calls to the other 5G core network functions), the software application itself (the containerized 5G core network functions), and the computing environment (e.g., computing cluster) in which the software application is executing. As described in greater detail herein with respect to FIGS. 3 and 4, the serving gateway (S-GW) and packet data network gateway (P-GW) of the 4G EPC, the evolved Node B (eNodeB) of the 4G RAN, and the logical 5G radio node (gNodeB) of the 5G RAN may similarly operate through execution of containerized software applications. Thus, portions of the 4G RAN, the 5G RAN, 4G EPC, and the 5G network core in various embodiments described herein may each operate one or more computing nodes, pods, or clusters of computing resources for processing data packets via execution of containerized software applications using MEC memory and processing resources.

These computing nodes, pods, clusters, or containers in an embodiment may store an "image," or compiled, executable set of code instructions for the containerized software application. A run-time engine may access and execute these compiled, executable sets of code instructions according to calls made by a base band unit in the case of 4G RAN (as described in greater detail with respect to FIG. 3), an S-GW or P-GW of the 4G EPC (as described in greater detail with respect to FIG. 3), a RAN intelligent controller node in the case of 5G RAN (as described in greater detail with respect to FIG. 4), or the AMF at the 5G core (e.g., as described in greater detail with respect to FIG. 5). Each of these components capable of executing such run-time engines may further receive control instructions from the MANO 130 to increase or decrease the computing resources (e.g., MEC processor or memory availability, number of pods, number of clusters, number of nodes, number of containerized software application image replicas) dedicated to the processing of data packets according to each of the supported wireless communication standards or protocols (as described in greater detail with respect to FIG. 2 below). In other words, the MANO 130 may operate to increase or decrease the MEC computing resources made available for use by the 4G RAN, the 4G EPC, the 5G RAN, or the 5G core.

Software application containerization separates node configuration instructions from the code instructions for executing the underlying containerized software application (e.g., 4G EPC S-GW, MME and HSS, or P-GW, 5G core network functions, eNodeB functions, or gNodeB functions), allowing users to deploy the underlying containerized software application to any number of computing clusters or nodes. As software containerization has gained popularity, containerized application deployment tools, such as container-orchestration systems for automating computing application deployment, scaling, and management across several nodes or several clusters have emerged. The MANO 130 in an embodiment may incorporate such container-orchestration system functionality. For example, the MANO 130 in an embodiment may facilitate and manage delivery to a deployment cluster for the 5G network core of cluster configuration files to execute a containerized software application (e.g., 5G core network function), and immutable images of the underlying software application container (e.g., 5G core network function).

Each information handling system 100 may also represent a node that may comprise a separate MEC computing machine, and may contain one or more computing pods, each comprising at least a MEC processor 102 and MEC memory 103. Each pod may execute at least one containerized software application (e.g., a 5G core network function or other enterprise low latency software applications for UEs in pool 117). A single minion node may execute multiple pods, with each pod executing a different instance of the same containerized software application (e.g., a first instance of a 5G core network function, and a replica of the same 5G core network function). This may allow the minion node to quickly scale and balance the load of calls to the containerized software application across a plurality of pods, as well as decrease any downtime associated with bugs or errors occurring at a single pod. In other words, by scaling the number of nodes, pods, clusters, or containers executing any given 5G core network function (or any eNodeB or gNodeB functions), the MANO 130 may scale up or scale down the computing resources dedicated to processing data packets according to a specific UE-requested protocol (e.g., 4G, 5G, or non-cellular).

Information handling system 100 can include devices or modules that embody one or more of the devices or execute instructions for the one or more systems and modules described above, and operates to perform one or more of the methods described above. The information handling system 100 may execute code instructions 132 that may operate on local or remote servers or systems, remote cloud networks, or on-box in individual client information handling systems according to various embodiments herein. In some embodiments, it is understood any or all portions of code instructions 132 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 131 storing instructions 132 of the MANO 130, and drive unit 116 (volatile (e.g., random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an alpha numeric input device 112, such as a keyboard, and/or a cursor control device, such as a mouse, touchpad, or gesture or touch screen input device. The information handling system 100 can also include a disk drive unit 116.

The network interface device 130 may provide connectivity of the information handling system 100 to one or more UEs (e.g., within pool 117) via one or more LAN or WAN communication links in the case of an enterprise local or remote server as information handling system 100 in an embodiment. As described in greater detail herein, each UE in the pool 117 may communicate with the MANO 130 (e.g., either through wired connection, wireless connection with the 4G RAN, 5G RAN, or AP, or out-of-band (OOB) communications) to share gathered connectivity metrics for wireless links established by that UE, connectivity metrics describing currently executing software applications at the UE, security requirements for UE wireless communication, power consumption metrics at the UE, connectivity metrics, or UE location data for determining UE connectivity requirements.

The network interface device 130 may provide connectivity to a Wide Area Network (WAN), a Wireless Wide Area Network (WWAN) communication network, a private LTE communication network, a 4G LTE public communication network, or a 5G millimeter-wave (mm-wave) communication network, or other cellular communication networks in the case of an information handling system 100 operating as an AP or cellular RAN in some embodiments. Connectivity of the information handling system 100 to the pool 117 of UE devices or to any of a plurality of remote cloud networks 150 in an embodiment may be via wired or wireless connection. In some aspects of the present disclosure, the network interface device 130 may operate two or more wireless links. In other aspects of the present disclosure, the information handling system 100 may include a plurality of network interface devices 130, each operating separate radio subsystems 141.

The network interface device 130 may operate in accordance with any cellular wireless data communication standards. Network interface device 130, in an embodiment, may connect to any combination of macro-cellular wireless connections including 2G, 2.5G, 3G, 4G, 5G or the like from one or more service providers, including an enterprise managed RAN. Utilization of radiofrequency communication bands according to several example embodiments of the present disclosure may include bands used with the WWAN standards, which may operate in both licensed and unlicensed spectrums. More specifically, the network interface device 130 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards now emerging. NRFR2 may include radio frequencies above 6 GHz, made available within the now emerging 5G communications standard. Communications within NRFR1 may be enabled through the use of either an evolved Node B (eNodeB) of a 4G RAN (as described in greater detail with respect to FIG. 3) in combination with the 4G EPC, or the 5G network core (as described in greater detail with respect to FIG. 5), or a logical 5G radio node (gNodeB) of the 5G RAN (as described in greater detail with respect to FIG. 4), in combination with the 5G network core.

Frequencies related to the 5G networks may include low-frequency (e.g., below 1 GHz), mid-frequency (e.g., between 1 GHz and 6 GHz) and high-frequency (HF) (e.g., above 6 GHz) bands. Citizen's Broadband Spectrum (CBRS) operating within the mid-frequency band (e.g., 3.5 Ghz) may be included as well. WWAN may use the Unlicensed National Information Infrastructure (U-NII) band which typically operates in the ~5 GHz frequency band such as 802.11 a/h/j/n/ac/ax (e.g., center frequencies between 5.170-5.785 GHz). It is understood that any number of available channels may be available under the 5 GHz shared communication frequency band. WWAN may operate in a number of bands, some of which are proprietary but may include a wireless communication frequency band at approximately 2.5 GHz band for example. In additional examples, WWAN carrier bands may operate at frequency bands of approximately 700 MHz, 800 MHz, 1900 MHz, or 1700/2100 MHz for example as well.

In an embodiment, the network interface device 130 may be communicatively coupled to an array of antenna systems 143. The antenna controller 142 may monitor wireless link state information, wireless link configuration data, network slice data, or other input data to generate channel estimation and determine antenna radiation patterns. The network interface device 130 in an embodiment may further include a radio subsystem 141 which may operate to modulate and demodulate signals transceived within a WWAN or WLAN format, set signal transmission power levels or sensitivity to signal reception, select channels or frequency bands, and conduct other functions in support of a wireless transmission from the pool of UEs 117 to 4G EPC 150 or the 5G network core 170.

The network interface device 130 in an embodiment may also provide connectivity to a WLAN network that may be a wired local area network (LAN), a wireless personal area network (WPAN), a public WiFi communication network, a private WiFi communication network, a public WiMAX communication network, a Bluetooth® communication network, or any other non-cellular (non-3GPP) communication networks. To communicate with a wireless local area network, standards including IEEE 802.11 WLAN standards, IEEE 802.15 WPAN standards, WiMAX, Bluetooth®, or similar wireless standards may be used. Utilization of radiofrequency communication bands according to several example embodiments of the present disclosure may include bands used with the WLAN standards which may operate in both licensed and unlicensed spectrums. For example, WLAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band, or a 60 GHz band.

The information handling system 100 may further include a power management unit (PMU) 114 (a.k.a. a power supply unit (PSU)). The PMU 114 may manage the power provided to the components of the information handling system 100 such as the processor 102 such as a CPU or embedded controller, a cooling system, one or more drive units 116, a graphical processing unit (GPU), a video/graphic display device or other input/output devices 112, and other components that may require power when a power button has been actuated by a user. In an embodiment, the PMU 114 may monitor power levels and be electrically coupled to the information handling system 100 to provide this power and coupled to bus 108 to provide or receive data or instructions.

Information handling system 100 includes one or more of an operating system (OS), and basic input/output system (BIOS) firmware/software or application programs that may be executable instructions 132 executed at any processor 102 and stored at one or more memory devices 104, 106, or 116. BIOS firmware/software functions to initialize information handling system 100 on power up, to launch an OS, and to manage input and output interactions between the OS and the other elements of information handling system 100. In a particular embodiment, BIOS firmware/software resides in memory 104, and include machine-executable code that is executed by processor 102 to perform various functions of information handling system 100 as described herein. In another embodiment (not illustrated), application programs and BIOS firmware/software reside in another storage medium of information handling system 100. For example, application programs and BIOS firmware/software can reside in drive 116, in a ROM (not illustrated) associated with information handling system 100, in an option-ROM (not illustrated) associated with various devices of information handling system 100, in a storage system (not illustrated) associated with network channel of the network interface device 130, in another storage medium of information handling system 100, or a combination thereof. Executable code instructions 132 for application programs and BIOS firmware/software can each be implemented as single programs, or as separate programs carrying out the various features as described herein.

In some embodiments, software, firmware, dedicated hardware implementations such as application specific integrated circuits, programmable logic arrays and other hardware information handling systems can be constructed to implement one or more of the methods described herein. Applications that may include the apparatus and systems of various embodiments can broadly include a variety of electronic and computer systems. One or more embodiments described herein may implement functions using two or more specific interconnected hardware modules or information handling systems with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 132 or receives and executes instructions, parameters, and profiles 132 responsive to a propagated signal. The information handling system 100 can include a set of instructions 132 that can be executed to cause the computer system to perform any one or more of the methods or computer-based functions disclosed herein. For example, instructions 132 may execute a MANO 130 in an embodiment to establish fewer or greater wireless links, or rerouting of such links by any one of a plurality of enterprise-managed UEs in pool 117 communicating via the enterprise mobile network in response to changing capabilities and demands of various UEs in pool 117 and infrastructure components across the enterprise mobile network. Various software modules comprising application instructions 132 may be coordinated by an operating system (OS), and/or via one or more application programming interfaces (APIs). An example operating system may include Windows®, Android®, and other OS types known in the art. Example APIs may include Win 32, Core Java API, or Android APIs.

The disk drive unit 116 and may include a computer-readable medium 131 in which one or more sets of instructions 132 such as software can be embedded to be executed by the processor 102 and antenna controller 142 to perform the processes described herein. Similarly, main memory 104 and static memory 106 may also contain a computer-readable medium for storage of one or more sets of instructions, parameters, or profiles 132. The disk drive unit 116 or static memory 106 also contain space for data storage. Further, the instructions 132 may embody one or more of the methods or logic as described herein. In a particular embodiment, the instructions, parameters, and profiles 132 may reside completely, or at least partially, within the main memory 104, the static memory 106, and/or within the disk drive 116 during execution by the processor 102 or an antenna controller (e.g., 142) of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The drive unit 116 may include access to a computer-readable medium 131 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such devices, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
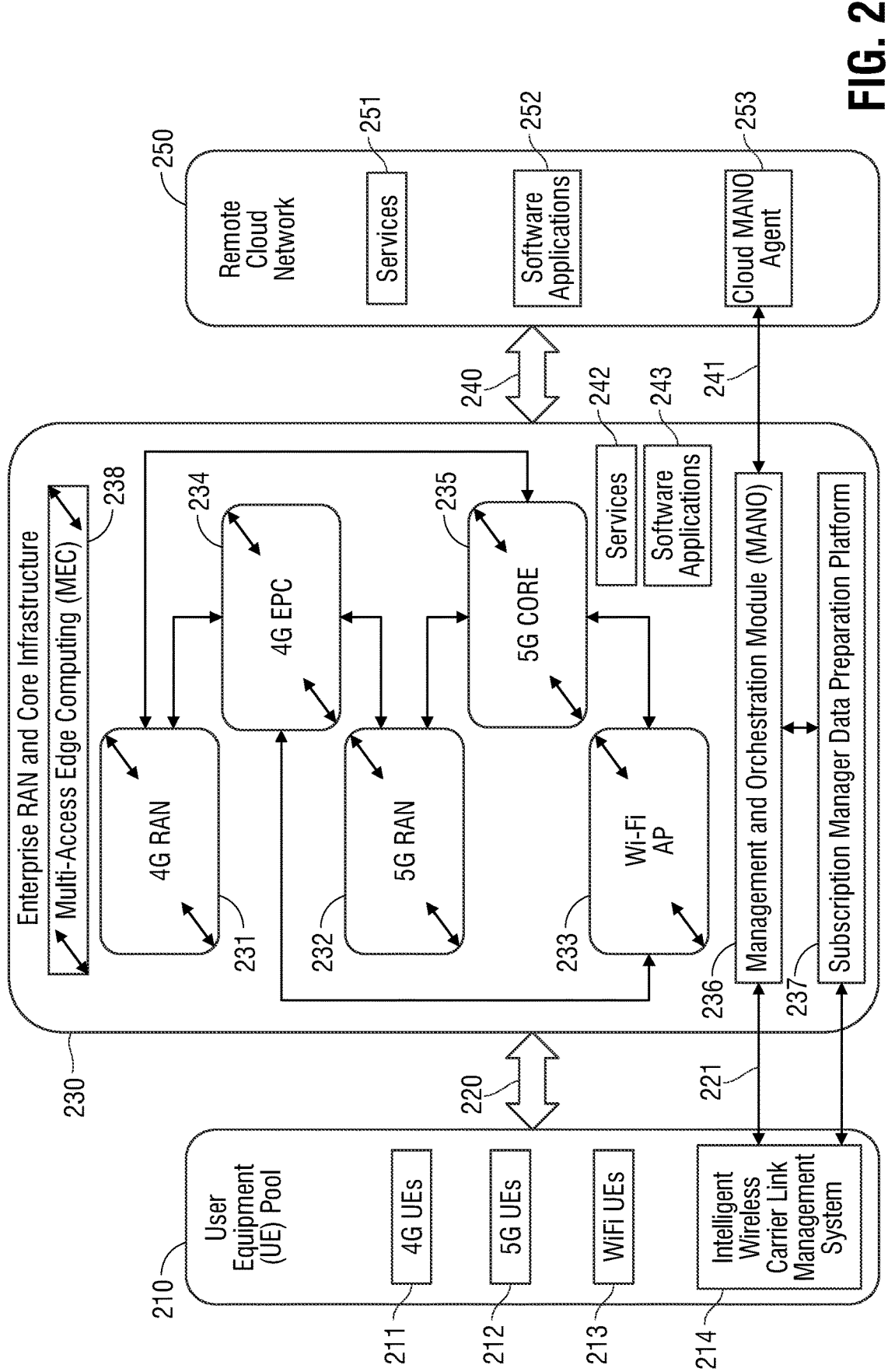
FIG. 2 is a block diagram illustrating an enterprise mobile network comprising various infrastructure components managed by a MANO according to an embodiment of the present disclosure.

FIG. 2 is a block diagram illustrating connectivity of a pool of user equipment devices (UEs) to a remote cloud network, via an enterprise mobile network comprising various and plural managed RAN, cellular network core, and MEC infrastructure components managed by a management and orchestration module (MANO) according to an embodiment of the present disclosure. As described herein, information handling systems, or user equipment devices (UEs) (e.g., within a pool 210) often utilize wireless networks in order to exchange data via a plurality of remote cloud networks (e.g., 250) forming at least a portion of the internet. Such UEs may communicate via one or more wireless links (e.g., 220) established between the UE and one or more business-operated enterprise RAN and core infrastructure modules (e.g., 230). For example, enterprise RAN and core infrastructure module 230 may incorporate infrastructure for establishing wireless links via a plurality of wireless communications standards, such as, for example, 4G cellular, 5G cellular, or non-cellular protocol such as Wi-Fi, or Bluetooth®. In such cases, a single enterprise RAN and core infrastructure module 230 may establish wireless links with a pool 210 of UEs via one or more of a 4G Radio Access Network (RAN) 231, a 5G RAN 232, or a non-cellular wireless communication AP 233. Further, communications received at each of the 4G RAN 231, 5G RAN 232, and non-cellular wireless communication AP 233 may be routed to a remote cloud network 250 via either a 4G Evolved Packet Core (EPC) 234 or a 5G core 235 and a wired backhaul connection 240 (e.g., SG1-U interface or N6 interface defined by the technical specifications 3GPP TS 23.88 and 3GPP TS 23.501, respectively).

Each of these enterprise mobile network infrastructure components (e.g., 231, 232, 233, 234, or 235) may utilize processors and memory of a Multi-Access Edge Computing Platform (MEC) 238, or other processing resources co-located at the enterprise RAN and core infrastructure 230 in order to execute their required processing of data frames or packets. In other words, ability of each of the enterprise mobile network infrastructure components (e.g., 231, 232, 233, 234, or 235) to perform may hinge upon the volume and quality of MEC 238 resources made available to it. Thus, the overall quality (e.g., as measured by QoS metrics such as latency, throughput, or dropped packets) of connectivity between the UE pool 210 and services 251 or software applications 252 at the remote cloud network 250 or edge services 242 or edge software applications 243 in an embodiment may be impacted by configuration and execution of the 4G RAN 231, 5G RAN 232, Wi-Fi AP 233, 4G EPC 234, 5G core 235, and MEC 238, and by routing of communications between and among each of these enterprise mobile network infrastructure components (e.g., 231, 232, 233, 234, or 235). The Management and Orchestration Module 236 and the intelligent wireless carrier link management system 237 in an embodiment may operate to adaptively optimize such infrastructure configurations and traffic routing to provide the best overall connectivity between the UE pool 210 and the remote cloud network 250 or local MEC resources 258 as the demands of those UEs in pool 210 change over time.

The UE pool 210 may include several different types of mobile devices, each with different networking capabilities. For example, the pool 210 may include 4G UEs 211 that are capable of communication via the 4G cellular communications standard, 5G UEs 212 that are capable of communication via the 5G cellular communications standard, or Wi-Fi UEs 213 that are capable of communication via non-cellular (e.g., non-3GPP) communications standards such as Wi-Fi, Bluetooth®, and Near Field Communication (NFC). Some UEs within pool 210 may comprise 4G UEs 211 and 5G UEs 212, if such UEs are capable of communication according to both of these standards. As another example, some UEs within pool 210 may be capable of communication according to both the 4G communications standard and the non-cellular (e.g., Wi-Fi) standard, such that those UEs comprise both 4G UEs 211 and Wi-Fi UEs 213. In yet another example, some UEs within pool 210 may be capable of communication according to both the 5G communications standard and the non-cellular (e.g., Wi-Fi) standard, such that those UEs comprise both 5G UEs 212 and Wi-Fi UEs 213. In still another example, some UEs within pool 210 may be capable of communication according to the 4G communications standard, the 5G communications standard, and the non-cellular (e.g., Wi-Fi) standard, such that those UEs comprise both 4G UEs 211, 5G UEs 212, and Wi-Fi UEs 213. It is contemplated that various UEs in pool 210 may have any combination of wireless capabilities in some embodiments.

Each of the UEs in pool 210 may execute an intelligent wireless carrier link management system 214 of the MANO 236. These intelligent wireless carrier link management systems 214 in an embodiment may communicate with the MANO 236 located at the enterprise RAN and core infrastructure module 230 and managed by the enterprise to gather connectivity metrics and connectivity requirements for each of the UEs within pool 210. Such communication may occur via wireless links 220 established between the pool of UEs 210 and one or more of the 4G RAN 231, 5G RAN 232 or Wi-Fi AP 233, or via wired or wireless out-of-band (OOB) communications 221 directly between the MANO 236 and the intelligent wireless carrier link management system 214 in an embodiment. This data, along with data gathered at the various infrastructure components (e.g., 231, 232, 233, 234, or 235) of the enterprise RAN and core infrastructure module 230 may be used to determine current and desired connectivity between the UE pool 210 and the remote cloud network 250.

Connectivity metrics of the UEs in pool 210 in an embodiment may describe currently executing software applications at each of the UEs, battery power remaining at each of the UEs, or security requirements for each of the UEs, for example. Connectivity metrics in an embodiment for each UE may include measurements of various quality of service (QoS) variables for established wireless links (e.g., 220), including, for example, latency, throughput, dropped packets, security levels (e.g., Virtualized Private Network (VPN) tunnels), or network slice designations. Connectivity requirements for each UE in pool 210 may describe available types of wireless radios of the UEs. Connectivity requirements for each UE in pool 210 in an embodiment may further describe QoS requirements for each UE, as defined by policies associated with each UE, or as determined by the MANO 236 or the intelligent wireless carrier link management system 214 based on currently executing software applications at each of the UEs in pool 210.

Each of these variables may impact overall quality of communications between the pool of UEs 210 and the remote cloud network 250 in an embodiment. For example, accessibility demands of the UEs in pool 210, such as whether the UE is executing applications that require higher throughput, lower latency, or heightened security measures may be included within these variables. Also included within these variables may be the types of cellular networks (4G or 5G) or non-cellular networks (e.g., varying Wi-Fi frequency ranges or Bluetooth®) supported by the UE. The location of the UE with respect to the enterprise RAN and core infrastructure module 230 may also be a variable, as the distance from the 5G RAN 232 and line-of-sight between the UE and 5G RAN 232 may significantly impact connectivity in the 5G mmWave frequency band, for example, or coverage maps may vary for other RANs 231 or 235. Another variable may be the unique operational capabilities of certain infrastructure components, such as the ability to increase edge computing (e.g., MEC 238) capacity at the 4G EPC 234 and 5G core 235, and performance of network slicing at the 5G core 235. Finally, traffic or congestion at any one of the infrastructure components within the 4G RAN 231, 5G RAN 232, non-cellular AP 233, 4G EPC 234, or 5G core 235 may impact throughput or latency of communications between a UE in pool 210 and the remote cloud network 250 via the enterprise RAN and core infrastructure module 230. The ways in which each of these variables impacts quality of connection between the pool of UEs 210 and the remote cloud network 250 may vary over time as the applications executed by these UEs in pool 210 changes, various UEs enter or leave the pool 210 of linked UEs, the capabilities of the UEs within the pool 210 changes (e.g., 4G UEs 211 increase in volume or 5G UEs 212 decrease in volume), or the locations of various UEs within the pool 210 changes relative to the enterprise RAN and core infrastructure module 230.

The MANO 236 in an embodiment may also gather connectivity metrics and requirements, infrastructure component configurations, MEC resource distribution metrics from each of the 4G RAN 231, the 5G RAN 232, the Wi-Fi AP 233, the 4G EPC 234, and the 5G network core 235 in order to optimize overall connectivity between the user pool 210 and the remote cloud network 250 or MEC 238 resources in an embodiment. For example, the MANO 236 may gather from each of these enterprise mobile network infrastructure components (e.g., the 4G RAN 231, the 5G RAN 232, the Wi-Fi AP 233, the 4G EPC 234, and the 5G network core 235) the RAN and core network conditions describing, for example, guaranteed bitrates, number of network slices available, number of active bearers and wireless links established with the pool of UEs 210, processor utilization rates, and antenna and switch loads. The MANO 236 may further gather RAN and MEC infrastructure component configurations from the MEC 238, including current and total processor and memory availability, and distribution of processing and memory resources of the MEC 238 made available to each of the 4G RAN 231, the 5G RAN 232, the Wi-Fi AP 233, the 4G EPC 234, and the 5G network core 235.

The MANO 236 in an embodiment may assess the communication needs for a pool 210 of enterprise-managed UEs wirelessly linked to an enterprise RAN and core infrastructure module 230 operating a plurality of cellular and non-cellular RANs, APs, and network cores. Both the enterprise RAN and core infrastructure module 230 and the pool 210 of enterprise-managed UEs in various embodiments described herein may be managed by enterprise IT professionals via a Management and Orchestration Module (MANO) 236, which may operate in part at the enterprise RAN and core infrastructure module 230, and in part (e.g., via intelligent wireless carrier link management system 214) at each of the UEs within the enterprise-managed pool 210 as well as remotely-located global management and orchestration in the cloud in various embodiments. The MANO 236 in embodiments described herein may operate to perform adjustments predicted by the intelligent wireless carrier link management system 237 (e.g., as output from a neural network) to optimize ability of the enterprise network to meet connectivity requirements of the pool 210 of enterprise-managed UEs.

The MANO 236 may orchestrate functionality of the 4G RAN 231, 4G EPC 234, 5G RAN 232, 5G Core 235, Wi-Fi AP 233, and MEC resources 238 and assess the communication needs for the pool 210 of enterprise-managed UEs wirelessly linked to the enterprise RAN and core infrastructure 230. The MANO 236 may scale up or increase antenna systems or computing resources of various RANs (e.g., 231 or 232), APs (e.g. 233), or cores (e.g., 234 or 235) while scaling down or decreasing antenna systems or computing resources at other RANs (e.g., 231 or 232), APs (e.g. 233), or cores (e.g., 234 or 235) to increase the ability of the components within the enterprise RAN and core infrastructure 230 to establish wireless links capable of satisfying connectivity requirements for the pool 210. Such scaling of the components within the enterprise RAN and core infrastructure 230 may prompt the MANO 236 in embodiments of the present disclosure to increase, decrease, or reroute wireless links at one or more UEs in pool 210 communicating via the enterprise mobile network in order to take advantage of the optimized scaling of various components within the enterprise RAN and core infrastructure 230.

The MANO 236 in an embodiment may also instruct UEs within pool 210 to establish or alter wireless link parameters or antenna configuration to account for such infrastructure scaling. The MANO 236 facilitates this, for example, by adjusting policies for one or more of these UEs in pool 210 as stored at the 4G EPC 234 (as described in greater detail with respect to FIG. 3) or the 5G core 235 (as described in greater detail with respect to FIG. 5). Wireless policy adjustments at the one or more UEs in pool 210 may include selecting among subscriptions to access one or more service provider radio access networks or may include policy adjustments that include selection among other available wireless radio access networks that may be subscription-based, enterprise managed private networks, or public wireless networks.

Such policies may be assigned to each UE by an IT professional of the enterprise operating the enterprise mobile network, and may be adjustable or dynamically adaptable based on real-time metrics describing the usage, location, or movement of the UE, or changes to the infrastructure of the enterprise mobile network. For example, in an embodiment described with reference to FIG. 2, in which the MANO 236 increases capabilities at the 4G RAN 231, or 4G EPC 234, the MANO 236 may also adjust a policy favoring or prioritizing 5G wireless links and for one or more of the UEs in pool 210 to favor 4G wireless links, in order to direct those UEs to communicate via the 4G RAN 231 and 4G EPC 234. Those UEs may thus take advantage of the expanded capabilities at those 4G components of the enterprise RAN and core infrastructure 230. As another example, in an embodiment in which the MANO 236 increases capabilities at the 5G RAN 232, or 5G core 235, the MANO 236 may also adjust a policy favoring or prioritizing 4G wireless links for one or more of the UEs in pool 210 to favor 5G wireless links, in order to direct those UEs to communicate via the 5G RAN 232 and 5G core 235. Those UEs may thus take advantage of the expanded capabilities at those 5G components of the enterprise RAN and core infrastructure 230. In still another example, in an embodiment in which the MANO 236 decreases capabilities at the 4G RAN 231, or 5G RAN 232, the MANO 236 may also adjust a policy favoring or prioritizing cellular wireless links for one or more of the UEs in pool 210 to favor or prioritize non-cellular (e.g., non-3GPP, Wi-Fi, Bluetooth®) wireless links, in order to direct those UEs to communicate via the Wi-Fi AP 233. Those UEs may thus compensate for the diminished capabilities at the RAN components (e.g., 231 and 232) of the enterprise RAN and core infrastructure 230.

One or more of the UEs in pool 210 in an embodiment may also be associated with an electronic subscriber identity module (eSIM) profile stored at a subscription manager data preparation platform 237 of the enterprise mobile network. Such eSIM profiles may be maintained by an IT professional of the enterprise mobile network and may be associated with or contain credentials unique to a single UE within pool 210 that can be used to identify one or more separate enterprise UE connectivity profiles associated with that single UE describing intended functionality of the UE at a given time and associated enterprise profile requirements. For example, such enterprise profile requirements may include a low-power profile in which the user intends to operate the UE under battery power, a travel profile in which the user intends to operate the UE while in transit or located remotely from an enterprise campus or other preferred location. As another example, such enterprise profile requirements may include one or more connectivity requirements needed to optimize performance of one or more software applications currently executing or which the user intends to execute shortly at the UE. More specifically, such enterprise profile requirements may indicate a priority for wireless links optimized for high throughput, low latency, or high security, for example.

Figure 7:
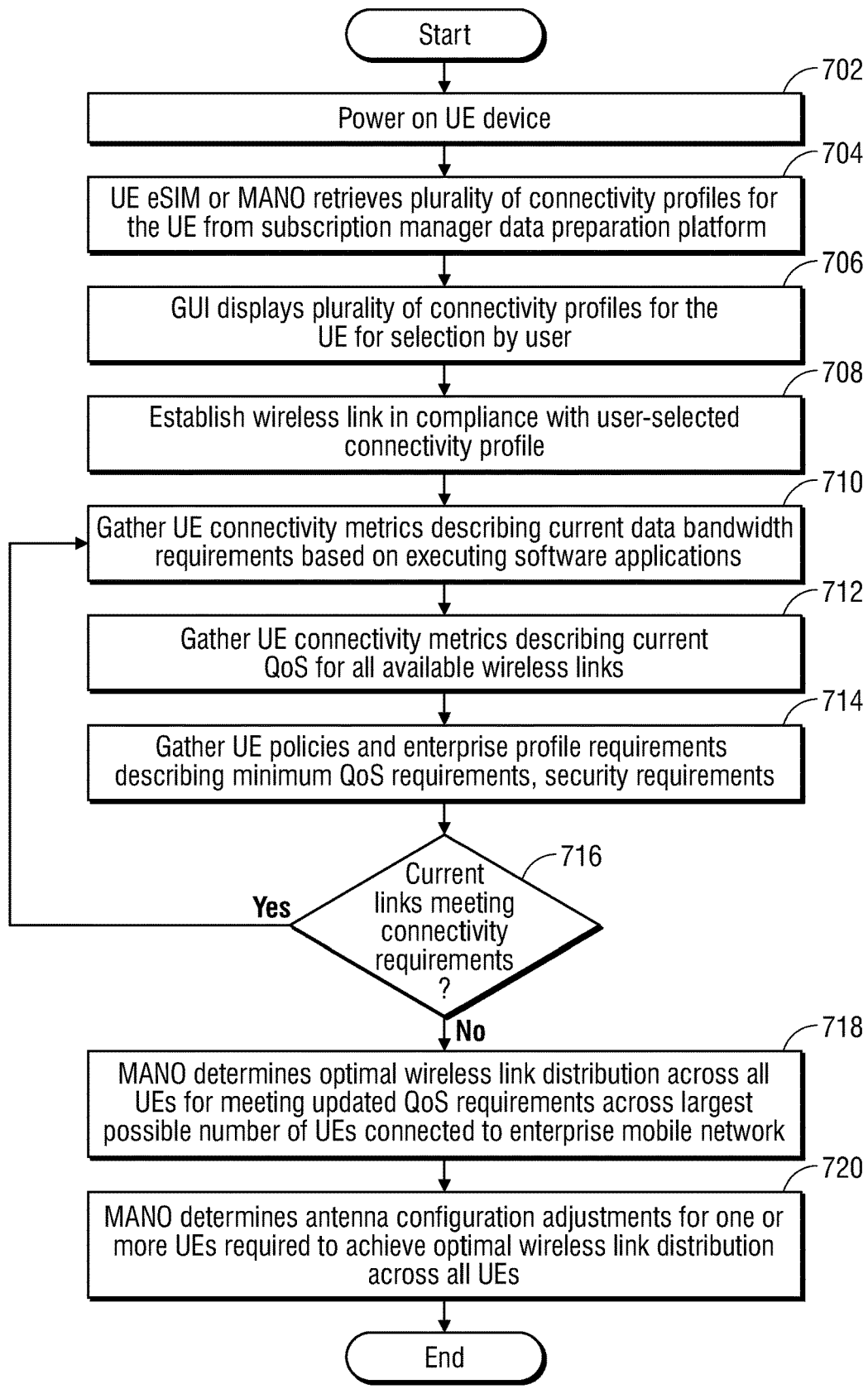
FIG. 7 is a flow diagram illustrating a method of determining a UE antenna configuration adjustment according to an embodiment of the present disclosure.

Each UE within pool 210 in an embodiment may operate an intelligent wireless carrier link management system 214 which may function to adjust antennas at individual UEs according to UE antenna configuration adjustments determined at the MANO 236 (e.g., as described in greater detail with respect to FIG. 8) or by the intelligent wireless carrier link management system 214 itself, as described in greater detail with respect to FIG. 7. Such UE antenna configuration adjustments in various embodiments described herein may be made based on changing operating conditions (e.g., connectivity requirements and metrics) at one or more of the UEs within pool 210, changes made to enterprise UE connectivity profiles stored at the subscription manager data preparation platform 237, or on changes in capacity at one or more enterprise RAN and core infrastructure 230 components (e.g., 4G RAN 231, 5G RAN 232, or non-cellular AP 233) made by the MANO 236.

The ways in which connectivity metrics for wireless links 220 established between the UE pool 210 and the enterprise RAN and core infrastructure 230 impacts quality of communications between the pool 210 of UEs and the remote cloud network 250 or MEC metrics, as routed through various components of the enterprise RAN and core infrastructure 230 may vary over time as the applications executed by these UEs changes, various UEs enter or leave the pool 210 of linked or managed UEs, the capabilities of the UEs within the pool 210 changes (e.g., more 4G capable UEs 211 enter and more 5G capable UEs 212 exit), or the locations of various UEs within the pool 210 changes. The MANO 236 in an embodiment addresses these issues by routinely assessing the communication needs for the pool 210 of UEs wirelessly linked to the enterprise RAN and core infrastructure 230 operating a plurality of cellular and non-cellular RANs (e.g., 231 and 232), APs (e.g., 233), and network cores (e.g., 234 and 235) and adjusting availability of resources at each of these RANs, APs, and cores to meet UE needs.

For example, the MANO 236 in an embodiment may scale up computing or processing resources available at any of the 4G RAN 231, 5G RAN 232, 4G EPC 234, or 5G core 235 based on determination that a RAN or core is experiencing congestion, high-latency, or low throughput. In such an embodiment, the MANO 236 may further work in tandem with the intelligent wireless carrier link management system 214 at one or more UEs in the pool 210 to take advantage of these scaled up computing or processing resources by transceiving at least a portion of data through the recently scaled up component of the enterprise RAN and core infrastructure 230. As another example, the MANO 236 in an embodiment may increase the number of antennas transceiving data at the 4G RAN 231, 5G RAN 232, or Wi-Fi AP 233 when one of these components of the enterprise RAN and core infrastructure 230 is experiencing high traffic load. In such an embodiment, the MANO 236 may further work in tandem with the intelligent wireless carrier link management system 214 at one or more UEs in the pool 210 to take advantage of these newly added antennas by transceiving at least a portion of data through the recently activated antennas.

The MANO 236 in an embodiment may also operate to redistribute wireless links between a plurality of UEs in the pool 210 and various infrastructure components (e.g., 4G RAN 231, 5G RAN 232, non-cellular AP 233, 4G EPC 234, or 5G core 235) of the enterprise RAN and core infrastructure 230 to ensure UE connectivity requirements are met for as many UEs in pool 210 as possible. In such an embodiment, the MANO 236 may do so, for example, by assigning one or more wireless links capable of meeting specific UEs connectivity requirements, as indicated by connectivity metrics for those wireless links, to that specific UE. More specifically, the MANO 236 in such an example embodiment may assign a wireless link with the 4G RAN 231, 5G RAN 232, or non-cellular AP 233 having connectivity metrics indicating a high throughput to a UE within pool 210 having a connectivity requirement for high throughput. As another example, the MANO 236 in such an example embodiment may assign a wireless link with the 4G RAN 231, 5G RAN 232, or non-cellular AP 233 having connectivity metrics indicating a low latency to a UE within pool 210 having a connectivity requirement for low latency.

In some cases, UE connectivity requirements cannot be met for all UEs in the pool 210. For example, the number of wireless links having connectivity metrics indicating high throughput may be less than the number of UEs in pool 210 that are requesting high throughput wireless links. As another example, the number of wireless links having connectivity metrics indicating low latency may be less than the number of UEs in pool 210 that are requesting low latency wireless links. In such scenarios, the MANO 236 may access Enterprise UE connectivity profiles from the subscription manager data preparation platform 237 to determine which UEs in pool 210 should be given priority for wireless links in high demand. Such profiles may indicate a UE rank or priority status, as assigned to the UE by an IT professional of the enterprise. For example, a UE assigned to a corporate officer of the enterprise may be given a higher UE rank or priority status in comparison to a UE assigned to a new employee. As another example, a UE designated for processing large volumes of data central to the business operations of the enterprise may be given a highest UE rank or priority status. As yet another example, a UE located within a certain geographical area such as a secure portion of an enterprise campus or a meeting room of an enterprise campus routinely used for sales or negotiations may be given a higher UE rank or priority status. These UE ranks or priority statuses may be considered enterprise profile requirements in various embodiments described herein. By retrieving or accessing such enterprise UE connectivity profiles stored at the subscription manager data preparation platform 237 in an embodiment, the MANO 236 may assign wireless links in high demand to UEs in pool 210 indicating such a demand according to UE rank or priority status. For example, the MANO 236 may assign high demand wireless links to all UEs in pool 210 indicating such a demand in a highest UE rank or priority status first, then in descending order of UE rank or priority status until all high demand wireless links have been distributed.

Figure 3:
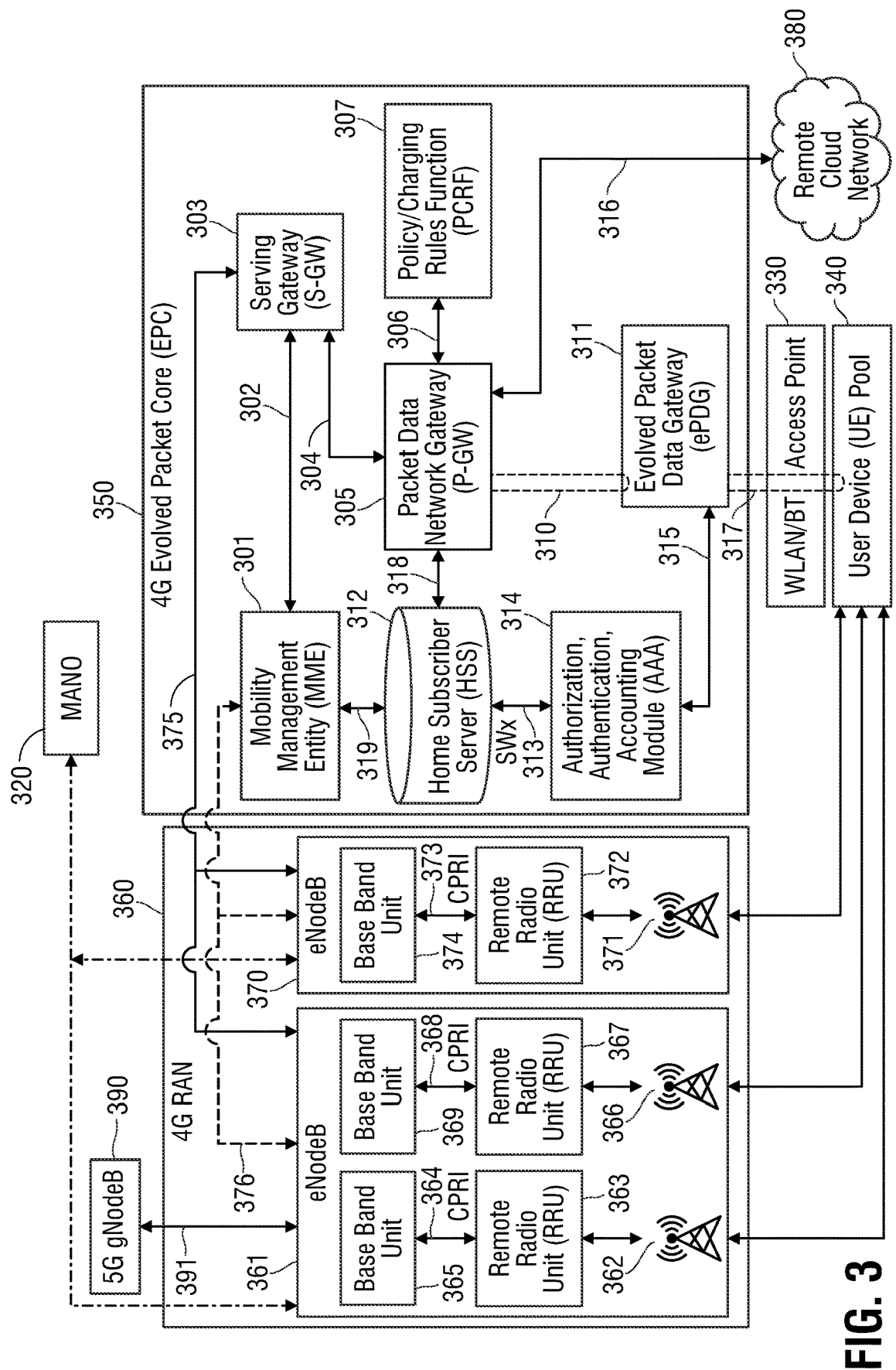
FIG. 3 is a block diagram illustrating a 4G Radio Access Network (RAN) and Evolved Packet Core (EPC) according to an embodiment of the present disclosure.

FIG. 3 is a block diagram illustrating a 4G Radio Access Network (RAN) 360 and Evolved Packet Core (EPC) 350 of an enterprise mobile network according to an embodiment of the present disclosure. As described herein, user equipment devices (UEs), such as laptop/notebook computing devices, desktop computing devices, tablet computing devices, mobile phones, or other endpoint computing devices often utilize wireless networks in order to exchange data via a plurality of remote cloud networks 380. Such UEs may communicate via one or more wireless links established between an antenna system of the UE and a 4G Radio Access Network (RAN) 360 or non-cellular network access point (AP) 330, for example. Large businesses or corporations may establish campuses in which employee UEs may establish wireless links to a remote cloud network 380 via one or more business-operated enterprise mobile networks. Such enterprise mobile network may incorporate infrastructure for establishing wireless links via a plurality of wireless communications standards, such as, for example, 4G cellular, 5G cellular, or non-cellular protocol such as Wi-Fi, or Bluetooth®. In such cases, a single enterprise mobile network may establish wireless links with a pool 340 of UEs via one or more of a 4G RAN (e.g., 360), a 5G RAN, or a non-cellular wireless communication AP (e.g., 330). Further, communications received at each of the 4G RAN (e.g., 360), 5G RAN, and non-cellular wireless communication AP (e.g., 330) may be routed to a remote cloud network 380 via either a 4G Evolved Packet Core (EPC) (e.g., 350) or a 5G core. FIG. 3 illustrates a 4G RAN 360 communicably linked to a pool of UEs 340, a 5G gNodeB 390 of a 5G RAN, and a 4G EPC 350 to establish wireless communications according to the 4G standard with the pool of UEs 340.

The 4G RAN 360 comprises a plurality of computing nodes called eNodeBs (e.g., 361 or 370) that operate to transceive data with the user device (UE) pool 340 according to 4G wireless communication standards. Each eNodeB (e.g., 361 or 370) performs radio resource management tasks, mobility management functions, and performs any necessary encryptions or decryptions on received data packets. For example, the eNodeB (e.g., 361 or 370) may track where each of the pool of UEs 340 are located, manage co-channel interference, radio resources, and other radio transmission characteristics such as transmit power, user allocation, beamforming, data rates, handover criteria, modulation schemes, and error coding schemes, to utilize the limited radio-frequency spectrum resources and radio network infrastructure as efficiently as possible.

An eNodeB (e.g., 361 or 370) may comprise at least one group of an antenna system, a Remote Radio Unit (RRU), and a Base Band Unit in an embodiment. For example, eNodeB 370 may incorporate a single antenna system 371, a single RRU 372, and a single base band unit (BBU) 374 in an embodiment. As another example, eNodeB 361 in an embodiment may incorporate one group of infrastructure including antenna system 362, RRU 363, and BBU 365, and another group of infrastructure including antenna system 366, RRU 367, and BBU 369. The UE pool 340 in an embodiment may include one or more UEs capable of establishing wireless links with the 4G RAN 360. In some embodiments, a single UE within the pool 340 may establish multiple wireless links with the 4G RAN 360. For example, a single UE within the pool 340 in an embodiment may establish one wireless link with antenna system 362 and another wireless link with antenna system 366. Similarly, each of the antenna systems (e.g., 362, 366, and 371) may be capable of establishing wireless links with a plurality of UEs within the UE pool 340. The MANO 320 may increase processing capacity at an eNodeB (e.g., 361 or 370) in an embodiment by increasing the number of antennas transceiving data with the UE pool 340, for example.

In an example embodiment, one or more UEs within pool 340 may establish a plurality of wireless links with an eNodeB 361 comprising a plurality of antennas 362 and 366, a plurality of RRUs 363 and 367, and a plurality of BBUs 365 and 369. In such an embodiment, the antenna systems 362 and 366 may transceive data packets within electronic radio frequency (RF) signals according to the 4G cellular standard. Upon receipt of a such RF signals from the pool of UEs 340, the RRUs 363 and 367 in such an embodiment may perform RF signal processing functionality like transmit and receive functions, filtering, amplification, analog-to-digital conversion, digital-to-analog conversion, up-conversion, and down-conversion on the received RF signals. In such a way, each RRU (e.g., 363 and 367, or 372) in an embodiment may operate as network interface device capable of processing a maximum uplink load according to an adjustable load setting.

Each of the RRUs 363 and 367 in such an embodiment may be connected to BBU 365 and BBU 369, respectively, via optical fibers 364 and 368, respectively. Each of these optical fibers 364 and 368 in an embodiment may transceive data according to the common public radio interface (CPRI). The BBUs 365 and 369 may process uplink and downlink data traffic and control functionality of the RRUs 363 and 367, respectively. For example, BBUs 365 and 369 may orchestrate uplink and downlink traffic across antennas 362 and 366, respectively, during execution of multiple input multiple output (MIMO) transmissions. In such an embodiment, processing resources available to the single eNodeB 361 may be consumed during execution of these functions of the plurality of RRUs 363 and 367 and the plurality of BBUs 365 and 369. Each BBU (e.g., 365, 369, or 374) in an embodiment may operate as a containerized software application. The number of BBUs executing at any given eNodeB (e.g., 361 or 370), or across the entire 4G RAN 360 in an embodiment may be dictated by a preset BBU replication rate. The performance of the BBUs (e.g., 365, 369, or 374) in an embodiment may further be impacted by a preset processor call priority setting which dictates the priority with which a processor may execute calls from such BBUs. In other words, a higher processor call priority setting may result in a BBU processing a higher volume of data packets over a certain time period than another BBU with a lower processor call priority setting. Thus, the MANO 320 in an embodiment may increase processing capacity at an eNodeB (e.g., 361 or 370) by increasing a BBU replication rate or associating a BBU with a higher processor call priority setting, for example.

A UE within pool 340 in another example embodiment may establish a wireless link with an eNodeB 370 comprising a single antenna 371, single RRU 372, and single BBU 374. In such an embodiment, a UE within the pool 340 may establish a wireless link with antenna system 371, for example. In such an embodiment, the antenna system 371 may transceive data packets within a radio frequency band utilized under a 4G RAN protocol, the RRU 372 may receive these data packets via the antenna system 371, and the BBU 374 may receive data packets processed by the RRU 372 via optical fiber 373 transceiving data in CPRI format. Similarly, to the eNodeB 361 infrastructure described directly above, RRU 372 in such an embodiment may perform RF signal processing functionality, and BBU 374 may process uplink and downlink data traffic and control RRU 372 functionality. In such an embodiment, processing resources available to the single eNodeB 370 may be consumed during execution of these functions of the single RRU 372 and the single BBU 374.

In other words, in an embodiment in which eNodeB 361 and eNodeB 370 have access to the same processing resources, fewer of those resources may be dedicated to execution of functions by the RRUs 363 and 367 and BBUs 365 and 369 than may be dedicated to execution of functions by the RRU 372 and BBU 374. This may cause an increase in processing time, and thus an increase in latency for transceiving of data packets through the eNodeB 361 in comparison to transceiving of data packets through the eNodeB 370, for example. However, placing two antennas 362 and 366 within a single eNodeB 361 increases the volume of data packets that may be transceived via wireless links with eNodeB 361 during any given time period (e.g., throughput of wireless links with eNodeB 361) in comparison to the throughput of wireless links established with eNodeB 370. Thus, increasing the number of antenna systems (e.g., 362 and 366), RRUs (e.g., 363 and 367) and BBUs (e.g., 365 and 369) within a single eNodeB (e.g., 361) in an embodiment may increase latency and throughput, while decreasing the number of antenna systems (e.g., 371), RRUs (e.g., 372), and BBUs (e.g., 374) within a single eNodeB (e.g., 370) may decrease latency and throughput.

4G RAN 360 eNodeBs (e.g., 361 and 370) in an embodiment may obtain authenticated access and authorized transceiving of packets and transceive data packets for further processing to the 4G Evolved Packet Core 350. In other embodiments, the 4G RAN 360 may transmit data packets for further processing to a 5G core via an optical fiber 391 and 5G logical 5G radio node (gNodeB) 390 of the 5G RAN, as described in greater detail with respect to FIG. 5 below. In such a way, the eNodeB (e.g., 361 or 370) may function as a network switch to route data between BBUs (e.g., 365, 369, or 374) and the 4G EPC 350 or the 5G gNodeB 390. Performing such network switch functionality, the eNodeB (e.g., 361 or 370) in such an embodiment may route a certain traffic load, and each eNodeB (e.g., 361 or 370) may be assigned an adjustable maximum traffic load.

Some portions of the infrastructure within the 4G EPC 350 and its functionality in an embodiment may be proprietary, and not scalable by the enterprise. In contrast, as described in greater detail with respect to FIG. 5, the 5G core may operate as a plurality of containerized software applications, many or all of which may be managed, scaled, and orchestrated by the MANO 320. In some embodiments, certain portions of the infrastructure within the 4G EPC 350 may be scalable, however, including the Serving Gateway (S-GW) 303, and the Packet Data Network Gateway (P-GW) 305.

The eNodeB 370 in an embodiment may exchange messages with the mobility management entity (MME) 301 in an embodiment via an S1-MME interface 376 adhering to the General Packet Radio Service Tunneling Protocol for the user-plane (GTP-U). The MME 301 may communicate with the Home Subscriber Server (HSS) 312 via an S6A interface 319 to authenticate each of the pool of UEs 340. The HSS 312 in an embodiment may comprise a central database that contains user-related and subscription-related information and UE policy information, as described in greater detail below. The MME 301 may then perform tasks relating to activating and deactivating wireless links with specifically identified (e.g., by eSIM) UEs within pool 340, and authorizing access to one of a plurality of available serving gateways (e.g., 303) to process data packets or data frames exchanged via wireless links with the pool of UEs 340.

Upon authorization and activation of one or more of the UEs in the pool 340 via the MME 301 in an embodiment, the MME 301 may notify the serving gateway (S-GW) 303 that the UEs in pool 340 have been authenticated via S11 interface 302. The S-GW 303 in an embodiment may receive user data packets from the eNodeB (e.g., 370) via an S1-U interface 375, and route and forward those user data packets to the Packet Data Network Gateway (P-GW) 305 via S5 connection 304. In such a way, the S-GW 303 may function as a network switch to route data between BBUs (e.g., 365, 369, or 374) and the P-GW 305. Performing such network switch functionality, the S-GW 303 in such an embodiment may route a certain traffic load, and may be assigned an adjustable maximum traffic load.

Transmission of data packets between the S-GW 303 and the P-GW 305 in an embodiment may be through a fiber-optic cable or bus using an S5 interface, for example. The P-GW 305 in an embodiment provides connectivity between the pool of UEs 340 and the remote cloud network 380. Data packets received from the UEs 340 at the P-GW 305 in an embodiment may be encapsulated within IP packets for transmission to the remote cloud network 380. The P-GW 305 may transceive IP packets with the remote cloud network 380 via a fiber-optic cable or bus using an SGi interface 316. Headers for IP packets received at the P-GW 305 from the remote cloud network 380 may be stripped from encapsulated data packets, and the stripped data packets may be forwarded to the S-GW 303 for transmission to UEs within the pool 340 via the eNodeB (e.g., 370). In such a way, the P-GW 305 may function as a network switch to route data between S-GW 303 and a remote cloud network 380. Performing such network switch functionality, the P-GW 305 in such an embodiment may route a certain traffic load, and may be assigned an adjustable maximum traffic load.

The 4G EPC 350 in an embodiment may comprise a plurality of S-GWs (e.g., 303) and P-GWs (e.g., 305). Each S-GW (e.g., 303) and P-GW (e.g., 305) in an embodiment may operate as a containerized software application. The number of S-GWs (e.g., 303) and P-GWs (e.g., 305) executing at the 4G EPC 350 in an embodiment may be dictated by a preset replication rate. The performance of the S-GWs (e.g., 303) and P-GWs (e.g., 305) in an embodiment may further be impacted by a preset processor call priority setting which dictates the priority with which a processor may execute calls from such S-GW (e.g., 303) and P-GW (e.g., 305). In other words, a higher processor call priority setting may result in an S-GW (e.g., 303) or P-GW (e.g., 305) processing a higher volume of data packets over a certain time period than another S-GW (e.g., 303) or P-GW (e.g., 305) with a lower processor call priority setting. Thus, the MANO 320 in an embodiment may increase processing capacity at the 4G EPC 350 by increasing an S-GW or P-GW replication rate or associating an S-GW or P-GW with a higher processor call priority setting, for example.

Each BBU (e.g., 365, 369, or 374), S-GW 303, or P-GW 305 in an embodiment may be associated with various performance requirements. In addition, each eNodeB (e.g., 361 or 370), the entirety of the 4G RAN 360, and the 4G EPC 350 may also be associated with performance requirements. For example, each BBU (e.g., 365, 369, or 374), S-GW 303, or P-GW 305 in an embodiment may be associated with a maximum processor utilization rate capping the percentage of processing resources accessible by that BBU (e.g., 365, 369, or 374), S-GW 303, or P-GW 305. As another example, the eNodeB (e.g., 361 or 370), the 4G RAN 360, and the 4G EPC 350 may be associated with a guaranteed bit rate (GBR) defining a portion of network and processing resources set aside or reserved for executions of those systems. If the performance metrics for the eNodeB (e.g., 361 or 370), the 4G RAN 360, and the 4G EPC 350 in an embodiment indicate any of those systems are not consuming the network or processing resources set aside according to the GBR, this may indicate an adjustment to the infrastructure component configuration may be needed. In other words, this may indicate a need to adjust the processing resources allocated to the eNodeB (e.g., 361 or 370), the 4G RAN 360, or the 4G EPC 350, to adjust changes to the data connection to accommodate the pool of UEs 340 seeking access.

The P-GW 305 in an embodiment may also perform enforcement of rules generated by the policy/charging rules function (PCRF). The PCRF 307 in an embodiment may generate policy and charging rules containing charging-related information and Quality of Service (QoS) parameters used in bearer establishment. These policies may inform or dictate the types of wireless communication networks with which each UE associated with a given policy may establish wireless connections, based on link performance requirements, security requirements, types of networks supported by a given UE, or other factors in various embodiments. These policies may be transmitted to the P-GW via a fiber-optic cable or bus using an S-6A interface 318 from the HSS 312, then transmitted to the PCRF 307 via a fiber-optic cable or bus using a Gx interface 306, for example.

The policies pursuant to which the PCRF 307 in an embodiment may establish the rules enforced by the P-GW 305 may be stored at the HSS 312, with each UE within the pool 340 being associated with one or more of such stored policies. For example, a single UE within the pool 340 in an embodiment may be associated with a policy stored at the HSS 312 that specifies the types of wireless communication networks (e.g., 3G, 4G, 5G, Wi-Fi, Wi-Max, BlueTooth®, Near Field Communications (NFC), etc.) with which the UE associated with that policy may be capable of establishing wireless links depending on network conditions determined by the MANO 320. As another example, such a policy may identify whether a given UE supports 5G network slicing capabilities. As yet another example, such a policy may identify a given UE's preference of one type of wireless communication network over another (e.g., preference of cellular over Wi-Fi, preference of 5G over 4G, preference of Wi-Max over Wi-Fi, etc.), or preference of one type of cellular network core over another (e.g., preference of processing wireless signals through the 5G core rather than the 4G core). In yet another example, such a policy may identify one or more policy-based connectivity requirements. More specifically, a UE may be associated with a minimum threshold requirement for signal strength, throughput, latency, or other wireless connectivity metrics for establishing wireless links and may be utilized by the MANO 320 to determine end to end data connection resources and enterprise mobile network infrastructure used and allocated to 4G RAN and the EPC core.

In still another example, such a policy may identify one or more security levels with which a given UE may be associated. Such security levels may be assigned to each UE by an IT professional of the enterprise operating the enterprise mobile network, and may be adjustable or dynamically adaptable based on real-time metrics describing the usage, location, or movement of the UE. For example, use of specific applications may cause the UE to be associated with a higher level of security needed to protect transmission of information pursuant to execution of such programs. As another example, location of the UE on a campus or a specific sub-portion of a campus for the enterprise may cause the UE to be associated with a higher level of security. As yet another example, movement of the UE within the campus may indicate the device is mobile, and thus, less likely to require a higher level of security reserved for stationary desktop devices located within secure areas of the campus. In still other examples, the role of the UE user may dictate the assigned security level, such that employees regularly engaging in transfer of sensitive data (e.g., confidential technical information, confidential legal or accounting information, etc.) may be assigned a higher security rating than an individual not regularly transferring such data.

The P-GW 305 in an embodiment may also act as a gateway between the 4G EPC 350 and an access point transceiving data according to a non-cellular or non-3GPP standard, such as a WLAN or Bluetooth® network. For example, a UE within the pool 340 may establish a wireless link with a non-cellular access point 330, through which a GTP-U tunnel 317 to an evolved packet data gateway (ePDG) 311 of the 4G EPC 350 may be established. The ePDG 311 in such an embodiment may receive IP packets from the pool of UEs 340 via this GTP-U tunnel 317. The ePDG 311 may communicate with the authorization, authentication, accounting module (AAA) 314 via a fiber-optic cable or bus using an SWm interface 315 to authenticate the UE within the pool 340 with which the GTP-U tunnel 317 has been established. The AAA may be in communication with the stored UE subscriber information in the HSS 312 via a fiber-optic cable or bus using an SWx interface 313. Upon such an authentication, the ePDG 311 may forward the received IP packets to the P-GW 305 via an IP session tunnel 310. As with data packets received via the eNodeB (e.g., 370) in an embodiment described directly above, the P-GW 305 may then transmit these received IP packets to the remote cloud network 380 or MEC resources via a fiber-optic cable or bus using the SGi interface 316. Similarly, the P-GW 305 may receive IP packets via the SGi interface 316 from the remote cloud network 380, then forward those IP packets to the UE pool 340 via the ePDG 311 and the non-cellular AP 330. In such a way, a UE within the pool 340 may establish a wireless link to the 4G EPC 350 (and ultimately to the remote cloud network 380 or MEC resources) via either the eNodeB of the 4G RAN or the non-cellular AP 330.

As described herein, the enterprise mobile network in an embodiment may be managed by a single entity or enterprise, and may include a plurality of RANs (e.g., 4G RAN 360, or 5G RAN described with reference to FIG. 4 below), cellular network cores (e.g., 4G Evolved Packet Core 350, or 5G core described with reference to FIG. 5 below), and non-cellular access points (e.g., WLAN or BlueTooth® AP 330). Each UE within pool 340 may be capable of establishing a wireless link with a RAN (e.g., 4G RAN 360, or 5G RAN described with reference to FIG. 4 below), or a non-cellular AP (e.g., WLAN or BlueTooth® AP 330) in an embodiment. Wireless connectivity metrics for each wireless link may vary based on the type of RAN or AP with which a UE has established such a link. For example, a wireless link between a UE within pool 340 and 4G RAN 360 may provide greater throughput than a wireless link between that UE and the WLAN/BT AP 330, while the wireless link between that UE and the WLAN/BT AP 330 provides lower latency. This is only one of many possible comparisons between wireless connectivity metrics of wireless links established between a UE within pool 340 and any given RAN or AP in various embodiments. Other connectivity metrics that may be considered for comparison between two wireless links may include, for example, security of the wireless link, signal strength, percentage of dropped packets, or another wireless connectivity metric routinely monitored, recorded, or stored at a UE within pool 340, at the HSS 312, or at the MANO 320, as described herein. Thus, choice of the RAN or AP through which communications between a UE in the pool 340 and the remote cloud network 380 or MEC resources may be routed may impact overall connectivity metrics of such communications.

A 5G RAN may be capable of transceiving data with a 5G network core (e.g., as described with reference to FIGS. 4 and 5 below), while a 4G RAN (e.g., 360) may be capable of transceiving data with either a 4G EPC 350 or a 5G core. For example, the 4G RAN 360 may transceive data with a 5G gNodeB 390 within a 5G RAN via an X2 interface 391 in an embodiment. Further, a non-cellular AP (e.g., 330) may be capable of transceiving data with a plurality of available cellular network cores (e.g., 4G Evolved Packet Core 350, or 5G core described with reference to FIG. 5 below). Processing performed at any core (e.g., EPC 350 or a 5G core described with reference to FIG. 5 below) may impact overall connectivity metrics between a UE within pool 340 and the remote cloud network 380 or MEC metrics. For example, high traffic, high processing utilization, or high rates of node failure at a given core may increase latency, decrease throughput, or otherwise negatively impact the overall communication between such a UE within pool 340 and the remote cloud network 380 or MEC metrics. As another example, routing of communications between such a UE within pool 340 and the remote cloud network 380 or MEC metrics through a specific network slice (e.g., as described in greater detail with respect to FIG. 5 below) may increase throughput, decrease latency, provide heightened security, or otherwise positively impact the overall communication between such a UE within pool 340 and the remote cloud network 380 or MEC metrics. Thus, choice of cellular core through which communications between a UE in the pool 340 and the remote cloud network 380 or MEC metrics may be routed may impact overall connectivity metrics of such communications.

The ways in which each of these connectivity metrics impacts quality of communications between the pool 340 of UEs and the remote cloud network 380 or MEC metrics, as routed through various components of the enterprise mobile network may vary over time as the applications executed by these UEs changes, various UEs enter or leave the pool 340 of linked UEs, the capabilities of the UEs within the pool 340 changes (e.g., more 4G capable UEs enter and more 5G capable UEs exit), or the locations of various UEs within the pool 340 changes. The MANO 320 in an embodiment addresses these issues by routinely assessing the communication needs for the pool 340 of UEs wirelessly linked to the enterprise mobile network operating a plurality of cellular and non-cellular RANs (e.g., including 4G RAN 360), APs (e.g., including AP 330), and network cores (e.g., including 4G EPC 350) and adjusting availability of resources at each of these RANs, APs, and cores to meet UE needs.

For example, the MANO 320 in an embodiment may scale up computing or processing resources available at the 4G RAN 360 or 4G EPC 350 experiencing congestion, high-latency, or low throughput. In such an embodiment, the MANO 320 may further work in tandem with the intelligent wireless carrier link management system at one or more UEs in the pool 340 to take advantage of these scaled up computing or processing resources by transceiving at least a portion of data through the recently scaled up 4G RAN 360 or 4G EPC 350. As another example, the MANO 320 in an embodiment may increase the number of antennas (e.g., 362, 366, or 371) transceiving data at the 4G RAN 360 when the 4G RAN 360 is experiencing high traffic load. In such an embodiment, the MANO 320 may further work in tandem with the intelligent wireless carrier link management system at one or more UEs in the pool 340 to take advantage of these newly added antennas by transceiving at least a portion of data through the recently activated antennas. As yet another example, the MANO 320 in an embodiment may redirect traffic moving through the 4G RAN 360 to access the 4G EPC 350 via the non-cellular AP 330, rather than through the 4G RAN 360 when one or more of the BBUs (e.g., 365, 369, or 370) are experiencing heavy traffic loads. In such an embodiment, the MANO 320 may further work in tandem with the intelligent wireless carrier link management system at one or more UEs in the pool 340 to terminate wireless links established with the 4G RAN 360 and establish wireless links to the 4G EPC 350 via the non-cellular AP 330.

The MANO 320 in an embodiment may also instruct one or more UEs in the pool 340 to adjust their antenna configurations in order to achieve the optimal wireless link distribution determined at the MANO 320 and described directly above. For example, the MANO 320 may instruct one or more UEs in pool 340 currently transceiving data via a wireless link between a first antenna at the UE and either the 5G RAN or non-cellular AP 330 to activate a second antenna for transceiving of data via a wireless link to the 4G RAN 360. Similarly, the MANO 320 may instruct one or more UEs in pool 340 currently transceiving data via a wireless link between a first antenna at the UE and the 4G RAN 360 to deactivate this first antenna when the MANO 320 decreases computing or processing resources available at the 4G RAN 360. As another example, the MANO 320 may instruct one or more UEs in pool 340 currently transceiving data via a wireless link between a first antenna at the UE and either the 5G RAN or non-cellular AP 330 to activate a second antenna for transceiving of data via a wireless link to these newly activated antennas at the 4G RAN 360. Similarly, the MANO 320 may instruct one or more UEs in pool 340 currently transceiving data via a wireless link between a first antenna at the UE and the 4G RAN 360 to deactivate this first antenna when the MANO 320 decreases the number of antennas available at the 4G RAN 360. In yet another example, the MANO 320 may instruct one or more UEs in pool 340 currently transceiving data via a wireless link between a first antenna at the UE and the 4G RAN 360 to deactivate the first antenna and to activate a second antenna for transceiving of data via a wireless link to the non-cellular AP 330 in order to reroute traffic away from a congested 4G RAN 360.

Figure 4:
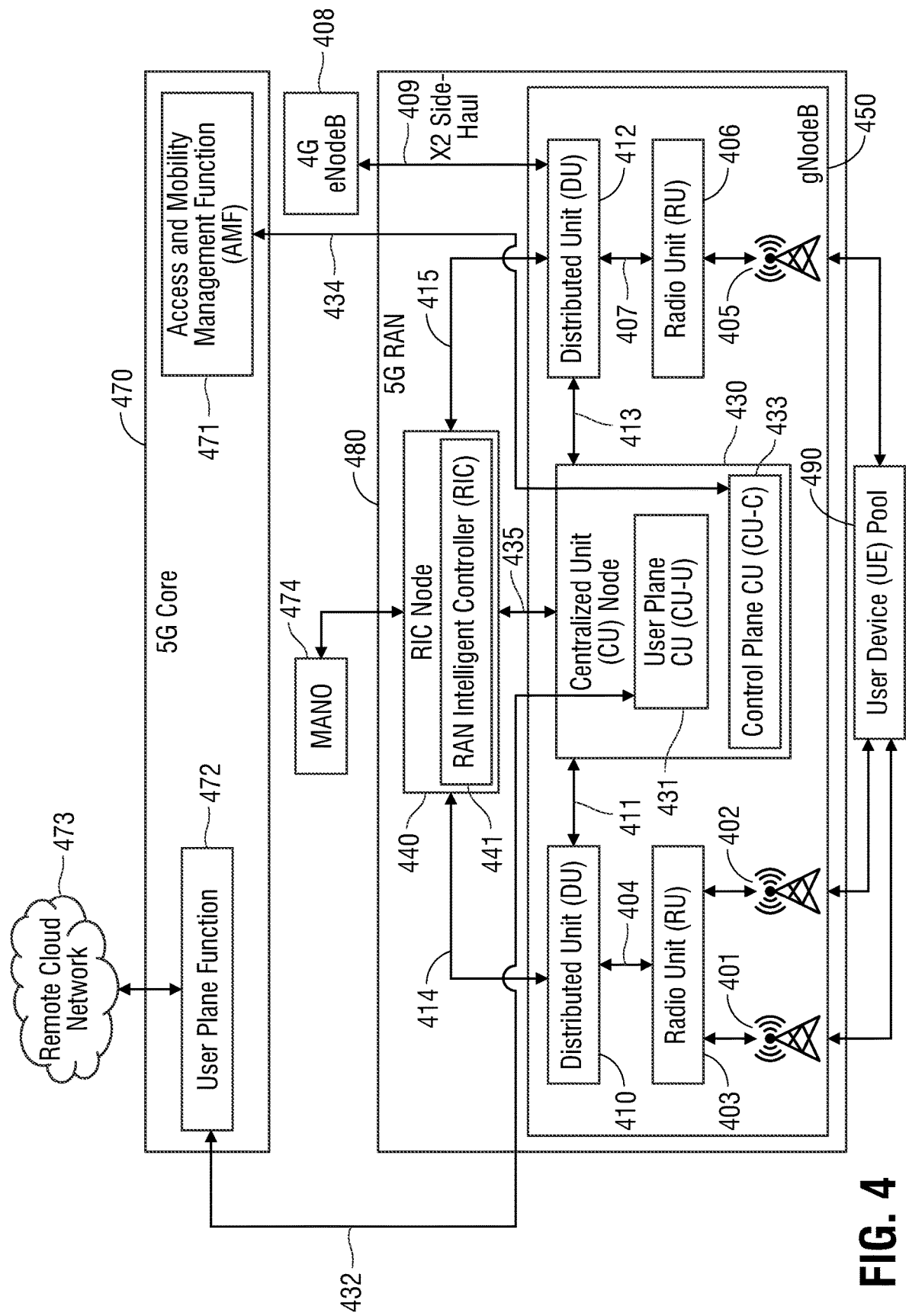
FIG. 4 is a block diagram illustrating a 5G RAN according to an embodiment of the present disclosure.

FIG. 4 is a block diagram illustrating a 5G Radio Access Network (RAN) 480 of an enterprise 5G communication system according to an embodiment of the present disclosure. Some or all components of the 5G RAN 480 may be located at an enterprise mobile network (e.g., comparable to that discussed directly above with respect to FIG. 3) in some embodiments. More specifically, the enterprise mobile network in an embodiment may incorporate or access a cloud native RAN Intelligent Controller (RIC) 441 operating to coordinate communication of data through a plurality of logical 5G radio nodes (gNodeBs) (e.g., 450). In some embodiments, one or more of such gNodeBs (e.g., 450) may be co-located with the RIC 441 within the enterprise mobile network. In other embodiments, one or more of such gNodeBs (e.g., 450) may be separated into one or more facilities separate from the RIC 441, in accordance with the decentralized architectural approach for which the 5G communication standard was designed, as described in greater detail below.

As described herein, user equipment devices (UEs) within a pool 490 may communicate via one or more wireless links established by an antenna system of the UE within the enterprise mobile network incorporating infrastructure for establishing wireless links via a plurality of wireless communications standards, such as, for example, 4G cellular, 5G cellular, or non-cellular protocol such as Wi-Fi, or Bluetooth®. In such cases, a single enterprise mobile network may establish wireless links with a pool 490 of UEs via one or more of a 4G RAN (e.g., as described with reference to FIG. 3 above), a 5G RAN 480, or a non-cellular wireless communication AP (e.g., as described with reference to FIGS. 2 and 4). Further, communications received at each of the 4G RAN, 5G RAN 480, and non-cellular wireless communication AP may be routed to a remote cloud network 473 or local MEC resources via either a 4G EPC (e.g., as described with reference to FIG. 3 above) or a 5G core 470, with each core located within the enterprise mobile network. FIG. 4 illustrates a 5G RAN 480 communicably linked to a pool of UEs 490, a 4G eNodeB 408 and a 5G core 470 to establish wireless communications according to the 5G standard with the pool of UEs 490.

The 5G communication standard categorizes a frequency spectrum to include low bands for a larger coverage area and lower performance, a high band for network densification through mmWave for a smaller coverage area but higher performance, and mid-band that provides mid-range coverage and mid-range performance. Frequency bands available for the establishment of wireless links to include frequencies below 1 GHz and above 60 GHz (e.g., 5G mmWave). The higher bands support frequency bands to operate best within short distances between the UE pool 490 and the antenna system (e.g., 401, 402, or 405) with which a wireless link has been established. In order to provide this high-band coverage within an area that is comparable to the larger area of coverage for 4G systems, 5G systems may use several antenna systems (e.g., 401, 402, or 405). This 5G strategy may provide more complete high-band coverage (e.g., by placing a 5G antenna within an area with poor connectivity to the 4G RAN), with greater bandwidth availability than 4G (e.g., within the 5G mmWave frequencies). In order to make this 5G solution economically feasible, 3GPP designed the 5G standard to decentralize the functionality of the RAN into various components that may or may not be co-located with one another, to decrease the size and cost of each 5G cell and to optimize the cost-per-bit for the transport layer. This decentralization and movement of RAN components to a plurality of locations within a single cell results in the ability to push some computing overhead involved in transceiving of data packets between the UE pool 490 and a remote cloud network 473 or MEC resources away from the centralized RAN or core (e.g., as described in the 4G RAN 360 of FIG. 3) and towards the "edge" of the network that include the antenna systems.

The 5G RAN 480 in an embodiment may comprise one or more logical 5G radio nodes (gNodeBs) (e.g., 450). A single gNodeB in an embodiment may comprise a logical architecture of several components, including a Radio Unit (RU) (e.g., 403 and 406), a Distributed Unit (DU) (e.g., 410 and 412), and a Centralized Unit (CU) node (e.g., 430). Each of these components may be co-located with one another in a single physical structure, or located in separated locations, connected to one another via fiber optical cables, for example. The locations of each of these components with respect to one another may be a reflection of the degree to which the 5G RAN 480 pushes processing overhead toward the edges of the network. For example, locating the RU (e.g., 403 and 406), DU (e.g., 410 and 412), and CU (e.g., 430) together may provide a centralized architecture that pushes all overhead for gNodeB 450 to a single physical location (e.g., server rack or server farm). As another example, locating the RU (e.g., 403 and 406), DU (e.g., 410 and 412), and CU (e.g., 430) each in separate facilities housing separate server racks may provide a fully distributed architecture that pushes all RU and DU processing overhead to the outer edges of the network onto the cell site for superior network performance and high pooling gains. Although FIG. 4 depicts a single gNodeB 450, the 5G RAN 480 in other embodiments may incorporate a plurality of gNodeBs.

The 5G RAN 480 in an embodiment may perform many of the same functions of the 4G RAN described above with reference to FIG. 3, but differs from the 4G RAN in that it decouples the functionality of the 4G RRU and the 4G BBU to allow for the decentralization described directly above, as well as for optimized distribution of processing capacity across a plurality of gNodeBs (e.g., 450). UEs within pool 340 in an embodiment may establish wireless links with Radio Units (e.g., 403 and 406) of the 5G RAN 480. Each RU (e.g., 403 or 406) may be co-located with and service one or more antenna systems (e.g., 401, 402, or 405). For example, RU 403 may service a plurality of antenna systems 401 and 402, while RU 406 services a single antenna system 405. The RUs (e.g., 403 and 406) in an embodiment may comprise an RF transmitter and a LO PHY processing block for processing of the lower physical layer of cellular data frames from the UE pool 490. In such a way, each RU (e.g., 403 or 406) in an embodiment may operate as network interface device capable of processing a maximum uplink load according to an adjustable load setting.

In an embodiment in which RU 403 services two antennas 401 and 402 and RUs 403 and 406 have access to the same processing resources, the amount of time required for RU 403 to perform this processing on signals transceived via both antennas 401 and 402 may be greater than the amount of time required for RU 406 to perform this same processing on signals transceived via antenna 405 alone. Thus, increasing the number of antennas (e.g., 401 and 402) serviced by a single RU 403 in an embodiment may increase the latency of communication between the UE pool 490 and a remote cloud network 473 or MEC resources. However, servicing two antennas (e.g., 401 and 402) via a single RU (e.g., 403) in an embodiment may increase the throughput of wireless links established with RU 403. Because each RU (e.g., 403 and 406) in an embodiment may service a separate physical space, this may be preferable when demand for wireless links within a given geographic area (e.g., density of UEs within a 5G cell) increases.

Each RU (e.g., 403 or 406) may be in communication with a Distributed Unit (DU) (e.g., 410, or 412, respectively) via a fronthaul (e.g., 404 or 407, respectively) interface. Each DU (e.g., 410 or 412) in an embodiment may comprise a HI PHY block for processing the higher physical layer of cellular data frames received from the RU (e.g., 403 or 406, respectively), a Media Access Control (MAC) block for processing the MAC layer of the received cellular data frame, and a Radio Link Control (RLC) block for processing the RLC layer of the received cellular data frame. The RUs (e.g., 403 or 406) may be co-located with the DUs (e.g., 410 or 412) in some embodiments. In other embodiments, the DUs (e.g., 410 or 412) may be located in physically separate facilities that are connected to the RUs (e.g., 403 or 406) via the fronthaul connections 404 and 407, respectively. Each DU (e.g., 410 or 412) in an embodiment may operate as a containerized software application. The number of DUs (e.g., 410 or 412) executing at any given gNodeB (e.g., 450), or across the entire 5G RAN 480 in an embodiment may be dictated by a preset DU replication rate. The performance of the DUs (e.g., 410 or 412) in an embodiment may further be impacted by a preset processor call priority setting which dictates the priority with which a processor may execute calls from such DUs. In other words, a higher processor call priority setting may result in a DU processing a higher volume of data packets over a certain time period than another DU with a lower processor call priority setting. Thus, the MANO 474 in an embodiment may increase processing capacity at the DUs (e.g., 410 or 412) by increasing a DU replication rate or associating the DUs (e.g., 410 or 412) with a higher processor call priority setting, for example.

All DUs (e.g., 410 and 412) within gNodeB 450 in an embodiment may be in communication with a single centralized unit (CU) node 430 via an F1 mid-haul connection (e.g., 411 and 413, respectively). In a split gNodeB 450 embodiment, one or more of the DUs (e.g., 410 or 412) may be linked to the CU node 430 in a separate physical location. The CU node 430 may receive IP packets from the DUs 410 and 412 and separate those packets into either control plane or user plane packets. As described above with respect to FIG. 3, the gNodeB 450 or the 5G RAN 480 may also receive IP packets from an eNodeB 408 of a 4G RAN, to facilitate processing of the 4G RAN originated IP packets via the 5G Core 470. In such an embodiment, the CU node 430 may receive IP packets from the 4G eNodeB 408 via an X2 side-haul 409, and similarly separate those packets into either control plane or user plane packets. In such a way, the DU 412 may function as a network switch to route data between the 4G eNodeB 408 of the 4G RAN and the 5G core 470. Performing such network switch functionality, the DU 412 in such an embodiment may route a certain traffic load, and each DU 412 may be assigned an adjustable maximum traffic load.

The CU node 430 may comprise one or more centralized units (CUs) (e.g., 431 and 433) in an embodiment, primarily operating to split transceived data into a control plane and a user plane. The Control Plane CU (CU-C) 433 in an embodiment may perform control plane functions in order to successfully route and process data packets to the 5G core 470. These functions may include enforcing policies and protocols, identifying packets to be discarded, granting preferential treatment of certain packets for which a high QoS is defined, establishing a user plane session, and ending a user plane session. The User Plane CU (CU-U) 431 in an embodiment may perform user plane functions such as messaging between applications running at endpoints of the wireless communication links (e.g., cloud-based applications within a remote cloud network 473 or at MEC resources and UEs within pool 490) in order to facilitate execution of these endpoint software applications. Separating these functions into the user plane and the control plane may optimize the user plane for simplicity, regularity, and speed of processing inter-application requests via transmission of data packets while optimizing the control plane for customizability and scalability. Each CU (e.g., 431 or 433) in an embodiment may operate as a containerized software application. The number of CUs (e.g., 431 or 433) executing across the entire 5G RAN 480 in an embodiment may be dictated by a preset CU replication rate. The performance of the CUs (e.g., 431 or 433) in an embodiment may further be impacted by a preset processor call priority setting which dictates the priority with which a processor may execute calls from such CUs. In other words, a higher processor call priority setting may result in a CU processing a higher volume of data packets over a certain time period than another CU with a lower processor call priority setting. Thus, the MANO 474 in an embodiment may increase processing capacity at the CUs (e.g., 431 or 433) by increasing a CU replication rate or associating the CUs (e.g., 431 or 433) with a higher processor call priority setting, for example.

Each DU (e.g., 410, or 412) and CU (e.g., 431 or 433) in an embodiment may be associated with various performance requirements. In addition, each gNodeB (e.g., 450), the entirety of the 5G RAN 480, and the 5G core may also be associated with performance requirements. For example, each DU (e.g., 410 or 412) and CU (e.g., 431 or 433) in an embodiment may be associated with a maximum processor utilization rate capping the percentage of processing resources accessible by that DU (e.g., 410 or 412) or CU (e.g., 431 or 433). As another example, the gNodeB 450, 5G RAN 480, or 5G core 470 may be associated with a guaranteed bit rate (GBR) defining a portion of network and processing resources set aside or reserved for executions of those systems. If the performance metrics for the gNodeB 450, 5G RAN 480, or 5G core 470 in an embodiment indicate any of those systems are not consuming the network or processing resources set aside according to the GBR, this may indicate an adjustment to the infrastructure component configuration may be needed. In other words, this may indicate a need to adjust the processing resources allocated to the gNodeB 450, 5G RAN 480, or 5G core 470.

The CU node 430 in an embodiment may service one or more DUs (e.g., 410 and 412). As the number of DUs (e.g., 410 and 412) serviced by the CU node 430 increases, the latency and throughput at such a CU node 430 may also increase. In contrast, as the number of DUs (e.g., 410 and 412) serviced by the CU node 430 decreases, latency and throughput at such a CU node 430 may also decrease. Thus, operations at each CU node (e.g., 430) within a 5G RAN 480 in an embodiment may be optimized for greater throughput or lower latency, dependent upon the needs of the pool of UEs 490, by increasing or decreasing the number of DUs (e.g., 410 and 412) serviced by each CU node 430.

The 5G standard has been developed to allow for open-source software solution performance of the various functions of the RU (e.g., 403 and 406), DU (e.g., 410 and 412), and CU Node 430 on standardized hardware configurations. Each of these open-source software solutions in an embodiment may operate as a containerized software application executing at one or more computing nodes. The enterprise mobile network in an embodiment may employ RIC node 440 to coordinate and optimize execution of each of the DU (e.g., 410 and 412) and CU node 430 functions. The RIC node 440 itself may operate as a containerized software application to distribute capacity across the plurality of DUs (e.g., 410 and 412), and CUs (e.g., including 430), while still meeting QoS requirements for UEs in pool 490. The 5G communication standard employs two different types of RICs, including a near-real-time MC (MC near-RT) and a non-real-time RIC (MC non-RT). The RIC near-RT may perform tasks that require one second or less latency, while the MC non-RT may perform tasks that are less latency-sensitive. The RIC near-RT may be co-located with the 5G RAN 480 (e.g., at MC node 440) in order to ensure low-latency processing of data received from the CU node 430. The RIC non-RT may be co-located with the 5G RAN 480 and the RIC near-RT in some embodiments. In other embodiments, the RIC non-RT may be located outside or remotely from the 5G RAN 480, or may be co-located with infrastructure components of the 5G core 470, for example. The RIC node 440 (e.g., incorporating the RIC near-RT) may communicate with the CU node 430 via an E2 Mid-haul 435, and with the DUs (e.g., 410 and 412) via an F1 Mid-haul (e.g., 414 and 415, respectively).

5G RAN 480 gNodeBs (e.g., 450) in an embodiment may transceive data packets for further processing to the 5G core 470. Upon separation of data by the CU Node 430 in an embodiment, data processed by the CU-U 431 may be transmitted to the user plane function 472 of the 5G core 470, via an N3 backhaul connection 432 for establishment of a user session. Data processed by the CU-C 433 in an embodiment may be transmitted to the Access and Mobility Management Function (AMF) 471 of the 5G core 470 via an N2 backhaul connection 434 for execution of several network functions at the 5G core 470, as described in greater detail below with respect to FIG. 5. In such a way, the CU-U 431 and CU-C 433 may function as network switches to route data between the 5G RAN 480 and the 5G core 470. Performing such network switch functionality, the CUs 431 and 433 in such an embodiment may route a certain traffic load, and each CU (e.g., 431 or 433) may be assigned an adjustable maximum traffic load.

As described herein, choice of the RAN or AP through which communications between a UE in the pool 490 and the remote cloud network 473 may be routed may impact overall connectivity metrics of such communications. Further, the ways in which each of these connectivity metrics impacts quality of communications between the pool 490 of UEs and the remote cloud network 473 or MEC resources, as routed through various components of the enterprise mobile network (or portions of gNodeB 450 or 5G RAN 480 located separately from the enterprise mobile network) may vary over time as the applications executed by these UEs changes, various UEs enter or leave the pool 490 of linked UEs, the capabilities of the UEs within the pool 490 changes (e.g., more 4G capable UEs enter and more 5G capable UEs exit), or the locations of various UEs within the pool 490 changes. The MANO 474 in an embodiment addresses these issues by routinely assessing the communication needs for the pool 490 of UEs wirelessly communicating within the enterprise mobile network operating or transceiving data with a plurality of cellular and non-cellular RANs (e.g., including at least some portions of 5G RAN 480), APs, and network cores (e.g., including 5G core 470) and adjusting availability of resources at each of these RANs, APs, and cores to meet UE needs.

For example, the MANO 474 in an embodiment may scale up computing or processing resources available at the 5G RAN 480 or 5G core 470 experiencing congestion, high-latency, or low throughput. In such an embodiment, the MANO 474 may further work in tandem with the intelligent wireless carrier link management system at one or more UEs in the pool 490 to take advantage of these scaled up computing or processing resources by transceiving at least a portion of data through the recently scaled up 5G RAN 480 or 5G core 470. As another example, the MANO 474 in an embodiment may increase the number of antennas (e.g., 401, 402, or 450) transceiving data at the 5G RAN 480 when the 5G RAN 480 is experiencing high traffic load. In such an embodiment, the MANO 474 may further work in tandem with the intelligent wireless carrier link management system at one or more UEs in the pool 490 to take advantage of these newly added antennas by transceiving at least a portion of data through the recently activated antennas. As yet another example, the MANO 474 in an embodiment may redirect traffic moving through the 5G RAN 480 to access the 5G core 470 via a non-cellular AP (e.g., as described in greater detail with respect to FIG. 5, below), rather than through the 5G RAN 480 when one or more of the DUs (e.g., 410 or 412) or CUs (e.g., 431, or 433) are experiencing heavy traffic loads. In such an embodiment, the MANO 474 may further work in tandem with the intelligent wireless carrier link management system at one or more UEs in the pool 490 to terminate wireless links established with the 5G RAN 480 and establish wireless links to the 5G core 470 via a non-cellular AP (e.g., as described in greater detail with respect to FIG. 5, below).

The MANO 474 in an embodiment may also instruct one or more UEs in the pool 490 to adjust their antenna configurations in order to achieve the optimal wireless link distribution determined at the MANO 474 and described directly above. For example, the MANO 474 may instruct one or more UEs in pool 490 currently transceiving data via a wireless link between a first antenna at the UE and either the 4G RAN or non-cellular AP to activate a second antenna for transceiving of data via a wireless link to the 5G RAN 480. Similarly, the MANO 474 may instruct one or more UEs in pool 490 currently transceiving data via a wireless link between a first antenna at the UE and the 5G RAN 480 to deactivate this first antenna when the MANO 474 decreases computing or processing resources available at the 5G RAN 480. As another example, the MANO 474 may instruct one or more UEs in pool 490 currently transceiving data via a wireless link between a first antenna at the UE and either the 4G RAN or non-cellular AP to activate a second antenna for transceiving of data via a wireless link to one of the newly activated antennas at the 5G RAN 480. Similarly, the MANO 474 may instruct one or more UEs in pool 490 currently transceiving data via a wireless link between a first antenna at the UE and the 5G RAN 480 to deactivate this first antenna when the MANO 474 decreases the number of antennas available at the 5G RAN 480. As yet another example, the MANO 474 may instruct one or more UEs in pool 490 currently transceiving data via a wireless link between a first antenna at the UE and the 5G RAN 480 to deactivate the first antenna and to activate a second antenna for transceiving of data via a wireless link to the non-cellular AP.

Figure 5:
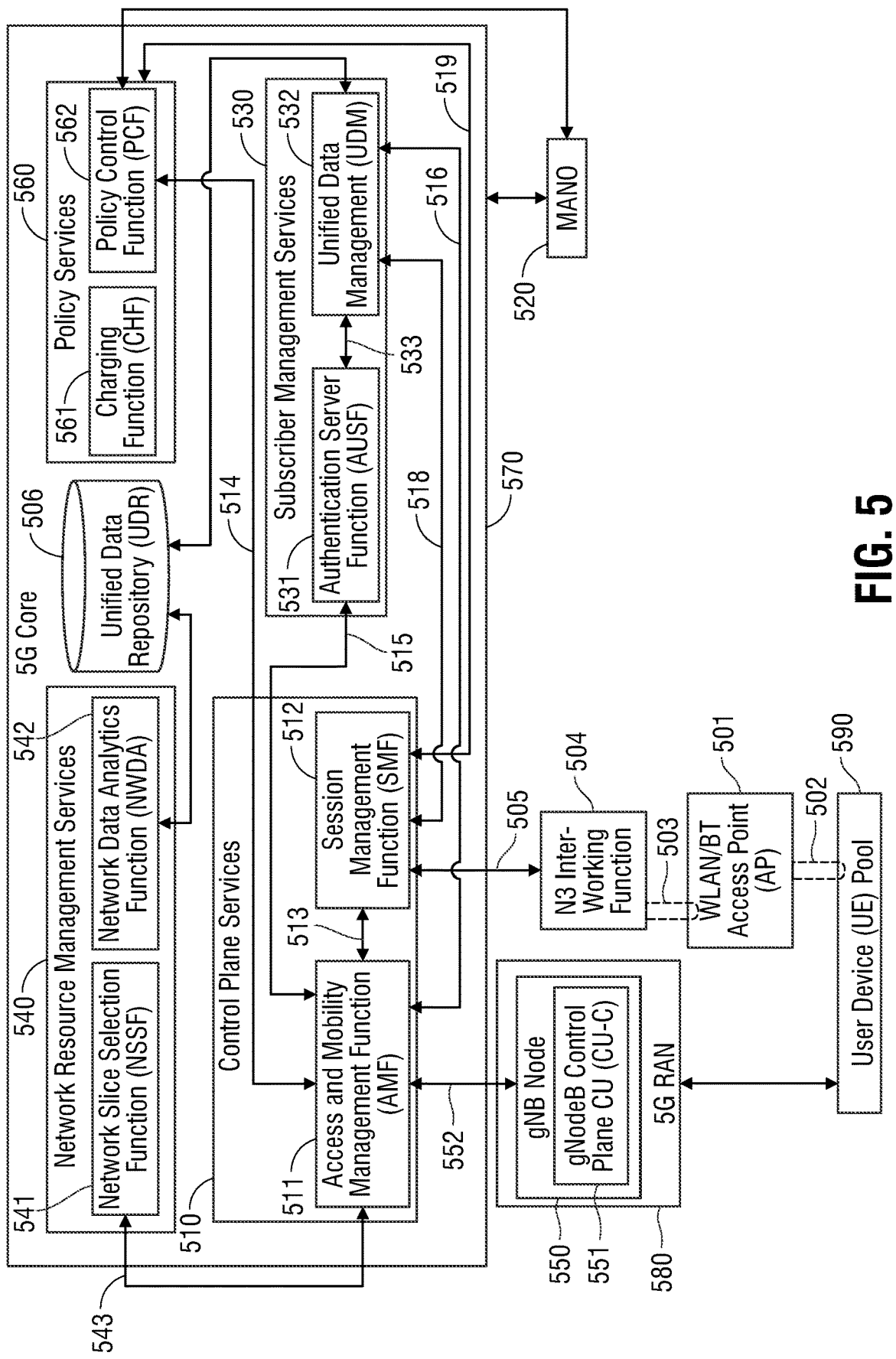
FIG. 5 is a block diagram illustrating 5G network core according to an embodiment of the present disclosure.

FIG. 5 is a block diagram illustrating 5G network core of an enterprise mobile network according to an embodiment of the present disclosure. As described herein, choice of the cellular core through which communications between a UE in the pool 590 and the remote cloud network may be routed may impact overall connectivity metrics of such communications. FIG. 5 describes processing of data packets with a UE pool 590 via a 5G core 570 of the enterprise mobile network. As described herein, the 5G core 570 uses a service-based architecture, in which the 5G core processes data packets received from various RANs (e.g., gNodeB 550 of 5G RAN, or 4G eNodeB 408 in FIG. 4), or non-cellular APs (e.g., 501) by executing a series of network functions (NFs), each operating as a separate containerized software application. These network functions comprise, at least, control plane services 510, subscriber management services 530, network resource management services 540, and policy services 560. It is contemplated other network functions, not illustrated within FIG. 5 may be incorporated within the 5G core 570 described herein. Network functions are in communication with one another via fiber-optic cables or buses having point-to-point reference points defining formatting of transceived messages between two or more network functions. Each of these reference points may be defined within the 3GPP technical specifications (e.g., TS 23.501).

Because each of the NFs (e.g., 511, 512, 531, 532, 541, 542, 561, and 562) within control plane services 510, subscriber management services 530, network resource management services 540, and policy services 560 are containerized software applications, the number of each NF executing within the 5G core 570 in an embodiment may be dictated by a preset NF replication rate. The performance of the NFs in an embodiment may further be impacted by a preset processor call priority setting which dictates the priority with which a processor may execute calls from such NFs. In other words, a higher processor call priority setting may result in an NF processing a higher volume of data packets over a certain time period than another NF with a lower processor call priority setting.

Each NF (e.g., 511, 512, 531, 532, 541, 542, 561, and 562) in an embodiment may be associated with various performance requirements. In addition, the 5G core 570 may also be associated with performance requirements. For example, each NF in an embodiment may be associated with a maximum processor utilization rate capping the percentage of processing resources accessible by that NF. As another example, the 5G core 570 may be associated with a guaranteed bit rate (GBR) defining a portion of network and processing resources set aside or reserved for executions of the 5G core 570. If the performance metrics for the 5G core 570 in an embodiment indicate the 5G core 570 is not consuming the network or processing resources set aside according to the GBR, this may indicate an adjustment to the infrastructure component configuration may be needed. In other words, this may indicate a need to adjust the processing resources allocated to the 5G core 570.

The gNodeB 550 of the 5G RAN in an embodiment may exchange data packets with the 5G core 570 via control plane and user plane. For example, control plane data may be transceived between a CU-C 551 of the gNodeB 550 and an Access and Mobility Management Function (AMF) 511 of the 5G core 570 via an N2 backhaul connection 552. User plane data may also be transceived between a CU-U and a User Plane Function (UPF) of the 5G core, as described above with respect to FIG. 4. The user plane and related functions within the 5G core are not the focus of FIG. 5, and are thus not illustrated, although it is contemplated the 5G core described with reference to FIG. 5 comprises such functionality.

The AMF 511 in an embodiment may operate as one of a plurality of control plane services 510 to oversee authentication, connection, and mobility management between the 5G core and each of the UEs in pool 590. Control plane services 510 in an embodiment may provide control of the network, including access, mobility, policy, exposure, legal intercept, and charging related control. The Session Management Function (SMF) may be included within the control plane services 510, which may operate to handle session management, IP address allocation, and control of policy enforcement. The AMF may communicate with the SMF in an embodiment via an N11 reference point connection 513, for example.

The SMF 512 in an embodiment may also facilitate direct communication between a non-cellular AP 501 and the 5G core 570, eliminating the need to route communications to the 5G core 570 through the 5G RAN (e.g., gNodeB 550). For example, one or more UEs in pool 590 may establish an IP Session Tunnel 502 with the non-cellular AP 501, which may, in turn, establish an IP Session Tunnel 503 to an N3 inter-working function 504 of the enterprise mobile network. The N3 inter-working function 504 in an embodiment may transceive IP packets with the UE pool 590 via these IP session tunnels 502 and 503, then transceive data packets with the SMF 512 via an N2 reference point connection 505.

The 5G core 570 may further include subscriber management services 530, including an authentication server function (AUSF) 531 and a Unified Data Management (UDM) function 532. The AUSF 531 in an embodiment may perform authentication with UEs within pool 490, similarly to the HSS of the 4G EPC. The AUSF 531 may be in communication with the AMF 511 via an N12 reference point connection 515, and with the UDM function 532 via an N13 reference point connection 533. The UDM function 532 in an embodiment may control access to a converged repository of subscriber information at the unified data repository (UDR) 506 from a plurality of other NFs in the 5G core 570. The UDM function 532 may be in communication in an embodiment with the SMF 512 via an N10 reference point connection 518, and with the AMF 511 via an N8 reference point connection 516.

The Unified Data Repository (UDR) 506 in an embodiment may store data relating to connectivity metrics, connectivity requirements, infrastructure component configurations, and internetwork connectivity configurations. The UDR 506 may store policy information for the plurality of UEs, similar to that stored by the HSS of the 4G EPC. These policies may inform or dictate the types of wireless communication networks with which each UE associated with a given policy may establish wireless connections, based on link performance requirements, security requirements, types of networks supported by a given UE, or other factors in various embodiments. For example, the UDR 506 may store a separate policy for each of the UEs in the pool 590 that specifies the types of wireless communication networks (e.g., 3G, 4G, 5G, Wi-Fi, Wi-Max, BlueTooth®, Near Field Communications (NFC), etc.) with which the UE associated with that policy may be capable of establishing wireless links. As another example, such a policy may identify whether a given UE supports 5G network slicing capabilities. As yet another example, such a policy may identify a given UE's preference of one type of wireless communication network over another (e.g., preference of cellular over Wi-Fi, preference of 5G over 4G, preference of Wi-Max over Wi-Fi, etc.), or preference of one type of cellular network core over another (e.g., preference of processing wireless signals through the 5G core rather than the 4G core). In yet another example, such a policy may identify one or more policy-based connectivity requirements. More specifically, a UE may be associated with a minimum threshold requirement for signal strength, throughput, latency, or other wireless connectivity metrics for established wireless links.

In still another example, such a policy may identify one or more security levels with which a given UE may be associated. Such security levels may be assigned to each UE by an IT professional of the enterprise operating the enterprise mobile network, and may be adjustable or dynamically adaptable based on real-time metrics describing the usage, location, or movement of the UE. For example, use of specific applications may cause the UE to be associated with a higher level of security needed to protect transmission of information pursuant to execution of such programs. As another example, location of the UE on a campus or a specific sub-portion of a campus for the enterprise may cause the UE to be associated with a higher level of security. As yet another example, movement of the UE within the campus may indicate the device is mobile, and thus, less likely to require a higher level of security reserved for stationary desktop devices located within secure areas of the campus. In still other examples, the role of the UE user may dictate the assigned security level, such that employees regularly engaging in transfer of sensitive data (e.g., confidential technical information, confidential legal or accounting information, etc.) may be assigned a higher security rating than an individual not regularly transferring such data.

Network resource management services 540 may further be included within the 5G core 570 in an embodiment, including a network slice selection function (NSSF) 541 and a network data analytics function (NWDA) 542. The NSSF 541 in an embodiment may select a network slice instance defining specific versions or replicas of each network function to be used in concert with one another to process data packets transceived with one or more UEs in pool 590 that are assigned to a specifically identified network slice. The combination of each of these NF versions or replicas may form a network slice in an embodiment, which may then be assigned by the NSSF 541 to one or more of such UEs in the pool 590. The NSSF 541 may also operate in tandem with the AMF 511 via an N22 reference point connection 543 to route traffic to the assigned network slice. The NWDA 542 may access and transmit data stored at the UDR 506 to the MANO 520 in an embodiment, upon request by the MANO 520.

The 5G core 570 may further include policy services 560, including a charging function (CHF) 561 and a policy control function (PCF) 562. The CHF 561 in an embodiment may allow charging services to be offered to authorized network functions, while the PCF 562 provides functionality similar to the policy/charging rules function (PCRF) of the 4G EPC. More specifically, the PCF 562 in an embodiment may govern the network behavior by supporting a unified policy framework and access subscription or policy information for enforcement of policy decisions. The PCF 562 in an embodiment may be in communication with the AMF 511 via an N15 reference point connection 514, and with the SMF 512 via an N7 reference point connection 519. The MANO 520 in an embodiment may also be capable of gathering any policies stored at the PCF 562.

As described herein, the enterprise mobile network in an embodiment may be managed by a single entity or enterprise, and may include a plurality of RANs (e.g., 4G RAN, or 5G RAN described with reference to FIGS. 2 and 3 above), cellular network cores (e.g., 4G Evolved Packet Core described with reference to FIG. 3 above, or 5G core 570), and non-cellular access points (e.g., WLAN or BlueTooth® AP 501). Each UE within pool 590 may be capable of establishing a wireless link with a RAN (e.g., 4G RAN described with reference to FIG. 3, or 5G RAN described with reference to FIG. 4 above), or a non-cellular AP (e.g., WLAN or BlueTooth® AP 501) in an embodiment. Wireless connectivity metrics for each wireless link may vary based on the type of RAN or AP with which a UE has established such a link. For example, a wireless link between a UE within pool 590 and 4G RAN may provide greater throughput than a wireless link between that UE and the WLAN/BT AP 501, while the wireless link between that UE and the WLAN/BT AP 501 provides lower latency. This is only one of many possible comparisons between wireless connectivity metrics of wireless links established between a UE within pool 590 and any given RAN or AP in various embodiments. Other connectivity metrics that may be considered for comparison between two wireless links may include, for example, security of the wireless link, signal strength, percentage of dropped packets, or another wireless connectivity metric routinely monitored, recorded, or stored at a UE within pool 590, at the UDR 506, at the MANO 520, as described herein. Thus, choice of the RAN or AP through which communications between a UE in the pool 590 and the remote cloud network or MEC resources may be routed may impact overall connectivity metrics of such communications.

Processing performed at any core (e.g., EPC 350 described with reference to FIG. 3, or 5G core 570) may impact overall connectivity metrics between a UE within pool 590 and the remote cloud network or MEC resources. The ways in which each of these connectivity metrics impacts quality of communications between the pool 590 of UEs and the remote cloud network or MEC resources, as routed through various components of the enterprise mobile network may vary over time as the applications executed by these UEs changes, various UEs enter or leave the pool 590 of linked UEs, the capabilities of the UEs within the pool 590 changes (e.g., more 4G capable UEs enter and more 5G capable UEs exit), or the locations of various UEs within the pool 590 changes. The MANO 520 in an embodiment addresses these issues by routinely assessing the communication needs for the pool 590 of UEs wirelessly linked to the enterprise mobile network operating a plurality of cellular and non-cellular RANs, APs (e.g., including AP 501), and network cores (e.g., including 5G core 570) and adjusting availability of resources at each of these RANs, APs, and cores to meet UE needs. For example, the MANO 520 in an embodiment may operate to increase or decrease the computing resources dedicated to operation of various NFs (e.g., 511, 512, 531, 532, 541, 542, 561, and 562) of the 5G core 570. More specifically, the MANO 520 may increase or decrease the replication rate or processor call priority setting for one or more NFs (e.g., 511, 512, 531, 532, 541, 542, 561, and 562) to adjust the computing resources consumed at the 5G core 570. As another example, the MANO 520 in an embodiment may redirect traffic moving through the 5G RAN 580 to access the 5G core 570 via the non-cellular AP 501, rather than through the 5G RAN 580 when one or more of the DUs or CUs of the 5G RAN 580 are experiencing heavy traffic loads (e.g., as described above with respect to FIG. 4). In such an embodiment, the MANO 520 may further work in tandem with the intelligent wireless carrier link management system at one or more UEs in the pool 590 to terminate wireless links established with the 5G RAN 580 and establish wireless links to the 5G core 570 via the non-cellular AP 501. The MANO 520 in such an embodiment may instruct one or more UEs in pool 590 currently transceiving data via a wireless link between a first antenna at the UE and the 5G RAN 580 to deactivate the first antenna and to activate a second antenna for transceiving of data via a wireless link to the non-cellular AP 501.

Figure 6:
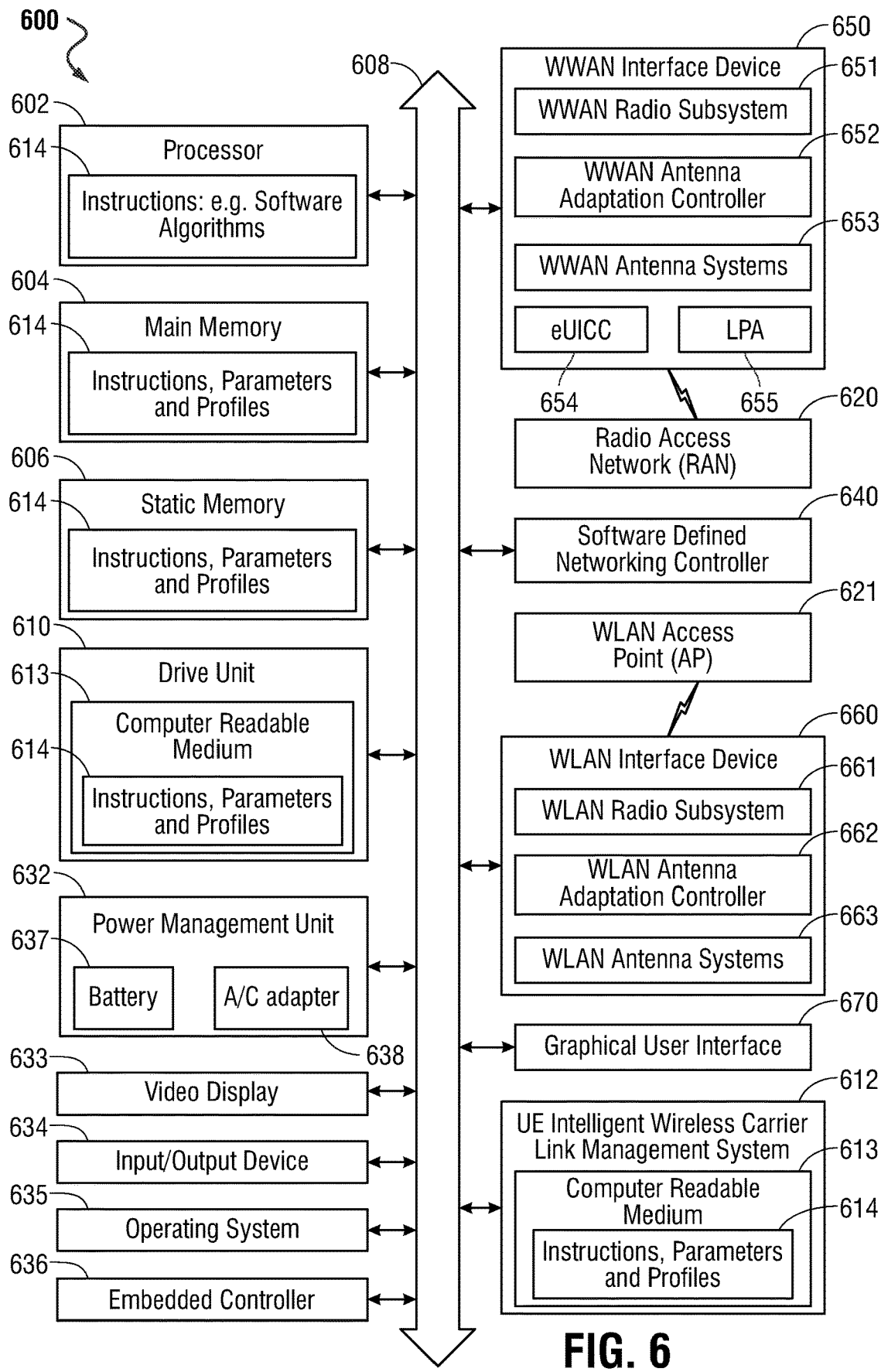
FIG. 6 is a block diagram illustrating an information handling system of a user equipment device (UE) according to an embodiment of the present disclosure.

FIG. 6 is a block diagram illustrating an information handling system of a user equipment device (UE) in wireless communication via a RAN or an AP of an enterprise mobile network according to an embodiment of the present disclosure. As described herein, the Management and Orchestration Module (MANO) in an embodiment may operate as a virtual machine or containerized software application of a computing node within the enterprise mobile network in an embodiment to orchestrate availability of computing resources for execution of various RAN computing nodes and various services or network functions within a 5G core, to optimize communication for a pool of UEs, such as information handling system 600, communicating within the enterprise mobile network. In a networked deployment, the information handling system 600 may operate in the capacity of a server or as a client computer in a server-client network environment, or as a peer computer system in a peer-to-peer (or distributed) network environment. In a particular embodiment, the computer system 600 can be implemented using electronic information handling systems that provide voice, video or data communication. For example, an information handling system 600 may be any mobile or other computing device capable of executing a set of instructions (sequential or otherwise) that specify actions to be taken by that machine. Further, while a single information handling system 600 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 600 can include devices or modules that embody one or more of the devices or execute instructions for the one or more systems and modules described above, and operates to perform one or more of the methods described above. The information handling system 600 may execute code instructions 614 that may operate on servers or systems, remote cloud networks, multi-access edge computing (MEC) systems, or on-box in individual client information handling systems according to various embodiments herein. In some embodiments, it is understood any or all portions of code instructions 614 may operate on a plurality of information handling systems 600.

The information handling system 600 may include a processor 602 such as a central processing unit (CPU), control logic or some combination of the same. Any of the processing resources may operate to execute code that is either firmware or software code. Moreover, the information handling system 600 can include memory such as main memory 604, static memory 606, computer readable medium 613 storing instructions 614 of an antenna selection algorithm, and drive unit 610 (volatile (e.g., random-access memory, etc.), nonvolatile (read-only memory, flash memory etc.) or any combination thereof). The information handling system 600 can also include one or more buses 608 operable to transmit communications between the various hardware components such as any combination of various input and output (I/O) devices.

As shown, the information handling system 600 may further include a video display device 633. The video display device 633 in an embodiment may function as a liquid crystal display (LCD), an organic light emitting diode (OLED), a flat panel display, or a solid-state display. Additionally, the information handling system 600 may include an alpha numeric input device 634, such as a keyboard, and/or a cursor control device, such as a mouse, touchpad, or gesture or touch screen input device. The information handling system 600 can also include a disk drive unit 610.

The Wireless Wide Area Network (WWAN) interface device 650 may provide connectivity of the information handling system 600 to a Radio Access Network (RAN) 620, such as the 4G RAN described above in greater detail with respect to FIG. 3, or the 5G RAN described in greater detail above with respect to FIG. 4, via one or more WWAN wireless links in an embodiment. The RAN 620, in combination with the 4G EPC (e.g., described in greater detail with respect to FIG. 3, above) or the 5G core (e.g., as described in greater detail with respect to FIG. 5, above) may form a WWAN communication network in an embodiment, which may comprise a wired wide area network (WAN), a private LTE communication network, a 4G LTE public communication network, or a 5G millimeter-wave (mm-wave) communication network, or other cellular communication networks. Connectivity of the information handling system 600 of a UE device to any of a plurality of WWAN networks in an embodiment may be via wired or wireless connection. In some aspects of the present disclosure, the WWAN interface device 650 may operate two or more wireless links. In other aspects of the present disclosure, the information handling system 600 may include a plurality of WWAN interface devices, each operating separate radio subsystems.

The WWAN interface device 650 may operate in accordance with any cellular wireless data communication standards. WWAN interface device 650, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WWAN standards, which may operate in both licensed and unlicensed spectrums. More specifically, the WWAN interface device 650 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards now emerging. NRFR2 may include radio frequencies above 6 GHz, made available within the now emerging 5G communications standard. Communications within NRFR1 may be enabled through the use of either an evolved Node B (eNodeB) of a 4G RAN (as described in greater detail with respect to FIG. 3) in combination with the 4G EPC, or the 5G network core (as described in greater detail with respect to FIG. 5), or a logical 5G radio node (gNodeB) of the 5G RAN (as described in greater detail with respect to FIG. 4), in combination with the 5G network core.

Frequencies related to the 5G networks may include high frequency (HF) band, very high frequency (VHF) band, ultra-high frequency (VHF) band, L band, S band, C band, X band, Ku band, K band, Ka band, V band, W band, and millimeter wave bands. WWAN may use the Unlicensed National Information Infrastructure (U-NII) band which typically operates in the ~5 GHz frequency band such as 802.11 a/h/j/n/ac (e.g., center frequencies between 5.170-5.785 GHz). It is understood that any number of available channels may be available under the 5 GHz shared communication frequency band. WWAN may operate in a number of bands, some of which are proprietary but may include a wireless communication frequency band at approximately 2.5 GHz band for example. In additional examples, WWAN carrier bands may operate at frequency bands of approximately 700 MHz, 800 MHz, 1900 MHz, or 1700/2100 MHz for example as well.

In an embodiment, the WWAN interface device 650 may be communicatively coupled to an array of WWAN antenna systems 653 used to provide a communication channel to one or more of the RANs (e.g., 620). The WWAN antennas 653 may support a 5G wireless communication protocol so that relatively higher amounts of data may be transceived by the information handling system 600 to any WWAN communication network to which the information handling system 600 is communicatively coupled in some embodiments.

As described herein, the intelligent wireless carrier link management system of an enterprise mobile network in an embodiment may work in tandem with the MANO (e.g., as described in greater detail with respect to FIGS. 2-4) to increase or decrease the resources dedicated to operation of antennas for any given cellular or non-cellular protocol. As the resources are increased or decreased at various RANs 620 or APs 621 in such an embodiment, the UE information handling system 100 may be directed to terminate wireless links with scaled-down networks and establish new wireless links with scaled-up networks. The intelligent wireless carrier link management system 612 may receive such instructions from the MANO of an enterprise mobile network (e.g., as described in greater detail with respect to FIGS. 2-4), via communication with the RAN 620, or the AP 621, for example. The intelligent wireless carrier link management system 612 in such an embodiment may then instruct the WWAN radio subsystem 651 and the WWAN antenna system 653 to establish the wireless links identified within the received instructions.

The WWAN antenna controller 652 may monitor wireless link state information, wireless link configuration data, network slice data, or other input data to generate channel estimation and determine antenna radiation patterns. For example, the antenna controller 652 in an embodiment may receive, process, or store beacon data from an enterprise mobile network describing channels available for communication with the RAN 620, as well as various current traffic metrics for communications on those channels. More specifically, such beacon information may provide a relative signal strength indicator (RSSI), identification of the communication channels as private or public, identification of the RAN 620 as compatible with multiple user, multiple input, multiple output (MU-MIMO) communications, high available data rate, levels of channel contention, and current load of communications at the RAN 620. Such beacon data may include such measurements or indications for each of the channels within which the RAN 620 is capable of transceiving data, and the beacons may be received in regular intervals.

The WWAN interface device 650 in an embodiment may further include a WWAN radio subsystem 651 which may operate to modulate and demodulate signals transceived within a WWAN format, set signal transmission power levels or sensitivity to signal reception, select channels or frequency bands, and conduct other functions in support of a wireless transmission from the pool of UEs 117 to 4G EPC 150 or the 5G network core 170.

The UE information handling system 600 in an embodiment may also be capable of establishing wireless links within an enterprise mobile network via a non-cellular access point (AP) 621, via a WLAN interface device 660. The non-cellular AP 621 in an embodiment may route communications received from the information handling system 600 to the 4G network core (e.g., as described with reference to FIG. 3), or the 5G network core (e.g., as described with reference to FIG. 5). The non-cellular AP 621 may thus provide a WLAN network that may be a wired local area network (LAN), a wireless personal area network (WPAN), a public WiFi communication network, a private Wi-Fi communication network, a public WiMAX communication network, a Bluetooth® communication network, or any other non-cellular (non-3GPP) communication networks.

In some aspects of the present disclosure, the WLAN network interface device 140 may operate two or more wireless links. In other aspects of the present disclosure, the information handling system 600 may include a plurality of WLAN network interface devices 660, each capable of establishing a separate wireless link to AP 621, such that the information handling system 600 may be in communication with AP 621, via a plurality of wireless links.

The WLAN network interface device 660 may operate in accordance with any cellular wireless data communication standards. To communicate with a wireless local area network, standards including IEEE 802.11 WLAN standards, IEEE 802.15 WPAN standards, WiMAX, Bluetooth®, or similar wireless standards may be used. Utilization of radiofrequency communication bands according to several example embodiments of the present disclosure may include bands used with the WLAN standards which may operate in both licensed and unlicensed spectrums. For example, WLAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band, or a 60 GHz band.

In an embodiment, the WLAN network interface device 660 may be communicatively coupled to an array of antenna systems 663 used to provide a plurality of separate communication channels. As described herein, the intelligent wireless carrier link management system of an enterprise mobile network in an embodiment may work in tandem with the MANO (e.g., as described in greater detail with respect to FIGS. 2-4) to increase or decrease the resources dedicated to operation of antennas for any given cellular or non-cellular protocol. As the resources are increased or decreased at various RANs 620 or APs 621 in such an embodiment, the UE information handling system 100 may be directed to terminate wireless links with scaled-down networks and establish new wireless links with scaled-up networks. The intelligent wireless carrier link management system 612 may receive such instructions from the MANO of an enterprise mobile network (e.g., as described in greater detail with respect to FIGS. 2-4), via communication with the RAN 620, or the AP 621, for example. The intelligent wireless carrier link management system 612 in such an embodiment may then instruct the WLAN radio subsystem 661 and the WLAN antenna system 663 to establish the wireless links identified within the received instructions.

The WLAN antenna controller 662 may monitor wireless link state information, wireless link configuration data, network slice data, or other input data to generate channel estimation and determine antenna radiation patterns. For example, the WLAN antenna controller 662 in an embodiment may receive, process, or store beacon data from an enterprise mobile network describing channels available for communication with the AP 621, as well as various current traffic metrics for communications on those channels. More specifically, such beacon information may provide a relative signal strength indicator (RSSI), identification of the communication channels as private or public, identification of the AP 621 as compatible with multiple user, multiple input, multiple output (MU-MIMO) communications, high available data rate, levels of channel contention, and current load of communications at the AP 621. Such beacon data may include such measurements or indications for each of the channels within which the AP 621 is capable of transceiving data, and the beacons may be received in regular intervals.

The WLAN network interface device 660 in an embodiment may further include a radio subsystem 661 which may operate to modulate and demodulate signals transceived within a WLAN format, set signal transmission power levels or sensitivity to signal reception, select channels or frequency bands, and conduct other functions in support of a wireless transmission to the RAN 620 or the AP 621 of the enterprise mobile network.

The information handling system 600 may further include a software defined networking (SDN) controller 640 operating to route packets or frames transceived pursuant to execution of certain software applications via the OS 635 through specifically identified interface devices (e.g., WWAN interface device 650 or WLAN interface device 660). In another aspect of an embodiment, the SDN controller 640 may instruct transceiving of such packets or frames within specifically identified frequency bands (e.g., below 1 MHz, between 1 MHz and 60 GHz, or above 60 GHz). The SDN controller 640 in an embodiment may operate in a control plane layer (e.g., via software), in part, to route incoming packets/frames to a network interface device for transmission in a specific network slice. The SDN controller 640 in an embodiment may include, for example, an OpenDaylight® controller, a Nicira Networks/VMWare NOX™ controller, an NTT®/Google ONIX® controller, the NEC® Trema® controller, the NTT® Ryu® controller, or open-sourced controllers such as PDX or Beacon controllers. In some embodiments, the SDN controller 160 may comprise a software-defined wide-area network (SD-WAN) controller operating to unify networking connections covering a wide geographical area within an enterprise.

As illustrated, the WWAN interface device 650 in an embodiment may include a local profile assistant (LPA) 655. The LPA 655 may include an enterprise UE connectivity profile associated with the UE information handling system 600. The enterprise UE connectivity profile may include an integrated circuit card identification number (ICCID) for the UE information handling system 600, an international mobile subscriber identity (IMSI) number for the UE information handling system 600, security authentication and ciphering information for the UE information handling system 600, temporary information related to a local network associated with the UE information handling system 600, a list of the services that the UE information handling system 600 has access to, and two passwords: a personal identification number (PIN) for ordinary use, and a personal unblocking key (PUK) for PIN unlocking. The enterprise UE connectivity profile may further include enterprise profile requirements, including a prioritized QoS requirement, prioritized power consumption, or prioritized security requirement, for example.

Examples of enterprise UE connectivity profiles prioritizing QoS requirements may include a high-throughput enterprise profile requirement that prioritizes establishment of wireless links that provide a high throughput, a low-latency enterprise profile requirement that prioritizes establishment of wireless links that provide a low latency, or a hybrid enterprise profile requirement that directs the establishment of one wireless link for throughput-dependent communications and a second, separate wireless link for latency-dependent communications. An example of an enterprise UE connectivity profile prioritizing power consumption may provide a power cap enterprise profile requirement under which all antennas (e.g., 653 or 663) must operate while transceiving data, preference for wireless links that do not require Virtual Private Network (VPN) tunnels, or an enterprise profile requirement that prioritizes power consumption at any antenna (e.g., 653 or 663) of the UE 600 over consideration of QoS requirements above a minimum threshold. Yet another example of an enterprise profile requirement may prioritize security requirements and may require communication via a VPN tunnel or via a secure wireless link with 4G or 5G network cores, or may instruct transceiving of sensitive data via a first antenna (e.g., 653 or 663) and transceiving of other non-sensitive data via a second antenna (e.g., 653 or 663).

Users may choose from these enterprise UE connectivity profiles in some embodiments in order to inform current usage of the UE 600. For example, the enterprise UE connectivity profiles described directly above may be displayed to the user via a graphical user interface (GUI) 670. By choosing a specific profile, the user may indicate, for example, that the UE 600 should operate in low power mode (e.g., if the user plans to operate the UE 600 on battery power for an extended period), high throughput mode (e.g., if the user plans to transceive large volumes of data), low latency mode (e.g., if the user plans to execute latency-sensitive applications), or high security mode (e.g., if the user plans to transceive sensitive data). The user may select from one of the list of enterprise UE connectivity profiles displayed via GUI 670, that may be presented to a user via video display 633.

As described herein, wireless link antenna configuration adjustments in an embodiment may also be determined by a Management and Orchestration Module (MANO) in communication with the UE 600 via RAN 620, or via an out-of-band (OOB) communication with the embedded controller 636. Such determinations may be made, in various embodiments described herein, in order to leverage changes in capacity at various infrastructure components of the RANs (e.g., 620), non-cellular APs (e.g., 621), and cores comprising the enterprise mobile network, as made by the MANO, to optimize performance across each of these infrastructure components and the pool of UEs (e.g., including 600) communicating within the network.

Each of the UEs (e.g., including 600) in a pool may communicate connectivity metrics for each of the UEs (e.g., including 600) within the pool to the MANO located at the enterprise mobile network managed by the enterprise. For example, such connectivity metrics may include throughput, latency, or other quality of service requirements for each UE based on current wireless conditions at available wireless links, executing applications, and other operational data relating to the current operating conditions of the UEs. Further, the enterprise may establish several enterprise profile requirements outlining security policies associated with a UE 600 indicating a level of security required for communication of data pursuant to execution of specifically identified software applications, or a level of security required for communication of data from specific geographic locations (e.g., within a geofenced area of an enterprise campus). As another example, such connectivity metrics may include identification of software applications currently executed by an Operating System 635 of the UE 600, power metrics describing current, previous, or projected power consumption rates, and current power available (e.g., as stored at battery 637, or available via the A/C adapter 638). Connectivity metrics in an embodiment for the UE information handling system 600 in an embodiment may include measurements of various quality of service (QoS) variables for established or available wireless links with the RAN 620 or the non-cellular AP 621, including, for example, latency, throughput, dropped packets, security levels (e.g., Virtualized Private Network (VPN) tunnels), or network slice designations. These connectivity metrics may further identify the antenna configurations (e.g., WLAN or WWAN, frequency band, gain, range, power requirements, etc.) through which those wireless links have been established. Connectivity requirements for the UE information handling system 600 in an embodiment may describe QoS requirements UE 600, as defined by policies or enterprise UE connectivity profiles associated with the UE 600, stored in memory 604 or 606 and accessible via the embedded controller 636, in various embodiments. Thus, the connectivity requirements for the UE information handling system 600 may be determined by the intelligent wireless carrier link management system 612 locally or remotely at the MANO based at least in part on currently executing software applications, the connectivity metrics, policies stored at various cellular network cores, and enterprise UE connectivity profiles managed by a subscription manager data preparation platform.

The intelligent wireless carrier link management system 612 may initiate or facilitate any wireless link antenna configuration adjustments determined by system 612 or received from the MANO via RAN 620 or embedded controller 636 in an embodiment, For example, in an embodiment a user or enterprise administrator may select an enterprise UE connectivity profile that prioritizes throughput (or the system 612 determines an antenna configuration prioritizing throughput is otherwise appropriate) and may depend on currently executing software applications, the intelligent wireless carrier link management system 612 in an embodiment may direct establishment of a wireless link between the WWAN interface device 650 and a RAN 620 or a wireless link between the WLAN interface device 660 and a non-cellular AP 621 generating beacon data indicating the highest available throughput, but also based on network intelligence data from the MANO or priority and connectivity requirements data of other UEs in the pool of UEs. As another example, if the user selects an enterprise UE connectivity profile that prioritizes latency (or the system 612 determines an antenna configuration minimizes latency is otherwise appropriate), the intelligent wireless carrier link management system 612 in an embodiment may direct establishment of a wireless link between the WWAN interface device 650 and a RAN 620 or a wireless link between the WLAN interface device 660 and a non-cellular AP 621 generating beacon data indicating the lowest available latency, but also based on network intelligence data from the MANO or priority and connectivity requirements data of other UEs in the pool of UEs. As yet another example, if the user selects an enterprise UE connectivity profile that prioritizes security (or the system 612 determines an antenna configuration prioritizing security is otherwise appropriate), the intelligent wireless carrier link management system 612 in an embodiment may direct establishment of a wireless link within a secure network slice of the 5G core via the RAN 620, or a wireless link with a non-cellular AP 621 using a VPN tunnel, but also based on network intelligence data from the MANO or priority and connectivity requirements data of other UEs in the pool of UEs.

The information handling system 600 may further include a power management unit (PMU) 632 (a.k.a. a power supply unit (PSU)). The PMU 632 may manage the power provided to the components of the information handling system 600 such as the processor 602, a cooling system, one or more drive units 610, a graphical processing unit (GPU), a video/graphic display device or other input/output devices 634, and other components that may require power when a power button has been actuated by a user. In an embodiment, the PMU 632 may monitor power levels and be electrically coupled to the information handling system 600 to provide this power and coupled to bus 608 to provide or receive data or instructions. The PMU 632 may regulate power from a power source such as a battery 637 or A/C power adapter 638. In an embodiment, the battery 637 may be charged via the A/C power adapter 638 and provide power to the components of the information handling system 600 when A/C power from the A/C power adapter 638 is removed.

Information handling system 600 includes one or more of an operating system (OS) 635, and basic input/output system (BIOS) firmware/software or application programs that may be executable instructions 614 executed at any processor 602 and stored at one or more memory devices 604, 606, or 610. BIOS firmware/software functions to initialize information handling system 600 on power up, to launch an OS 635, and to manage input and output interactions between the OS 635 and the other elements of information handling system 600. In a particular embodiment, BIOS firmware/software resides in memory 604, and include machine-executable code that is executed by processor 602 to perform various functions of information handling system 600 as described herein. In another embodiment (not illustrated), application programs and BIOS firmware/software reside in another storage medium of information handling system 600. For example, application programs and BIOS firmware/software can reside in drive 610, in a ROM (not illustrated) associated with information handling system 600, in an option-ROM (not illustrated) associated with various devices of information handling system 600, in a storage system (not illustrated) associated with network channel of a WWAN interface device 650 or a WLAN interface device 660, in another storage medium of information handling system 600, or a combination thereof. Executable code instructions 614 for application programs and BIOS firmware/software can each be implemented as single programs, or as separate programs carrying out the various features as described herein.

As shown in FIG. 6, the information handling system 600 may further include an embedded subscriber identification module (eSIM) 654. The eSIM 654 may include an integrated circuit card identification number (ICCID) for the information handling system 600, an international mobile subscriber identity (IMSI) number for the information handling system 600, security authentication and ciphering information for the information handling system 600, temporary information related to a local network associated with the information handling system 600, a list of the services that the information handling system 600 has access to, and two passwords: a personal identification number (PIN) for ordinary use, and a personal unblocking key (PUK) for PIN unlocking.

In some embodiments, software, firmware, dedicated hardware implementations such as application specific integrated circuits, programmable logic arrays and other hardware information handling systems can be constructed to implement one or more of the methods described herein. Applications that may include the apparatus and systems of various embodiments can broadly include a variety of electronic and computer systems. One or more embodiments described herein may implement functions using two or more specific interconnected hardware modules or information handling systems with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller such as embedded controller (EC) 636 or a processor 602 system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 614 or receives and executes instructions, parameters, and profiles 614 responsive to a propagated signal; so that a device connected to a network via RAN 620 or AP 621, for example, can communicate voice, video or data over the wireless network. Further, the instructions 614 may be transmitted or received over the wireless network via the network interface device (e.g., 650 or 660).

The information handling system 600 can include a set of instructions 614 that can be executed to cause the computer system to perform any one or more of the methods or computer-based functions disclosed herein. For example, instructions 614 may execute an antenna selection algorithm, various software applications, software agents, or other aspects or components. Various software modules comprising application instructions 614 may be coordinated by an operating system (OS), and/or via an application programming interface (API). An example operating system may include Windows®, Android®, and other OS types known in the art. Example APIs may include Win 32, Core Java API, or Android APIs.

The disk drive unit 610 and may include a computer-readable medium 613 in which one or more sets of instructions 614 such as software can be embedded to be executed by the processor 602 to perform the processes described herein. Similarly, main memory 604 and static memory 606 may also contain a computer-readable medium for storage of one or more sets of instructions, parameters, or profiles 614. The disk drive unit 610 or static memory 606 also contain space for data storage. Further, the instructions 614 may embody one or more of the methods or logic as described herein. In a particular embodiment, the instructions, parameters, and profiles 614 may reside completely, or at least partially, within the main memory 604, the static memory 606, and/or within the disk drive 610 during execution by the processor 602 of information handling system 600. The main memory 604 and the processor 602 also may include computer-readable media.

Main memory 604 or other memory of the embodiments described herein may contain computer-readable medium (not shown), such as RAM in an example embodiment. An example of main memory 604 includes random access memory (RAM) such as static RAM (SRAM), dynamic RAM (DRAM), non-volatile RAM (NV-RAM), or the like, read only memory (ROM), another type of memory, or a combination thereof. Static memory 606 may contain computer-readable medium (not shown), such as NOR or NAND flash memory in some example embodiments. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such devices, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

FIG. 7 is a flow diagram illustrating a method of determining a user equipment (UE) device antenna configuration adjustment, based on metrics, requirements and policies for the UE according to an embodiment of the present disclosure. As described herein, the ways in which various connectivity metrics impact quality of communications between a pool of UEs and a remote cloud network or MEC resources, as routed through various components of the enterprise mobile network, may vary over time as the applications executed by these UEs changes, various UEs enter or leave the pool of linked UEs, the capabilities of the UEs within the pool changes (e.g., more 4G capable UEs enter and more 5G capable UEs exit), or the locations of various UEs within the pool changes. The intelligent wireless carrier link management system in an embodiment addresses these issues by routinely assessing the communication needs for each UE wirelessly linked within the enterprise mobile network, and determining when each UE would benefit from an increase, decrease, or rerouting of wireless links established between that UE and a remote cloud network via an enterprise mobile network.

A Management and Orchestration Module (MANO) of the enterprise mobile network in various embodiments described herein may thus determine an optimal distribution of wireless links having varying connectivity metrics across a pool or UEs in communication via the enterprise mobile network in order to meet connectivity requirements at a largest number of those UEs to optimize connectivity among the linked or managed UEs. For example, the MANO in an embodiment may distribute or reroute wireless links across the pool of UEs in order to take advantage of recent scaling of processing resources at various infrastructure components (e.g., RANs, non-cellular APs, MEC, or cellular network cores) within the enterprise mobile network. As another example, the MANO may distribute or reroute wireless links across the pool of UEs to redirect traffic away from certain infrastructure components of the enterprise mobile network experiencing high traffic or congestion. As yet another example, the MANO may distribute or reroute wireless links across the pool of UEs as the connectivity requirements for those UEs change over time (e.g., requirements for high throughput or low latency).

At block 702, a UE device executing the intelligent wireless carrier link management system may be powered on. For example, in an embodiment described with reference to FIG. 6, the UE information handling system 600 may power on when the power management unit 632 receives power via the battery 637 or the A/C adapter 638. The power management unit 632 may then power on the WWAN interface device 650.

A UE eSIM module or the MANO may retrieve a plurality of enterprise UE connectivity profiles for the UE from a subscription manager data preparation platform in an embodiment at block 704. For example, in an embodiment described with reference to FIG. 2, 4G UE 211, 5G UE 212, or WiFi UE 213 may retrieve such enterprise UE connectivity profiles associated with those UEs, respectively, from the subscription manager data preparation platform 237 within the enterprise RAN and core infrastructure 230. In other embodiments, the subscription manager data preparation platform 237 may be located within the remote cloud network 250.

As another example, in an embodiment described with reference to FIG. 6, the eUICC 654 eSIM module operating at the UE information handling system 600 in an embodiment may retrieve the plurality of enterprise UE connectivity profiles for the UE 600 via the RAN 620. As illustrated, the WWAN interface device 650 in an embodiment may include a local profile assistant (LPA) 655. The LPA 655 may include an enterprise UE connectivity profile associated with the UE information handling system 600. The enterprise UE connectivity profile may indicate a prioritized QoS requirement, prioritized power consumption, or prioritized security requirement, for example.

Examples of enterprise UE connectivity profiles prioritizing QoS requirements may include a high-throughput enterprise profile requirement that prioritizes establishment of wireless links that provide a high throughput, a low-latency enterprise profile requirement that prioritizes establishment of wireless links that provide a low latency, or a hybrid enterprise profile requirement that directs the establishment of one wireless link for throughput-dependent communications and a second, separate wireless link for latency-dependent communications. An example of an enterprise UE connectivity profile prioritizing power consumption may provide a power cap enterprise profile requirement under which all antennas (e.g., 653 or 663) must operate while transceiving data, preference for wireless links that do not require Virtual Private Network (VPN) tunnels, or prioritization of power consumption at any antenna (e.g., 653 or 663) of the UE 600 over consideration of QoS requirements above a minimum threshold. Yet another example of an enterprise profile requirement may prioritize security requirements and may require communication via a VPN tunnel or via a secure wireless link with 4G or 5G network cores, or may instruct transceiving of sensitive data via a first antenna (e.g., 653 or 663) and transceiving of other non-sensitive data via a second antenna (e.g., 653 or 663).

At block 706, a graphical user interface (GUI) of the UE may display the plurality of retrieved enterprise UE connectivity profiles for the UE for selection by the user. Users may choose from the enterprise UE connectivity profiles retrieved at block 704 in some embodiments in order to inform current usage of the UE 600. For example, the enterprise UE connectivity profiles described directly above may be displayed to the user via a graphical user interface (GUI) 670. By choosing a specific enterprise UE connectivity profile, the user may indicate, for example, that the UE 600 should operate according to a low power enterprise profile requirement (e.g., if the user plans to operate the UE 600 on battery power for an extended period), high throughput enterprise profile requirement (e.g., if the user plans to transceive large volumes of data), low latency enterprise profile requirement (e.g., if the user plans to execute latency-sensitive applications), hybrid throughput/latency, or high security enterprise profile requirement (e.g., if the user plans to transceive sensitive data).

At block 708, the intelligent wireless carrier link management system may direct the establishment of a wireless link in compliance with the user-selected enterprise UE connectivity profile and corresponding enterprise profile requirement. For example, in an embodiment described with reference to FIG. 6, the user may select from one of the list of enterprise UE connectivity profiles displayed via GUI 670. As described directly above, the user-selected enterprise UE connectivity profile may indicate a highest priority requirement for a wireless link. For example, if the user selects an enterprise UE connectivity profile containing an enterprise profile requirement that prioritizes throughput, the intelligent wireless carrier link management system 612 in an embodiment may direct establishment of a wireless link between the WWAN interface device 650 and a RAN 620 or a wireless link between the WLAN interface device 660 and a non-cellular AP 621 generating beacon data indicating the highest available throughput. As another example, if the user selects an enterprise UE connectivity profile that prioritizes latency, the intelligent wireless carrier link management system 612 in an embodiment may direct establishment of a wireless link between the WWAN interface device 650 and a RAN 620 or a wireless link between the WLAN interface device 660 and a non-cellular AP 621 generating beacon data indicating the lowest available latency. As yet another example, if the user selects an enterprise UE connectivity profile that prioritizes security, the intelligent wireless carrier link management system 612 in an embodiment may direct establishment of a wireless link within a secure network slice of the 5G core via the RAN 620, or a wireless link with a non-cellular AP 621 using a VPN tunnel.

In some embodiments, the intelligent wireless carrier link management system may direct the establishment of a plurality of wireless links in compliance with the user-selected enterprise UE connectivity profile and associated enterprise profile requirement. For example, if the user selects an enterprise UE connectivity profile that prioritizes both high throughput and low latency (e.g., a hybrid profile), the intelligent wireless carrier link management system 612 may direct establishment of a first wireless link, via a first antenna, between the WWAN interface device 650 and a RAN 620 or a wireless link between the WLAN interface device 660 and a non-cellular AP 621 generating beacon data indicating the lowest available latency and establishment of a second wireless link, via a second antenna, between the WWAN interface device 650 and a RAN 620 or a wireless link between the WLAN interface device 660 and a non-cellular AP 621 generating beacon data indicating the highest available throughput.

The intelligent wireless carrier link management system in an embodiment may gather and transmit to the MANO UE connectivity metrics describing executing software applications and potential data bandwidth needs of those applications at block 710. In an example embodiment described with reference to FIG. 6, each of the UEs (e.g., including 600) in pool may execute the intelligent wireless carrier link management system 612 to communicate connectivity metrics for each of the UEs (e.g., including 600) within pool to the MANO located at the enterprise mobile network managed by the enterprise. As an example, such connectivity metrics may include identification of software applications currently executed by an Operating System 635 of the UE 600, projected data bandwidth needs of the software applications of the UE, of level of security required for communication of data pursuant to execution of specifically identified software applications, or a level of security required for communication of data from specific geographic locations of the UE (e.g., within a geofenced area of an enterprise campus). Additional connectivity metrics may include power metrics describing current, previous, or projected power consumption rates, and current power available (e.g., as stored at battery 637, or available via the A/C adapter 638).

Connectivity metrics in an embodiment for the UE information handling system 600 in an embodiment may also include measurements of various quality of service (QoS) variables for established wireless links with the RAN 620 or the non-cellular AP 621, including, for example, latency, throughput, dropped packets, security levels (e.g., Virtualized Private Network (VPN) tunnels), or network slice designations gathered at block 712. Connectivity requirements for the UE information handling system 600 in an embodiment may describe QoS requirements UE 600, as defined by policies associated with the UE 600, stored in memory 604 or 606 and accessible via the embedded controller 636, or as determined by the intelligent wireless carrier link management system 612 based on currently executing software applications. The UE 600 in an embodiment may transmit these gathered connectivity metrics and any UE connectivity requirements if determined at the UE, to the MANO of the enterprise mobile network in an embodiment, via an established wireless link with the RAN 620, or the non-cellular AP 621, or via an out-of-band communication occurring directly between the MANO and the embedded controller 636, for example.

At block 712, the intelligent wireless carrier link management system in an embodiment may gather and transmit to the MANO UE connectivity metrics describing QoS for all available wireless links as well as connectivity metrics gathered at block 710 relating to executing software applications and operation of the UE. For example, in an embodiment described with reference to FIG. 1, the antenna controller 142 in an embodiment may generate beacon data for transmission to one or more of the pool of UEs 117 describing channels available for communication with that AP 190, as well as various current traffic metrics for communications on those channels to determine QoS of available wireless links. More specifically, such beacon information may provide a relative signal strength indicator (RSSI), identification of the communication channels as private or public, identification of the AP 190 as compatible with multiple user, multiple input, multiple output (MU-MIMO) communications, high available data rate, levels of channel contention, and current load of communications at the AP 190. Such beacon data may include such measurements or indications for each of the channels within which the AP 190 is capable of transceiving data, and the beacons may be received in regular intervals.

In another example embodiment described with reference to FIG. 6, the UE WWAN antenna controller 652 may receive, process, or store beacon data from an enterprise mobile network via WWAN radio 651 describing channels available for communication with the RAN 620, as well as various current traffic metrics for communications on those channels. More specifically, such beacon information may provide a relative signal strength indicator (RSSI), identification of the communication channels as private or public, identification of the RAN 620 as compatible with multiple user, multiple input, multiple output (MU-MIMO) communications, high available data rate, levels of channel contention, and current load of communications at the RAN 620. Such beacon data may include such measurements or indications for each of the channels within which the RAN 620 is capable of transceiving data, and the beacons may be received in regular intervals.

In still another example, the WLAN antenna controller 662 in an embodiment may receive, process, or store beacon data from AP 621, via WLAN radio 661, describing channels available for communication with the AP 621, as well as various current traffic metrics for communications on those channels. More specifically, such beacon information may provide a relative signal strength indicator (RSSI), identification of the communication channels as private or public, identification of the AP 621 as compatible with multiple user, multiple input, multiple output (MU-MIMO) communications, high available data rate, levels of channel contention, and current load of communications at the AP 621. Such beacon data may include such measurements or indications for each of the channels within which the AP 621 is capable of transceiving data, and the beacons may be received in regular intervals. Changes to these UE connectivity metrics may trigger the intelligent wireless carrier link management system at the UE to analyze whether establishment of new wireless links at that UE or termination of existing wireless links are necessary, as described in greater detail herein at block 716. The UE 600 in an embodiment may transmit these gathered connectivity metrics (and connectivity requirements, if determined at the UE) to the MANO of the enterprise mobile network in an embodiment, via an established wireless link with the RAN 620, or the non-cellular AP 621, or via an out-of-band communication occurring directly between the MANO and the embedded controller 636, for example.

The MANO or the intelligent wireless carrier link management system in an embodiment may gather UE policies from network cores and enterprise UE connectivity profiles from a subscription management data preparation platform describing minimum QoS requirements and security requirements at block 714. UE policies may be managed and stored at various cellular network cores (e.g., 4G EPC or 5G core). For example, in an embodiment described with reference to FIG. 3, the HSS 312 of the 4G EPC 350 may store policy information for the plurality of UEs in pool 340. As yet another example, in an embodiment described with reference to FIG. 5, the UDR 506 of the 5G core 570 may store policy information for the plurality of UEs in pool 590. These policies may inform or dictate the types of wireless communication networks with which each UE associated with a given policy may establish wireless connections, based on link performance requirements, security requirements, types of networks supported by a given UE, or other factors in various embodiments. For example, the UDR 506 or HSS 312 may store a separate policy for each of the UEs in the pool (e.g., 590 or 340, respectively) that identifies one or more security levels with which a given UE may be associated. Such security levels may be assigned to each UE by an IT professional of the enterprise operating the enterprise mobile network, and may be adjustable or dynamically adaptable based on real-time metrics describing the usage, location, or movement of the UE or based on determined security levels of data for executing software applications. Changes to these UE policies at a UE may trigger the intelligent wireless carrier link management system at the UE to analyze whether establishment of new wireless links at that UE or termination of existing wireless links are necessary, as described in greater detail herein at block 716.

In an embodiment described with reference to FIG. 3, for example, the MANO 320 may retrieve these policies describing minimum throughput values, maximum latency values, or other Quality of Service (QoS) requirements and security settings for a UE directly from the PCRF 307. In an embodiment described with reference to FIG. 5, these minimum throughput values, maximum latency values, or other Quality of Service (QoS) requirements, and security settings for such a UE, as stored within policies at the UDR 506 may be retrieved by the MANO 530 from the PCF 562. In another example embodiment described with respect to FIG. 6, policies associated with the UE 600 may be stored in memory 604 or 606 and accessible to the MANO via the embedded controller 636.

Enterprise UE connectivity profiles may be managed by an IT manager of the enterprise via a subscription manager data preparation platform. The MANO may retrieve enterprise UE connectivity profiles from the subscription manager data preparation platform in an embodiment. Such profiles may indicate a UE rank or priority status, as assigned to the UE by an IT professional of the enterprise. For example, a UE assigned to a corporate officer or a key engineering or technical employee of the enterprise may be given a higher UE rank or priority status in comparison to a UE assigned to a new employee or an employee with lower critical needs for bandwidth or low latency, or a UE with currently unused connectivity requirements. As another example, a UE designated for processing large volumes of data central to the business operations of the enterprise may be given a highest UE rank or priority status. As yet another example, a UE located within a certain geographical area such as a secure portion of an enterprise campus or a meeting room of an enterprise campus routinely used for sales or negotiations may be given a higher UE rank or priority status. As described in greater detail at block 716 below, the MANO in an embodiment may refer to these UE ranks or priority statuses while determining the optimal wireless link distribution across all UEs, by assigning wireless links with connectivity metrics that are in high demand based on UE rank or priority status.

At block 716, the MANO or the intelligent wireless carrier link management system at the UE may determine whether currently established wireless links (e.g., as established at block 708) provide UE connectivity metrics (e.g., as gathered at block 712) that meet UE connectivity requirements determined based on UE connectivity metrics, enterprise profile requirements (e.g., within enterprise UE connectivity profiles), and UE policies gathered at blocks 710, 712, and 714. The MANO in an embodiment may determine connectivity requirements for a pool of UEs in communication via the enterprise mobile network, based on UE connectivity metrics gathered from each of the individual UEs, UE policies gathered from network cores, enterprise profile requirements gathered from the subscription manager data preparation platform, and on determined network conditions of various infrastructure components (e.g., RANs, non-cellular APs, or cellular cores) of the enterprise mobile network. For example, the MANO in an embodiment may determine a connectivity requirement for high throughput is required for a UE based on execution of a software application requiring high throughput (e.g., as shown in connectivity metrics gathered at block 710), or based on an enterprise profile requirement for a high throughput wireless link associated with that UE (e.g., as shown in connectivity metrics gathered at block 714). As another example, the MANO in an embodiment may determine a connectivity requirement for low latency is required for a UE based on execution of a software application requiring low latency (e.g., as shown in connectivity metrics gathered at block 710), or based on an enterprise profile requirement for a low latency wireless link associated with that UE (e.g., as shown in connectivity metrics gathered at block 714). As yet another example, the MANO in an embodiment may determine a connectivity requirement for a secure wireless link is required for a UE based on execution of a software application requiring secure communication (e.g., as shown in connectivity metrics gathered at block 710), or based on an enterprise profile requirement for a secure wireless link associated with that UE (e.g., as shown in connectivity metrics gathered at block 714). In other embodiments, determination of connectivity requirements may be made at individual UEs and transmitted to the MANO, rather than determined at the MANO, as described at block 710, above.

As described herein, changes in operating conditions at the UE may result in a need to adjust wireless link parameters or antenna configurations to adapt to those changes. In some embodiments, changes in operating conditions at the UE may result in current wireless links underperforming or failing to meet current or recently updated UE connectivity requirements at the UE. For example, the intelligent wireless carrier link management system or MANO in an embodiment may determine that an established wireless link optimized for high throughput communication cannot meet the recently updated UE connectivity requirements associated with a recently initiated software application requiring low latency communication. As another example, the intelligent wireless carrier link management system or MANO in an embodiment may determine that an established wireless link optimized for low latency communication cannot meet the recently updated UE connectivity requirements associated with a recently initiated software application requiring high throughput communication. In another example, the intelligent wireless carrier link management system or MANO in an embodiment may determine that an established wireless link transceiving non-secure data communication cannot meet the recently updated UE connectivity requirements associated with a recently initiated software application requiring transceiving of secure data.

In some embodiments, changes in operating conditions at the UE may result in current wireless links providing connectivity exceeding updated UE connectivity requirements at the UE. For example, UE antenna configurations prioritizing high throughput may need to be adjusted in an embodiment in which the UE ceases executing software applications driving the earlier need for high throughput. As another example, UE antenna configurations prioritizing low latency may need to be adjusted in an embodiment in which the UE ceases executing software applications driving the earlier need for low latency. As yet another example, UE antenna configurations prioritizing security may need to be adjusted in an embodiment in which the UE ceases executing software applications driving the earlier need for high security.

As described herein, these determinations whether the current UE antenna configurations meet connectivity requirements may be made at either the intelligent wireless carrier link management system at an individual UE, or may be made by the MANO of the enterprise mobile network, based on metrics gathered from a pool of UEs, each executing an agent of the intelligent wireless carrier link management system. In some embodiments, determinations made at the intelligent wireless carrier link management system as to whether the current UE antenna configurations meet connectivity requirements, and policy requirements gathered or determined for the UE, may be made at each UE individually and communicated to the MANO of the enterprise mobile network. If the current UE antenna configurations do not meet the connectivity, and enterprise profile requirements for the UE, this may indicate changes in UE antenna configuration or selection of RANs are required, and the method may proceed to block 718 for optimal redistribution of wireless links across a plurality of UEs by the MANO in order to meet connectivity, and enterprise profile requirements for as many UEs in the pool as possible. If the current UE antenna configurations meet the connectivity, and enterprise profile requirements gathered from all UEs within the pool, this may indicate no need for changes in UE antenna configuration or RAN selections, and the method may proceed back to block 710 to continue to gather updated connectivity metrics to determine updated UE connectivity requirements, as well as updated UE policies and enterprise UE connectivity profiles. The UE may communicate this status to the MANO. By repeating the loop between blocks 710 and 716 in such a way, the MANO and intelligent wireless carrier link management system may routinely assess the wireless communication needs across all UEs communicating via the enterprise mobile network and adaptively changing wireless link configurations in order to provide a greatest number of UEs within the pool access to wireless links capable of meeting their changing UE connectivity requirements. However, it is understood that the MANO may determine that this UE may need to have adjustments made to reduce connectivity capacity to accommodate other UEs in the pool of UEs if unused bandwidth or wireless link capacity is assigned to it but not needed in example embodiments.

The MANO in an embodiment may determine an optimal wireless link distribution across all UEs communicating via the enterprise mobile network for meeting updated QoS requirements across the largest possible number of UEs within the pool at block 718. Changes may be made for the UE executing the intelligent wireless link carrier management system as determined by the MANO and communicated to the UE. For example, in an embodiment described with reference to FIG. 2, the ways in which connectivity metrics for wireless links 220 established between the UE pool 210 and the enterprise RAN and core infrastructure 230 impacts quality of communications between the pool 210 of UEs and the remote cloud network 250 or MEC metrics, as routed through various components of the enterprise RAN and core infrastructure 230 may vary over time as the applications executed by these UEs changes, various UEs enter or leave the pool 210 of linked UEs, the capabilities of the UEs within the pool 210 changes (e.g., more 4G capable UEs 211 enter and more 5G capable UEs 212 exit), or the locations of various UEs within the pool 210 changes. The MANO 236 in an embodiment addresses these issues by routinely assessing the communication needs for the pool 210 of UEs wirelessly linked to the enterprise RAN and core infrastructure 230 operating a plurality of cellular and non-cellular RANs (e.g., 231 and 232), APs (e.g., 233), and network cores (e.g., 234 and 235) and adjusting availability of resources at each of these RANs, APs, and cores to meet UE needs. This may be ongoing with all UEs in the pool 210 of UEs, and may respond to each particular UE that determines a change in antenna configuration and utilization of RANs available as needed as in step 716.

For example, the MANO 236 in an embodiment may scale up computing or processing resources available at the 4G RAN 231, 5G RAN 232, 4G EPC 234, or 5G core 235 experiencing congestion, high-latency, or low throughput. In such an embodiment, the MANO 236 may further work in tandem with the intelligent wireless carrier link management system 214 at one or more UEs in the pool 210 to take advantage of these scaled up computing or processing resources by transceiving at least a portion of data through the recently scaled up component of the enterprise RAN and core infrastructure 230. As another example, the MANO 236 in an embodiment may increase the number of antennas transceiving data at the 4G RAN 231, 5G RAN 232, or Wi-Fi AP 233 when one of these components of the enterprise RAN and core infrastructure 230 is experiencing high traffic load. In such an embodiment, the MANO 236 may further work in tandem with the intelligent wireless carrier link management system 214 at one or more UEs in the pool 210 to take advantage of these newly added antennas by transceiving at least a portion of data through the recently activated antennas.

The MANO 236 in an embodiment may also operate to redistribute wireless links between a plurality of UEs in the pool 210 and various infrastructure components (e.g., 4G RAN 231, 5G RAN 232, non-cellular AP 233, 4G EPC 234, or 5G core 235) of the enterprise RAN and core infrastructure 230 to ensure UE connectivity requirements are met for as many UEs in pool 210 as possible. In such an embodiment, the MANO 236 may do so, for example, by assigning one or more wireless links capable of meeting a specific UE's connectivity requirements, as indicated by connectivity metrics for those wireless links, to that specific UE. More specifically, the MANO 236 in such an example embodiment may assign a wireless link with the 4G RAN 231, 5G RAN 232, or non-cellular AP 233 having connectivity metrics indicating a high throughput to a UE within pool 210 having a connectivity requirement for high throughput. As another example, the MANO 236 in such an example embodiment may assign a wireless link with the 4G RAN 231, 5G RAN 232, or non-cellular AP 233 having connectivity metrics indicating a low latency to a UE within pool 210 having a connectivity requirement for low latency.

In some cases, UE connectivity requirements cannot be met for all UEs in the pool 210. For example, the number of wireless links having connectivity metrics indicating high throughput may be less than the number of UEs in pool 210 that are requesting high throughput wireless links. As another example, the number of wireless links having connectivity metrics indicating low latency may be less than the number of UEs in pool 210 that are requesting low latency wireless links. In such scenarios, the MANO 236 may access enterprise UE connectivity profiles from the subscription manager data preparation platform 237 to determine which UEs in pool 210 should be given priority for wireless links in high demand. Such enterprise UE connectivity profiles may indicate a UE rank or priority status, as assigned to the UE by an IT professional of the enterprise. For example, a UE assigned to a corporate officer or key engineering or technical personnel of the enterprise may be given a higher UE rank or priority status in comparison to a UE assigned to a new employee or an employee whose connectivity requirements are lower or currently unused. As another example, a UE designated for processing large volumes of data central to the business operations of the enterprise may be given a highest UE rank or priority status. As yet another example, a UE located within a certain geographical area such as a secure portion of an enterprise campus or a meeting room of an enterprise campus routinely used for sales or negotiations may be given a higher UE rank or priority status. By retrieving or accessing such enterprise UE connectivity profiles stored at the subscription manager data preparation platform 237 in an embodiment, the MANO 236 may assign wireless links in high demand to UEs in pool 210 indicating such a demand according to UE rank or priority status. For example, the MANO 236 may assign high demand wireless links to all UEs in pool 210 indicating such a demand in a highest UE rank or priority status first, then in descending order of UE rank or priority status until all high demand wireless links have been distributed.

At block 720, the MANO in an embodiment may determine a UE antenna configuration adjustment required to achieve the optimal wireless link distribution across all UEs. Antenna configuration adjustments at the UE may include, for example, activation or deactivation of any available antenna and any wireless protocol radio system at the UE. As described herein, the MANO in an embodiment may increase or decrease capacity at one or more enterprise mobile network infrastructure components (e.g., RANs, non-cellular APs, cores, or MECs), based on all of this information gathered across all UEs communicating within the enterprise mobile network in order to optimize connectivity for all UEs. When the MANO adjusts capacity at one or more of such infrastructure components in such a way, the MANO may then redistribute wireless links across the pool of UEs communicating within the enterprise mobile network. In such a way, the MANO may instruct the operation of the UEs, including the UE executing the method portions of FIG. 7, in order to take advantage of this increased capacity at various infrastructure components or to compensate for decreased capacity at various infrastructure components. The MANO may instruct the operation of the UEs in such embodiments by transmitting an instruction to adjust UE antenna configuration directly to a UE via OOB communications. The MANO may also adjust policies at one or more cellular network cores in order to authorize those UEs to access communications through those cellular network cores, as described in greater detail below.

As an example of the MANO redistributing wireless links based on adjustments to capacity at various infrastructure components of the enterprise mobile network, in an embodiment described with reference to FIG. 3, the MANO 320 may scale up computing or processing resources available at the 4G RAN 360 or 4G EPC 350 experiencing congestion, high-latency, or low throughput. In such an embodiment, the MANO 320 may further work in tandem with the intelligent wireless carrier link management system at one or more UEs in the pool 340 to take advantage of these scaled up computing or processing resources by transceiving at least a portion of data through the recently scaled up 4G RAN 360 or 4G EPC 350. For example, the MANO 320 may instruct one or more UEs in pool 340, including the UE executing method portions of FIG. 7, currently transceiving data via a wireless link between a first antenna at the UE and either the 5G RAN or non-cellular AP 330 to activate a second antenna for transceiving of data via a wireless link to the 4G RAN 360. Similarly, the MANO 320 may instruct these one or more UEs in pool 340 currently transceiving data via a wireless link between a first antenna at the UE and the 4G RAN 360 to deactivate this first antenna when the MANO 320 decreases computing or processing resources available at the 4G RAN 360.

As another example, the MANO 320 in an embodiment may increase the number of antennas (e.g., 362, 366, or 371) transceiving data at the 4G RAN 360 when the 4G RAN 360 is experiencing high traffic load. In such an embodiment, the MANO 320 may further work in tandem with the intelligent wireless carrier link management system at one or more UEs in the pool 340 to take advantage of these newly added antennas by transceiving at least a portion of data through the recently activated antennas. For example, the MANO 320 may instruct one or more UEs in pool 340, including the UE executing method portions of FIG. 7, currently transceiving data via a wireless link between a first antenna at the UE and either the 5G RAN or non-cellular AP 330 to activate a second antenna for transceiving of data via a wireless link to these newly activated antennas at the 4G RAN 360. Similarly, the MANO 320 may instruct one or more UEs in pool 340, including the UE executing method portions of FIG. 7, currently transceiving data via a wireless link between a first antenna at the UE and the 4G RAN 360 to deactivate this first antenna when the MANO 320 decreases the number of antennas available at the 4G RAN 360.

As another example of the MANO redistributing wireless links based on adjustments to capacity at various infrastructure components of the enterprise mobile network, in an embodiment described with reference to FIG. 4, the MANO 474 may scale up computing or processing resources available at the 5G RAN 480 or 5G core 470 experiencing congestion, high-latency, or low throughput. In such an embodiment, the MANO 474 may further work in tandem with the intelligent wireless carrier link management system at one or more UEs in the pool 490, including the UE executing method portions of FIG. 7, to take advantage of these scaled up computing or processing resources by transceiving at least a portion of data through the recently scaled up 5G RAN 480 or 5G core 470. For example, the MANO 474 may instruct one or more UEs in pool 490, including the UE executing method portions of FIG. 7, currently transceiving data via a wireless link between a first antenna at the UE and either the 4G RAN or non-cellular AP to activate a second antenna for transceiving of data via a wireless link to the 5G RAN 480. Similarly, the MANO 474 may instruct one or more UEs in pool 490 currently transceiving data via a wireless link between a first antenna at the UE and the 5G RAN 480 to deactivate this first antenna when the MANO 474 decreases computing or processing resources available at the 5G RAN 480.

As another example, the MANO 474 in an embodiment may increase the number of antennas (e.g., 401, 402, or 450) transceiving data at the 5G RAN 480 when the 5G RAN 480 is experiencing high traffic load. In such an embodiment, the MANO 474 may further work in tandem with the intelligent wireless carrier link management system at one or more UEs in the pool 490, including the UE executing method portions of FIG. 7, to take advantage of these newly added antennas by transceiving at least a portion of data through the recently activated antennas. For example, the MANO 474 may instruct one or more UEs in pool 490 currently transceiving data via a wireless link between a first antenna at the UE and either the 4G RAN or non-cellular AP to activate a second antenna for transceiving of data via a wireless link to one of the newly activated antennas at the 5G RAN 480. Similarly, the MANO 474 may instruct one or more UEs in pool 490 currently transceiving data via a wireless link between a first antenna at the UE and the 5G RAN 480 to deactivate this first antenna when the MANO 474 decreases the number of antennas available at the 5G RAN 480.

The MANO in various embodiments may also distribute or reroute wireless links across the pool of UEs to redirect traffic away from certain infrastructure components of the enterprise mobile network experiencing high traffic or congestion. For example, in an embodiment described with respect to FIG. 3, the MANO 320 may redirect traffic moving through the 4G RAN 360 to access the 4G EPC 350 via the non-cellular AP 330, rather than through the 4G RAN 360 when one or more of the BBUs (e.g., 365, 369, or 370) are experiencing heavy traffic loads. In such an embodiment, the MANO 320 may further work in tandem with the intelligent wireless carrier link management system at one or more UEs in the pool 340, including the UE executing method portions of FIG. 7, to terminate wireless links established with the 4G RAN 360 and establish wireless links to the 4G EPC 350 via the non-cellular AP 330. For example, the MANO 320 may instruct one or more UEs in pool 340 currently transceiving data via a wireless link between a first antenna at the UE and the 4G RAN 360 to deactivate the first antenna and to activate a second antenna for transceiving of data via a wireless link to the non-cellular AP 330.

As another example, in an embodiment described with reference to FIG. 4, the MANO may redirect traffic moving through the 5G RAN 480 to access the 5G core 470 via a non-cellular AP, rather than through the 5G RAN 480 when one or more of the DUs (e.g., 410 or 412) or CUs (e.g., 431, or 433) are experiencing heavy traffic loads. In such an embodiment, the MANO 474 may further work in tandem with the intelligent wireless carrier link management system at one or more UEs in the pool 490, including the UE executing method portions of FIG. 7, to terminate wireless links established with the 5G RAN 480 and establish wireless links to the 5G core 470 via a non-cellular AP. For example, the MANO 474 may instruct one or more UEs in pool 490 currently transceiving data via a wireless link between a first antenna at the UE and the 5G RAN 480 to deactivate the first antenna and to activate a second antenna for transceiving of data via a wireless link to the non-cellular AP. In an embodiment described with reference to FIG. 5, the MANO 520 may instruct one or more UEs in pool 590 currently transceiving data via a wireless link between a first antenna at the UE and the 5G RAN 580 to deactivate the first antenna and to activate a second antenna for transceiving of data via a wireless link to the non-cellular AP 501.

The MANO in various embodiments may also distribute or reroute wireless links across the pool of UEs as the connectivity requirements for those UEs change over time (e.g., requirements for high throughput or low latency). Activation of an additional antenna in an embodiment may be appropriate, for example, when a single antenna fails to provide wireless service or data bandwidth of updated or current connectivity metrics gathered at blocks 710 and 712 for the currently transceiving wireless link established via a first antenna at block 708. For example, the first wireless link established at block 708 may have been established for high-throughput communication. In such an embodiment, the updated or current connectivity metrics gathered at blocks 710 and 712 may indicate recent initiation of a latency-sensitive software application at the UE. The MANO in such an embodiment may identify such UEs as requiring both high throughput and low latency communications. In some cases, both of these requirements may be met by a single wireless link, such as, for example, a wireless link with a closely located 5G RAN experiencing low traffic conditions. In other cases, the MANO may determine the best way to satisfy both the low latency and high throughput requirements, while simultaneously ensuring other UEs receive wireless links meeting their own connectivity and policy requirements involves establishing two separate wireless links—one for high throughput communications, and one for low latency communications. In order to satisfy both the low-latency and the high-throughput requirements, the MANO in such an embodiment may determine a UE antenna configuration adjustment that activates a second antenna for establishment of low-latency wireless links is appropriate.

As another example, the first wireless link established at block 708 may have been established for low-latency communication. In such an embodiment, the updated or current connectivity requirements gathered at blocks 710 and 712 may indicate recent initiation of a throughput-sensitive software application at the UE. The MANO, in coordination with the intelligent wireless carrier link managements system at the UE, in such an embodiment may determine a UE antenna configuration adjustment that activates a second antenna for establishment of high throughput wireless links is appropriate.

In another example, the first wireless link established at block 708 may have been established for secure communication. In such an embodiment, the updated or current connectivity metrics gathered at blocks 710 and 712 may indicate recent initiation of software application at the UE that are not transceiving secure or sensitive information. The MANO, in coordination with the intelligent wireless carrier link managements system at the UE, in such an embodiment may identify such UEs as requiring both secure and non-secure communications. In some cases, both of these requirements may be met by a single wireless link, such as, for example, a single wireless link transceiving all data securely, regardless of security requirement. In other cases, the MANO may determine the best way to satisfy both security requirements (e.g., secure and non-secure), while simultaneously ensuring other UEs receive wireless links meeting their own connectivity and policy requirements involves establishing two separate wireless links—one for secure communications (e.g., via a cellular RAN and core), and one for non-secure communications (e.g., via a non-cellular AP). In order to satisfy both these security requirements, the MANO in such an embodiment may determine a UE antenna configuration adjustment that activates a second antenna for transceiving of non-secure information is appropriate.

In still another example, the first wireless link established at block 708 may have been established for non-secure communication. In such an embodiment, the updated or current connectivity metrics gathered at blocks 710 and 712 may indicate recent initiation of software application at the UE that are transceiving secure or sensitive information. The MANO, in coordination with the intelligent wireless carrier link managements system at the UE, in such an embodiment may determine a UE antenna configuration adjustment that activates a second antenna for transceiving of secure information is appropriate.

In yet another example, the first wireless link established at block 708 may have been established with a 5G RAN/core. In such an embodiment, the updated or current UE connectivity metrics gathered at blocks 710 and 712 may indicate this wireless link fails to meet all of the UE connectivity requirements at the UE. The MANO, in coordination with the intelligent wireless carrier link managements system at the UE, in such an embodiment may determine a UE antenna configuration adjustment that activates a second antenna for establishment of a second wireless link with another RAN (e.g., 4G RAN, non-cellular AP, or 5G RAN) may be appropriate in order to increase overall performance of the connectivity metrics at the UE.

As another example, the first wireless link established at block 708 may have been established with a 4G RAN/EPC. In such an embodiment, the updated or current UE connectivity metrics gathered at blocks 710 and 712 may indicate this wireless link fails to meet all the UE connectivity requirements at the UE. The MANO, in coordination with the intelligent wireless carrier link managements system at the UE, in such an embodiment may determine a UE antenna configuration adjustment that activates a second antenna for establishment of a second wireless link with another RAN (e.g., 4G RAN, non-cellular AP, or 5G RAN) may be appropriate in order to increase overall performance of the connectivity metrics at the UE.

In still another example, the first wireless link established at block 708 may have been established with a non-cellular AP. In such an embodiment, the updated or current connectivity metrics gathered at blocks 710 and 712 may indicate this wireless link fails to meet the UE connectivity requirements at the UE. The MANO, in coordination with the intelligent wireless carrier link managements system at the UE, in such an embodiment may determine a UE antenna configuration adjustment that activates a second antenna for establishment of a second wireless link with another RAN (e.g., 4G RAN, non-cellular AP, or 5G RAN) may be appropriate in order to increase overall performance to meet UE connectivity metrics at the UE.

Deactivation of an antenna in an embodiment may be appropriate, for example, when changes in operating conditions at the UE result in current wireless links (e.g., as established at block 708) providing connectivity exceeding updated connectivity metrics at the UE gathered at blocks 710 and 712. For example, the MANO, in coordination with the intelligent wireless carrier link managements system at the UE, in an embodiment in which a current UE antenna configuration prioritizes high throughput, but the UE recently ceased executing software applications driving the earlier need for high throughput may determine a UE antenna configuration adjustment that deactivates the antenna transceiving on a high throughput wireless link due to the adjustment down of the capacity requirement of the UE connectivity requirement based on the gathered connectivity metrics. As another example, the MANO, in coordination with the intelligent wireless carrier link managements system at the UE, in an embodiment in which a current UE antenna configuration prioritizes low latency, but the UE recently ceased executing software applications driving the earlier need for low latency may determine a UE antenna configuration adjustment that deactivates the antenna transceiving on a low latency wireless link. As yet another example, the MANO, in coordination with the intelligent wireless carrier link managements system at the UE, in an embodiment in which a current UE antenna configuration prioritizes secure transmission, but the UE recently ceased executing software applications driving the earlier need for high security may determine a UE antenna configuration adjustment that deactivates the antenna transceiving on a secure wireless link. These are only a few examples of situations in which the MANO, in coordination with the intelligent wireless carrier link managements system at the UE, in an embodiment may determine a UE antenna configuration adjustment is appropriate. The method for determining a UE antenna configuration adjustment may then end.

Figure 8:
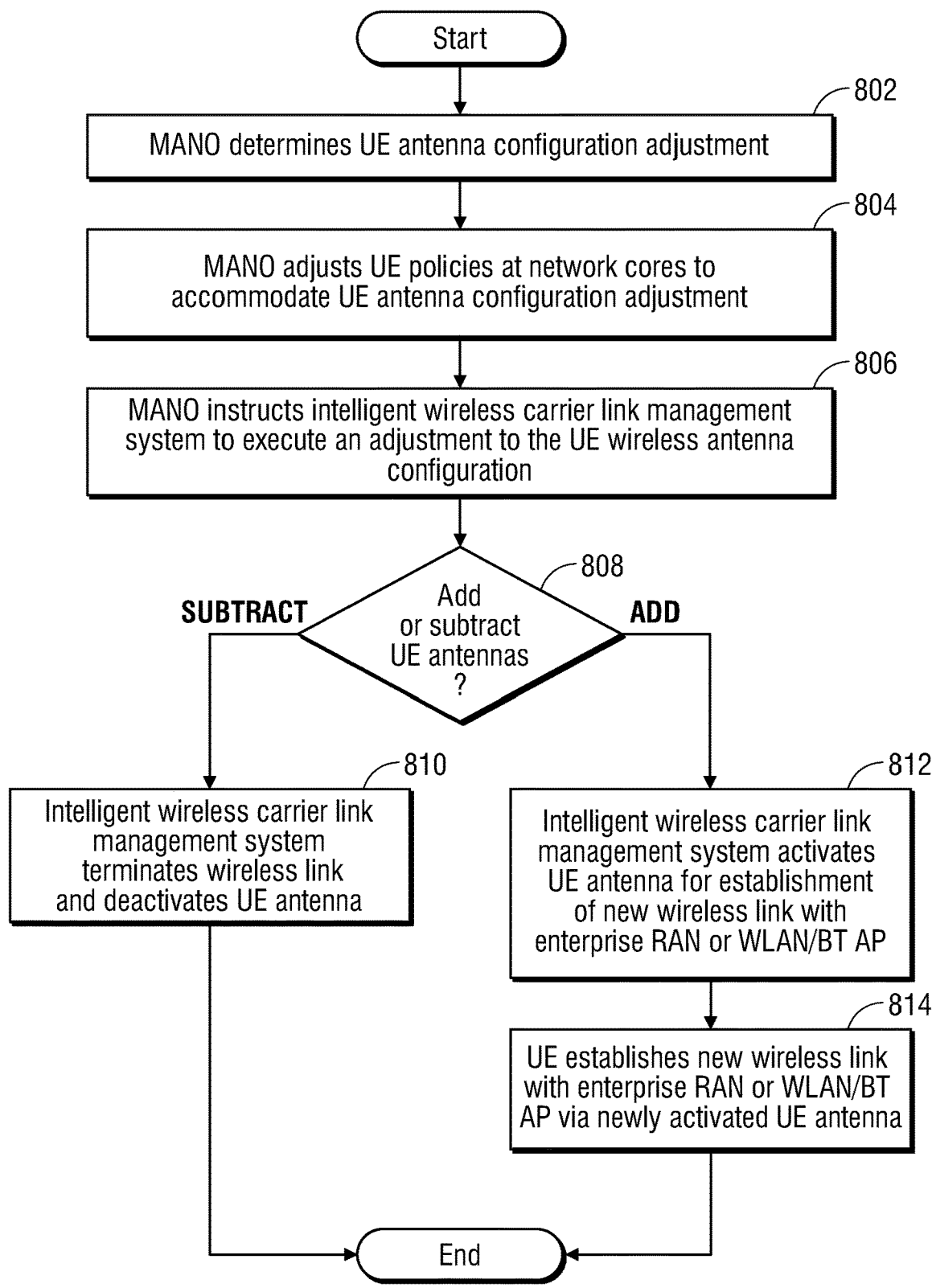
FIG. 8 is a flow diagram illustrating a method of adjusting wireless link antenna configuration at a UE device according to an embodiment of the present disclosure.

FIG. 8 is a flow diagram illustrating a method of adjusting a UE antenna configuration, based on adjustments determined at the UE or by a MANO of the enterprise mobile network according to an embodiment of the present disclosure. As described herein, UE antenna configuration adjustments in an embodiment may also be determined by a Management and Orchestration Module (MANO) operating remotely from each of the UEs within the enterprise mobile network. Such determinations may be made, in various embodiments described herein, in order to leverage changes in capacity at various infrastructure components of the RANs, non-cellular APs, and cores comprising the enterprise mobile network, as made by the MANO, to optimize performance across each of these infrastructure components and the pool of UEs communicating within the network.

At block 802, the MANO in an embodiment may determine a UE antenna configuration adjustment. The MANO in various embodiments described herein may determine an optimal distribution of wireless links having varying connectivity metrics across a pool or UEs in communication via the enterprise mobile network in order to meet connectivity requirements determined based on gathered connectivity metrics and UE enterprise profile requirements at a largest number of those UEs to optimize connectivity among the linked or managed UEs, as described with reference to FIG. 7 at block 718. For example, the MANO in an embodiment may distribute or reroute wireless links across the pool of UEs in order to take advantage of recent scaling of processing resources at various infrastructure components (e.g., RANs, non-cellular APs, MEC, or cellular network cores) within the enterprise mobile network. As another example, the MANO may distribute or reroute wireless links across the pool of UEs to redirect traffic away from certain infrastructure components of the enterprise mobile network experiencing high traffic or congestion. As yet another example, the MANO may distribute or reroute wireless links across the pool of UEs as the connectivity requirements for those UEs change over time (e.g., requirements for high throughput or low latency).

As described with reference to block 720 of FIG. 7, the MANO may further determine one or more antenna configuration adjustments at various UEs that are required in order to achieve the optimal wireless link distribution across all UEs communicating within the enterprise mobile network. For example, the MANO may instruct activation or deactivation of an antenna at a UE in response to an increase or decrease capacity at one or more enterprise mobile network infrastructure components (e.g., RANs, non-cellular APs, cores, or MECs). As another example, the MANO may activate or deactivate antennas in order to redirect traffic away from certain infrastructure components of the enterprise mobile network experiencing high traffic or congestion. As yet another example, the MANO in an embodiment may activate or deactivate UE antennas as the connectivity requirements for UEs change over time (e.g., requirements for high throughput or low latency).

At block 804, the MANO in an embodiment may adjust UE policies at network cores to accommodate UE antenna configuration adjustments. For example, in an embodiment described with reference to FIG. 2, the MANO 237 may increase capacity at the 4G RAN 231 and determine one or more of the WiFi UEs 213 not currently authorized for communication via the 4G system should perform a UE antenna configuration adjustment to add a second antenna for transceiving data with the 4G system. In order to facilitate execution of such a UE antenna configuration adjustment, the MANO 236 may adjust policies stored at the 4G EPC 234 to authorize those Wi-Fi UEs 213 to communicate via the 4G network.

For example, in an embodiment described with reference to FIG. 3, the Home Subscriber Server (HSS) 312 may store policy information for the plurality of UEs in pool 340. These policies may inform or dictate the types of wireless communication networks with which each UE in pool 340 associated with a given policy may establish wireless connections, based on detected network RAN and core network conditions including link performance requirements, security requirements, types of networks supported by a given UE, or other factors in various embodiments. For example, the HSS 312 may store a separate policy for each of the UEs in the pool 340 that identifies one or more subscriptions with which a given UE may be associated, defining which RANs (e.g., 4G RAN 360), non-cellular APs (e.g., AP 330), or cellular network cores (e.g., 4G EPC 350) that UE may access, and the priority for accessing them. For example, a subscription may grant 4G compatible UEs in pool 340 access to the non-cellular AP 330, 4G RAN 360 or the 4G EPC 350.

As another example, the MANO 237 may increase capacity at, or shift capacity to, the 5G RAN 232, and determine one or more of the 4G UEs 211, or WiFi UEs 213 not currently authorized for communication via the 5G system should perform a UE antenna configuration adjustment to add a second antenna for transceiving data with the 5G system. In order to facilitate execution of such a UE antenna configuration adjustment, the MANO 236 may adjust policies stored at the 5G core 235 to authorize those 4G UEs 211 or Wi-Fi UEs 213 to communicate via the 5G network.

In an embodiment described with reference to FIG. 5, the Unified Data Repository (UDR) 506 may store policy information for the plurality of UEs in pool 490. These policies may inform or dictate the types of wireless communication networks with which each UE in pool 490 associated with a given policy may establish wireless connections, based on RAN and associated core network conditions link performance requirements, security requirements, types of networks supported by a given UE, or other factors in various embodiments. This assessment of RAN and core operating conditions may further determination the UE antenna configuration adjustments for UEs along with the UE connectivity requirements across each of the plural UEs as well as enterprise profile requirements for UEs on an enterprise-provided mobile network with plural RANs. For example, a subscription given in such a policy may grant 5G compatible UEs in pool 490 access to the non-cellular AP 501, 5G RAN 550 or the 5G core 570. These policies may further prioritize various QoS requirements for each UE. For example, each UE may be associated with a minimum QoS requirement such as a minimum RSSI magnitude of 80 (e.g., higher than −80 dBm). As another example, these policies may designate a highest priority requirement, such as throughput, latency, or security.

The MANO may instruct the intelligent wireless carrier link management system at a UE to execute an adjustment to the UE wireless antenna configuration at block 806. The MANO may transmit an instruction to the intelligent wireless carrier link managements system at the UE to perform the antenna configuration adjustment determined at block 720 of FIG. 7, in an embodiment. For example, in an embodiment described with reference to FIG. 2, the MANO 236 may increase capacity at the 4G RAN 231 in order to optimize performance of wireless links across the pool 210 of UEs. In such an embodiment, the MANO 235 may then transmit an instruction to one or more of the 4G UEs 211 or the 5G UEs 212 to activate a second antenna at that UE for transceiving data specifically with the 4G RAN 231 that has recently increased capacity. For example, in an embodiment described with reference to FIG. 6, a UE information handling system 600 may have an established wireless link with a 5G RAN (e.g., 620) via a first antenna within WWAN antenna systems 653. The MANO in an embodiment may transmit an instruction to the UE 600 to active a second antenna within WWAN antenna systems 653, and to establish a second wireless link via this second antenna to a 4G RAN. The MANO in such an embodiment may transmit this instruction via the existing wireless link between the WWAN interface device 650 and the 5G RAN 620, or via OOB communications with the embedded controller 636.

As another example, in an embodiment described with reference to FIG. 2, the MANO 236 may increase capacity at the 5G RAN 232 in order to optimize performance of wireless links across the pool 210 of UEs. In such an embodiment, the MANO 235 may then transmit an instruction to one or more of the 5G UEs 212 to activate a second antenna at that UE for transceiving data specifically with the 5G RAN 231 that has recently increased capacity. For example, in an embodiment described with reference to FIG. 6, a UE information handling system 600 may have an established wireless link with a 4G RAN (e.g., 620) via a first antenna within WWAN antenna systems 653. The MANO in an embodiment may transmit an instruction to the UE 600 to active a second antenna within WWAN antenna systems 653, and to establish a second wireless link via this second antenna to a 5G RAN. The MANO in such an embodiment may transmit this instruction via the existing wireless link between the WWAN interface device 650 and the 4G RAN 620, or via OOB communications with the embedded controller 636.

In still another example, in an embodiment described with reference to FIG. 2, the MANO 236 may increase capacity at the non-cellular AP 233 in order to optimize performance of wireless links across the pool 210 of UEs. In such an embodiment, the MANO 235 may then transmit an instruction to one or more of the Wi-Fi UEs 213 to activate a second antenna at that UE for transceiving data specifically with the non-cellular AP 233 that has recently increased capacity. For example, in an embodiment described with reference to FIG. 6, a UE information handling system 600 may have an established wireless link with a cellular RAN (e.g., 620) via a first antenna within WWAN antenna systems 653. The MANO in an embodiment may transmit an instruction to the UE 600 to active a second antenna within WLAN antenna systems 663, and to establish a second wireless link via this second antenna to the WLAN AP 621. The MANO in such an embodiment may transmit this instruction via the existing wireless link between the WWAN interface device 650 and the RAN 620, or via OOB communications with the embedded controller 636.

At block 808, the intelligent wireless carrier link management system in an embodiment may determine whether the received antenna configuration adjustment includes addition or subtraction of a UE antenna. As described herein, UE antenna configuration adjustments in an embodiment may be determined by the MANO, as described in FIG. 7 at block 720. Upon such receipt of instruction indication such a determination made by the MANO, the intelligent wireless carrier link management system may execute the determined UE antenna configuration adjustment.

This adjustment may prompt addition or activation of a second antenna at a UE in an embodiment. For example, the MANO in an embodiment may determine a second antenna should be activated in order to transceive data with a RAN or non-cellular AP whose capacity has recently been increased by the MANO (e.g., as described with respect to block 720 in FIG. 7). As another example, the MANO in an embodiment may determine an antenna transceiving data with a RAN or non-cellular AP that the MANO has recently scaled down should be deactivated. In yet another example, the MANO in an embodiment may instruct activation of a second antenna for transceiving data via a wireless link with non-congested RAN or non-cellular AP, or deactivation of a first antenna currently transceiving data via a wireless link with a congested RAN or non-cellular AP in order to reroute traffic to avoid the congested RAN or non-cellular AP. In still another embodiment, the MANO may determine that a UE currently transceiving data on a wireless link optimized for a first connectivity requirement should activate a second antenna configured to optimize communications for a second connectivity requirement, as described above with respect to FIG. 7 at block 720. If the UE antenna configuration adjustment received from the MANO involves subtraction or deactivation of an antenna, the method may proceed to block 810 for such deactivation. If the UE antenna configuration adjustment received from the MANO involves addition or activation of a second antenna, the method may proceed to block 812 for such activation.

In an embodiment in which the UE antenna configuration adjustment received from the MANO involves deactivation of an antenna, the intelligent wireless carrier link management system may terminate the wireless link transceiving via the antenna identified for deactivation within the UE antenna configuration adjustment and deactivate that antenna at block 810. For example, in an embodiment in which the UE antenna configuration adjustment indicates that the UE should deactivate an antenna due to decreased need to communicate data via a low-latency wireless link, the UE may deactivate the antenna transceiving data via a low-latency wireless link. As another example, in an embodiment in which the UE antenna configuration adjustment indicates that the UE should deactivate an antenna due to decreased need to communicate data via a high throughput wireless link, the UE may deactivate the antenna transceiving data via a high throughput wireless link. In still another example, in an embodiment in which the UE antenna configuration adjustment indicates that the UE should deactivate an antenna due to decreased need to communicate secure data, the UE may deactivate the antenna transceiving secure data. In yet another example, in an embodiment in which the UE antenna configuration adjustment indicates that the UE should deactivate an antenna due to decreased need to communicate non-secure data, the UE may deactivate the antenna transceiving non-secure data.

The intelligent wireless carrier link management system in an embodiment may deactivate an antenna by decreasing or ceasing power delivery to the antenna, or by placing the antenna in an idle or low-power mode. For example, in an embodiment described with respect to FIG. 6, the intelligent wireless carrier link management system 612 may instruct the PMU 632 to cease or decrease power delivery to an antenna within the WWAN antenna systems 653, or an antenna within the WLAN antenna system 663. In another example, the intelligent wireless carrier link management system 612 may instruct the WWAN network interface device 650 or the WLAN network interface device 660 to enter an idle or low-power mode.

At block 812, in an embodiment in which the UE antenna configuration adjustment received from the MANO involves activation of a second antenna, the intelligent wireless carrier link management system may activate an antenna capable of establishing a wireless link with properties identified within the UE antenna configuration adjustment. For example, in an embodiment described with reference to FIG. 6 in which the UE antenna configuration adjustment instructs activation of an antenna for establishment of a high throughput wireless link, the intelligent wireless carrier link management system 612 may identify a RAN 620 or a non-cellular AP 621 generating beacon data indicating a highest available throughput measurement. The intelligent wireless carrier link management system 612 may then activate an antenna within the WWAN antenna systems 653 for high throughput communication with the RAN 620 or activate an antenna within the WLAN antenna systems 663 for high throughput communication with the non-cellular AP 621, depending upon which of the two (e.g., RAN 620 or AP 621) generate beacon data indicating the highest available throughput.

As another example, in an embodiment in which the UE antenna configuration adjustment instructs activation of an antenna for establishment of a low latency wireless link, the intelligent wireless carrier link management system 612 may identify a RAN 620 or a non-cellular AP 621 generating beacon data indicating a lowest available latency measurement. The intelligent wireless carrier link management system 612 may then activate an antenna within the WWAN antenna systems 653 for low latency communication with the RAN 620 or activate an antenna within the WLAN antenna systems 663 for low latency communication with the non-cellular AP 621, depending upon which of the two (e.g., RAN 620 or AP 621) generate beacon data indicating the lowest available latency.

In yet another example, in an embodiment in which the UE antenna configuration adjustment instructs activation of an antenna for establishment of a secure wireless link, the intelligent wireless carrier link management system 612 may identify a RAN 620 or a non-cellular AP 621 generating highest QoS measurements. The intelligent wireless carrier link management system 612 may then activate an antenna within the WWAN antenna systems 653 for secure communication with the RAN 620 or activate an antenna within the WLAN antenna systems 663 for communication vi aa VPN tunnel with the non-cellular AP 621, depending upon which of the two (e.g., RAN 620 or AP 621) generate beacon data indicating highest QoS measurements.

In another example, in which the MANO determines the UE antenna configuration adjustment based on changes in capacity at various enterprise mobile network infrastructure components, the UE antenna configuration adjustment may specifically identify the RAN or AP to which the newly activated antenna should connect. For example, in an embodiment described with reference to FIG. 2, the intelligent wireless carrier link management system 214 may receive a UE antenna configuration adjustment from the MANO 236 to establish a wireless link with the 4G RAN 231 via the newly activated antenna in order to take advantage of recently increased capacity at the 4G RAN 231. As another example, the intelligent wireless carrier link management system 214 may receive a UE antenna configuration adjustment from the MANO 236 to establish a wireless link with the 5G RAN 232 via the newly activated antenna in order to take advantage of recently increased capacity at the 5G RAN 232. As yet another example, the intelligent wireless carrier link management system 214 may receive a UE antenna configuration adjustment from the MANO 236 to establish a wireless link with the non-cellular AP 233 via the newly activated antenna in order to take advantage of recently increased capacity at the non-cellular AP 233.

Upon receipt of such a UE antenna configuration adjustment specifically identifying a RAN or non-cellular AP, the intelligent wireless carrier link management system may activate an antenna within a network interface device capable of establishing wireless links with the specifically identified RAN or non-cellular AP. For example, in an embodiment described with respect to FIG. 6 in which the UE antenna configuration adjustment specifically identifies a 4G RAN, the intelligent wireless carrier link management system 612 may activate an antenna within WWAN antenna systems 653 for establishment of a wireless link to a 4G RAN (e.g., 620). As another example, in an embodiment in which the UE antenna configuration adjustment specifically identifies a 5G RAN, the intelligent wireless carrier link management system 612 may activate an antenna within WWAN antenna systems 653 for establishment of a wireless link to a 5G RAN (e.g., 620). As yet another example, in an embodiment in which the UE antenna configuration adjustment specifically identifies a non-cellular AP, the intelligent wireless carrier link management system 612 may activate an antenna within WLAN antenna systems 663 for establishment of a wireless link to a non-cellular AP (e.g., 621).

The UE may establish a wireless link via the newly activated antenna pursuant to the UE antenna configuration adjustment at block 814. For example, in an embodiment described with reference to FIG. 6 in which the UE antenna configuration adjustment instructs activation of an antenna for establishment of a high throughput wireless link, the intelligent wireless carrier link management system 612 may direct the WWAN network interface device 650 to establish a wireless link with a RAN 620 or direct the WLAN network interface device 660 to establish a wireless link with a non-cellular AP 621 (whichever of the RAN 620 or AP 621 generates beacon data indicating a highest available throughput measurement) via the newly activated WWAN or WLAN antenna. As another example, the intelligent wireless carrier link management system 612 may direct the WWAN network interface device 650 to establish a wireless link with a RAN 620 or direct the WLAN network interface device 660 to establish a wireless link with a non-cellular AP 621 (whichever of the RAN 620 or AP 621 generates beacon data indicating a lowest available latency measurement) via the newly activated WWAN or WLAN antenna. As yet another example, the intelligent wireless carrier link management system 612 may direct the WWAN network interface device 650 to establish a wireless link with a RAN 620 or direct the WLAN network interface device 660 to establish a wireless link and VPN tunnel with a non-cellular AP 621 (whichever of the RAN 620 or AP 621 generates beacon data indicating a highest QoS measurement) via the newly activated WWAN or WLAN antenna.

In another example, in an embodiment in which the UE antenna configuration adjustment specifically identifies a 4G RAN, the intelligent wireless carrier link management system 612 may direct the WWAN network interface device 650 to establish a wireless link to a 4G RAN (e.g., 620), via the newly activated antenna within the WWAN antenna system 653. As another example, in an embodiment in which the UE antenna configuration adjustment specifically identifies a 5G RAN, the intelligent wireless carrier link management system 612 may direct the WWAN network interface device 650 to establish a wireless link to a 5G RAN (e.g., 620), via the newly activated antenna within the WWAN antenna system 653. In yet another example, in which the UE antenna configuration adjustment specifically identifies a non-cellular AP, the intelligent wireless carrier link management system 612 may direct the WLAN network interface device 660 to establish a wireless link to a non-cellular AP (e.g., 621), via the newly activated antenna within the WLAN antenna system 663. The method for executing a UE antenna configuration adjustment may then end.

The blocks of the flow diagrams of FIGS. 7 through 8 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Information handling systems, modules, resources, or programs that are in communication with one another need not be in continuous communication with each other, unless expressly specified otherwise. In addition, information handling systems, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system of a management and orchestration module (MANO) comprising:
   a processor executing code instructions configured to:
      determine user equipment device (UE) connectivity requirements from UE connectivity metrics received from a first UE via an out of band communication to the MANO, for a plurality of UEs, including the first UE, managed by the MANO;
      determine enterprise profile requirements for the plurality of UEs including the first UE and detected network conditions of a plurality of wireless protocol radio access networks (RANs) and associated cores of an enterprise-provided mobile network;

generate an optimal wireless link distribution across the plurality of UEs based on the UE connectivity requirements, enterprise profile requirements of the plurality of UEs, and detected network conditions of the RANs and associated cores of the enterprise-provided mobile network; and determine an initial antenna configuration adjustment for the first UE instructing selection of a first wireless link via a first antenna, selected to meet the UE connectivity requirement relative to wireless links assigned to the plurality of UEs according to the optimal wireless link distribution; and a network interface device to transmit the initial antenna configuration adjustment to the first UE.

2. The information handling system of claim 1, wherein the initial antenna configuration adjustment involves deactivation of a second antenna and establishment of the first wireless link via the first antenna and a first wireless protocol radio to meet the UE connectivity requirement received from the first UE and to meet the optimal wireless link distribution of the plurality of UEs on the enterprise-provided mobile network.

3. The information handling system of claim 1, wherein the enterprise profile requirements of the plurality of UEs includes enterprise determined rankings of the plurality of UEs based on minimum capacity requirements, quality of service requirements, or security requirements associated with each of the plurality of UEs and its associate user.

4. The information handling system of claim 1, wherein the UE connectivity requirement received from the first UE is a high-throughput requirement for the first wireless link.

5. The information handling system of claim 1, wherein the UE connectivity requirement received from the first UE is a low latency requirement for the first wireless link.

6. The information handling system of claim 1, wherein the UE connectivity requirement received from the first UE is a security requirement for the first wireless link.

7. The information handling system of claim 1, wherein the UE connectivity requirement is defined in a user-selected enterprise UE connectivity profile retrieved from a subscription manager data preparation platform of the enterprise mobile network.

8. The information handling system of claim 1, wherein the initial antenna configuration adjustment involves a selection of one or more antennas and associated wireless protocol radios to increase or decrease wireless link capacity to meet the UE connectivity requirement for the first UE as well the corresponding optimal wireless link distribution of the plurality of UEs on the enterprise-provided mobile network.

9. The information handling system of claim 1 further comprising:

the processor executing code instructions of the MANO to:

determine the UE connectivity requirement for which the first wireless link is optimized no longer applies to the first UE;

determining an updated antenna configuration adjustment involving adjustment to the wireless link capacity provided to the first UE from the initial antenna configuration adjustment; and the network interface device transmitting the updated UE antenna configuration adjustment to the first UE to meet an updated UE connectivity requirement and a corresponding updated optimal wireless link distribution of the plurality of UEs on the enterprise-provided mobile network.

10. A method of managing user equipment device (UE) connectivity requirements for a first UE among a plurality of UEs with a management and orchestration module (MANO) comprising:

executing code instructions, via a processor, to determine UE connectivity requirements from UE connectivity metrics received from the first UE via an out of band communication to the MANO operating at a management information handling system, for a plurality of UEs, including the first UE, that are managed by the MANO;

determining enterprise profile requirements for the plurality of UEs including the first UE and detecting network conditions of a plurality of wireless protocol radio access networks (RANs) and associated cores of an enterprise-provided mobile network;

generating an optimal wireless link distribution across the plurality of UEs based on the UE connectivity requirements, enterprise profile requirements of the plurality of UEs, and detected network conditions of the RANs and associated cores of the enterprise-provided mobile network; and determining an initial antenna configuration adjustment for the first UE instructing selection of a first wireless link via a first antenna, selected to meet the UE connectivity requirement relative to wireless links assigned to the plurality of UEs according to the optimal wireless link distribution; and transmitting the initial antenna configuration adjustment, via a network interface device, to the first UE.

11. The method of claim 10, wherein the initial antenna configuration adjustment involves deactivation of a second antenna and establishment of the first wireless link via the first antenna and a first wireless protocol radio to meet the UE connectivity requirement received from the first UE and to meet the optimal wireless link distribution of the plurality of UEs on the enterprise-provided mobile network.

12. The method of claim 10, wherein the enterprise profile requirements of the plurality of UEs includes enterprise determined rankings of the plurality of UEs based on minimum capacity requirements, quality of service requirements, or security requirements associated with each of the plurality of UEs and its associate user.

13. The method of claim 10, wherein the UE connectivity requirement received from the first UE is a high-throughput requirement for the first wireless link.

14. The method of claim 10, wherein the UE connectivity requirement received from the first UE is a low latency requirement for the first wireless link.

15. The method of claim 10, wherein the UE connectivity requirement received from the first UE is a security requirement for the first wireless link.

16. The method of claim 10, wherein the UE connectivity requirement is defined in a user-selected enterprise UE connectivity profile retrieved from a subscription manager data preparation platform of the enterprise mobile network.

17. An information handling system of a management and orchestration module (MANO) comprising:

a processor executing code instructions configured to:

determine user equipment device (UE) connectivity requirements from UE connectivity metrics received from a first UE via an out of band communication to the MANO, for a plurality of UEs, including the first UE, managed by the MANO;

determine enterprise profile requirements for the plurality of UEs including the first UE and detected network conditions of a plurality of wireless protocol radio access networks (RANs) and associated cores of an enterprise-provided mobile network;
generate an optimal wireless link distribution across the plurality of UEs based on the UE connectivity requirements, enterprise profile requirements of the plurality of UEs, and detected network conditions of the RANs and associated cores of the enterprise-provided mobile network; and
determine an initial antenna configuration adjustment for the first UE instructing selection of a first wireless link via a first antenna, selected to meet the UE connectivity requirement relative to wireless links assigned to the plurality of UEs according to the optimal wireless link distribution; and
a network interface device to transmit the initial antenna configuration adjustment to the first UE, wherein the initial antenna configuration adjustment involves deactivation of a second antenna and establishment of the first wireless link via the first antenna and a first wireless protocol radio to meet the UE connectivity requirement received from the first UE and to meet the optimal wireless link distribution of the plurality of UEs on the enterprise-provided mobile network.

18. The information handling system of claim 17, wherein the enterprise profile requirements of the plurality of UEs includes enterprise determined rankings of the plurality of UEs based on minimum capacity requirements, quality of service requirements, or security requirements associated with each of the plurality of UEs and its associate user.

19. The information handling system of claim 17 further comprising:
the processor executing code instructions of the MANO to:
determine the UE connectivity requirement for which the first wireless link is optimized no longer applies to the first UE;
determining an updated antenna configuration adjustment involving adjustment to the wireless link capacity provided to the first UE from the initial antenna configuration adjustment; and
the network interface device transmitting the updated UE antenna configuration adjustment to the first UE to meet an updated UE connectivity requirement and a corresponding updated optimal wireless link distribution of the plurality of UEs on the enterprise-provided mobile network.

* * * * *